(12) United States Patent  
Yatsu et al.

(10) Patent No.: US 7,261,420 B2  
(45) Date of Patent: Aug. 28, 2007

(54) PROJECTION OPTICAL UNIT AND PROJECTION IMAGE DISPLAY APPARATUS

(75) Inventors: Masahiko Yatsu, Fujisawa (JP); Koji Hirata, Yokohama (JP); Hidehiro Ikeda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/637,692

(22) Filed: Dec. 13, 2006

(65) Prior Publication Data

US 2007/0097327 A1    May 3, 2007

Related U.S. Application Data

(62) Division of application No. 10/921,938, filed on Aug. 20, 2004, now Pat. No. 7,159,988.

(30) Foreign Application Priority Data

Nov. 28, 2003   (JP) .............................. 2003-398395

(51) Int. Cl.  
G03B 21/14 (2006.01)  
G03B 21/26 (2006.01)  
G02B 13/22 (2006.01)  
G02B 23/24 (2006.01)  
G02B 9/06 (2006.01)

(52) U.S. Cl. ...................... 353/30; 353/97; 353/76; 359/663; 359/362; 359/794

(58) Field of Classification Search ............... 353/97, 353/76, 101, 30; 359/663, 362, 754, 794  
See application file for complete search history.

(56) References Cited

U.S. PATENT DOCUMENTS

| 4,924,244 | A | 5/1990 | Kataoka |
| 5,048,939 | A | 9/1991 | Yatsu |
| 5,648,871 | A | 7/1997 | Okuyama |
| 5,986,806 | A | 11/1999 | Sugawara |
| 6,975,460 | B2 | 12/2005 | Ikeda |
| 2005/0036120 | A1* | 2/2005 | Hirata et al. ................ 353/102 |

FOREIGN PATENT DOCUMENTS

| JP | 5-134213 | 5/1993 |
| JP | 6-194598 | 7/1994 |
| JP | 11-326759 | 11/1999 |
| JP | 2000-162544 | 6/2000 |
| JP | 2002-357768 | 12/2002 |

* cited by examiner

Primary Examiner—W. B. Perkey  
Assistant Examiner—Magda Cruz  
(74) Attorney, Agent, or Firm—Antonelli, Terry, Stout & Kraus, LLP.

(57) ABSTRACT

A projection optical unit for enlarged projection of an image displayed by an image display element includes a first projection optical unit having positive refractive power, and a second projection optical unit having positive refractive power for further enlarging the first enlarged image obtained by the first projection optical unit. The first projection optical unit is in an almost telecentric relationship with respect to the image display element side and the first enlarged image side, and the first enlarged image is formed at the image display element side, rather than at the second projection optical unit.

4 Claims, 51 Drawing Sheets

FIG. 2
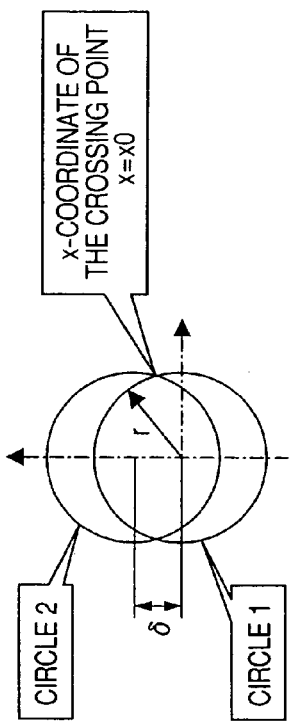
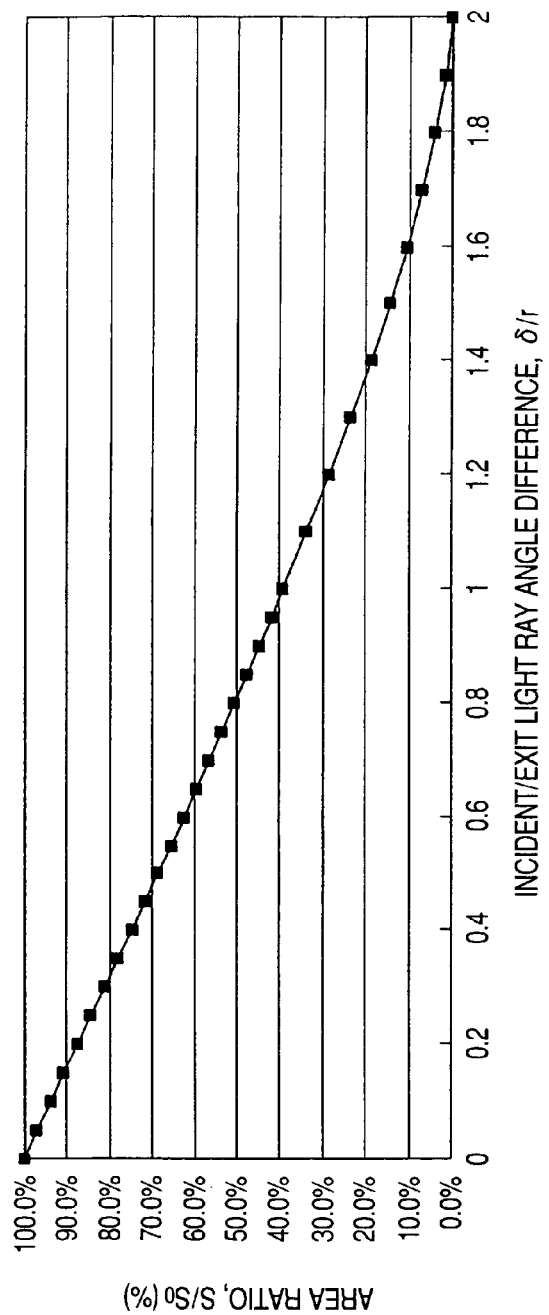

PROJECTION OPTICAL UNIT AND PROJECTION IMAGE DISPLAY APPARATUS

CROSS REFERENCE TO RELATED APPLICATION

This application is a divisional application of U.S. application Ser. No. 10/921,938, filed Aug. 20, 2004, now U.S. Pat. No. 7,159,988 the contents of which are incorporated herein by reference.

CLAIM OF PRIORITY

The present application claims priority from Japanese application serial no. JP2003-398395, filed on Nov. 28, 2003, the content of which is hereby incorporated by reference into this application.

BACKGROUND OF THE INVENTION

The present invention relates to a projection image display apparatus that displays images by projecting them onto the front of a screen or from the rear of the screen. The invention also relates to a projection optical unit used for such a display apparatus.

An image display apparatus that uses a projection optical unit to provide an enlarged on-screen projection of the images displayed by an image display element is required to obtain large enough an enlarged image on the screen, while at the same time, shortening the projection distance. A projection optical unit is known that is adapted to implement the above by projecting an image in enlarged form from an oblique direction with respect to a screen, as described in, for example, Japanese Patent Laid-Open No. Hei 5-134213 (Patent document 1), 2000-162544 (Patent document 2), 2002-357768 (Patent document 3).

SUMMARY OF THE INVENTION

The projection of an image from an oblique direction with respect to a screen causes so-called trapezoidal distortion of the image projected. In order to solve this problem, according to foregoing Patent document 1, such trapezoidal distortion is suppressed using an eccentric afocal converter disposed at the screen side. The afocal converter disclosed in Patent document 1 is low in magnification, and thus, wide-angle imaging is difficult to achieve. Also, in the projection optical unit described in Patent document 2, it is difficult to achieve such wide-angle imaging that allows sufficient reduction in the thickness of a rear-projection color image display apparatus. There is yet another problem in that since each of the lenses used needs to be independently decentered, the projection optical unit is difficult to manufacture. Additionally, the projection optical unit described in Patent document 3 includes a first refractive lens system that has positive power, a second refractive lens system that has negative power, and an optical path folding mirror. Since at least two lenses in the second refractive lens system that has negative power are decentered with a difference in rotational symmetry, there is the manufacturing-related problem in which position accuracy of each lens is difficult to achieve.

Furthermore, in each of the above conventional technologies, design has focused only on the projection optical unit and the optimal design has not been conducted for the entire system that includes illumination optics.

Problems with the projection optical unit used for the conventional color image display apparatus employing a transmission-type liquid-crystal panel as an image display element, include as described above, in addition to the difficulty in achieving wider-angle imaging required for a more compact design of the set, the difficulties in obtaining higher focusing performance to respond to the improvement of the panel in resolution, and in enhancing magnifications to cope with the downsizing of the panel and the color image display apparatus.

However, when a reflection-type liquid-crystal panel is used as an image display element, a high numerical aperture can be realized since pixel electrodes can be arranged on the reverse side of the liquid-crystal layer. Compared with the transmission-type liquid-crystal panel, therefore, the reflection-type liquid-crystal panel has the following features:

(1) Given the same resolution, the panel can be made one size smaller;

(2) Given the same panel size, a larger number of pixels can be obtained (resolution enhancement).

For these reasons, the projection lens device used for the color image display apparatus employing the reflection-type liquid-crystal panel is required to be further improved in terms of focusing performance and magnification, compared with the display scheme using the transmission-type liquid-crystal panel. Furthermore, in the optics of the image display apparatus employing the reflection-type liquid-crystal panel, even longer back-focusing is required since, in addition to a color synthesizing prism, large air spacing exists between the image display element and the projection lens device.

Additionally, for the projection color image display apparatus mentioned above, great amounts of development investment have been required for the design and development of a new projection optical unit in order to match the effective screen size of the panel to be used.

In this way, to realize more compact dimensions of a rear-projection color image display apparatus, a projection optical unit is required that ensures wider-angle imaging, higher focusing performance, higher magnifications, and longer back-focusing. It is also desirable that even when a panel different in effective screen size and in scheme is used, the amount of development investment should be minimized by partially modifying standard components without redesigning and redeveloping all illumination optics or the projection optical unit.

The present invention was made in view of the problems and situations mentioned above, and an object of the invention is to provide a technology that allows a more compact set to be obtained.

In order to attain the above object, the present invention takes a configuration in which, between an optical path ranging from an image display device to a screen, are arranged a first projection optical unit having positive refracting power for forming a first enlarged image, and a second projection optical unit having positive refracting power, positioned at the screen side of the first lens group and for forming a second enlarged image on the screen by further enlarging the first enlarged image obtained by the first projection optical unit, wherein the first enlarged image is formed closer to the image display element than to the second projection optical unit. The screen may include a Fresnel Screen.

Also, a field lens group having positive refracting power is arranged between the first projection optical unit and the second projection optical unit, wherein a magnification M1 of the first enlarged image is made smaller than a magnification M2 of the second enlarged image. Preferably, the first projection optical unit is designed so as to match an F-value of illumination optics telecentrically at the image display element side.

Since the first enlarged image obtained by the first projection optical unit is formed closer to the image display element than to the second projection optical unit, F2 (divergence angle of light rays) that is the F-value of the second lens group equals a value obtained by dividing F1, the F-value of the first lens group, by the magnification M1 of the first enlarged image. That is to say, F2=F1/M1. This makes it possible to increase F2 of the second projection optical unit, thus providing an advantage in implementing very-wide-angle imaging at a field angle exceeding 90 degrees.

Besides, the first enlarged image formed by the first projection optical unit is formed near the above-mentioned field lens group. Formation of the image at the first projection optical unit side, for example, does not affect the on-screen enlarged image, even if dirt sticks to the field lens group.

Methods for realizing a compact design of the projection image display apparatus itself include the following:

(1) Optical path folding means is provided between the above-mentioned second projection optical unit and the field lens group. More specifically, a prism may be used as the technical means for folding an optical path. Use of a fold mirror allows realization of a more compact design with a suppressed increase in cost.

(2) Optical path folding means is further provided between the lens elements that constitute the first projection optical unit.

(3) Additionally, optical path folding means is provided between the lens elements that constitute the second projection optical unit.

Also, second methods for making more compact the projection color image display apparatus itself include the following:

(4) For a projection optical unit arrangement with two lens groups, the above-mentioned first projection optical unit and second projection optical unit are arranged so that the respective optical axes deviate. In other words, a further compact design can be achieved by disposing the second projection optical unit in a shifted position with respect to a first enlarged image and obtaining an on-screen enlarged image via a fold mirror.

(5) For another projection optical unit arrangement with two lens groups, the above-mentioned first projection optical unit is disposed so as to be approximately parallel to a horizontal direction of a screen. Furthermore, optical path folding means is provided between the first projection optical unit and the second projection optical unit, and the second projection optical unit is disposed so as to be approximately vertical to the horizontal direction of the screen (i.e., the first projection optical unit and the second projection optical unit are arranged so that the respective optical axes are orthogonal to each other). Thus, a further compact design can be achieved by obtaining an on-screen enlarged image via a fold mirror.

A projection image display apparatus of a short projection distance is valid since the apparatus is not restricted by its installation location when used for discussion in a small room. Also, the apparatus, when used as a rear-projection image display apparatus, is particularly valid for reduction in the thickness of the entire apparatus.

BRIEF DESCRIPTION OF THE DRAWINGS

FIG. 2 is a diagram showing the deviation of pupils due to an angle difference;

DETAILED DESCRIPTION OF THE PREFERRED EMBODIMENTS

Figure 56:
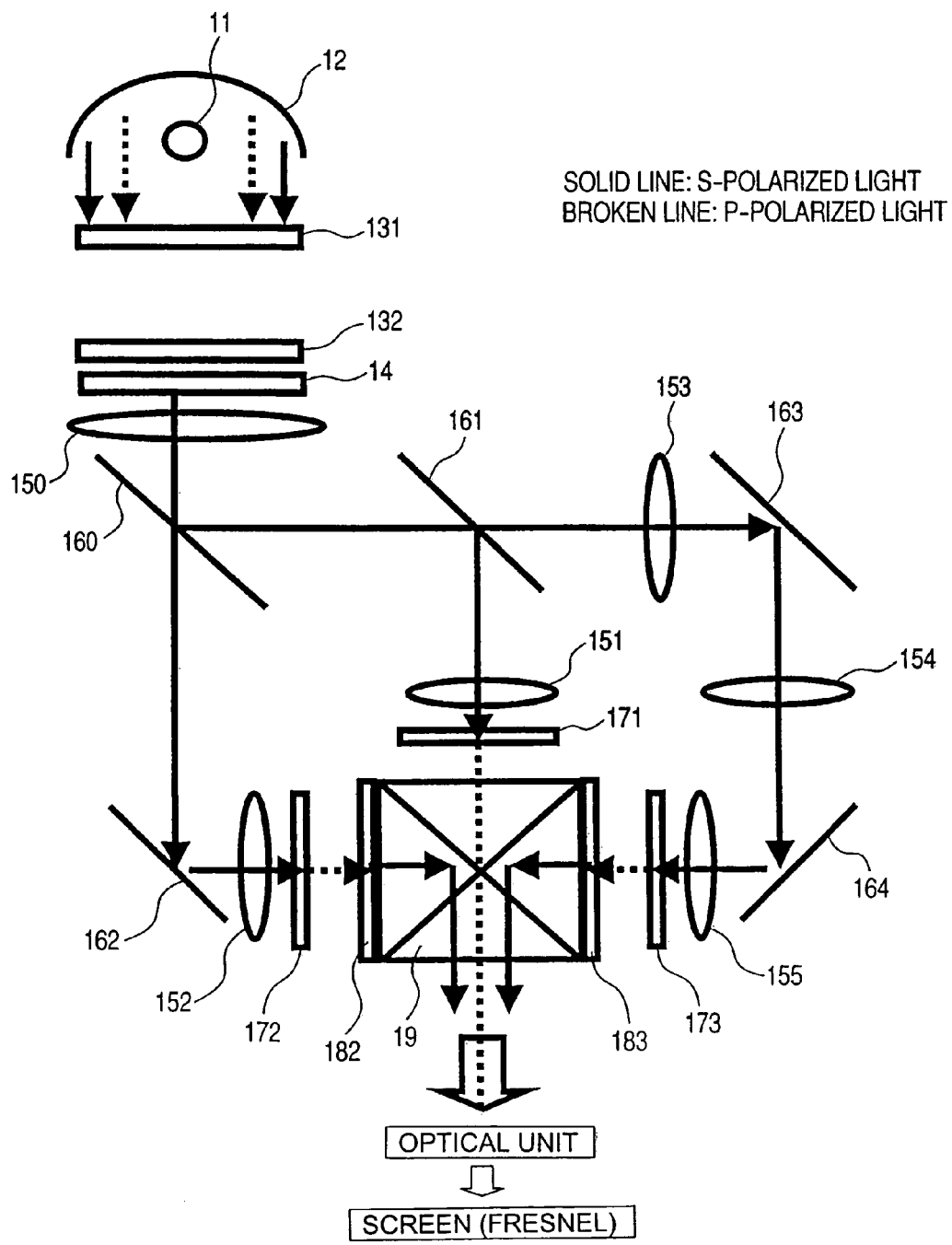
FIG. 56 is a configuration diagram of an illumination system of a projection image display apparatus which uses projection optical units of the present invention.

First, the configuration of an illumination system of a projection image display apparatus which uses projection optical units according to the present invention is described below using FIG. 56. In FIG. 56, a discharge lamp for emitting white light, such as a high-pressure mercury lamp, is used as a light source 11. The white light that is the natural light emitted from the light source 11 is reflected by a reflector 12 and then passed through a first multi-lens 131 and a second multi-lens 132, wherein the multi-lenses both serve as an integrator. After that, the light has its polarized state adjusted by a polarization transducer 14. The white light is separated into red light, green light, and blue light, by a color separating element constituted by dichroic mirrors 160 and 161. The luminous fluxes thus separated into red, green, and blue, are irradiated onto image display elements 171, 172, and 173 for the respective colors, via a just-infocus lens 150, condenser lenses 151 and 152, and relay lenses 153, 154, and 155. A cross prism 19 conducts color syntheses on the fluxes emitted from the image display elements 171, 172, and 173 for red, green, and blue, and color-synthesized light is made to enter a projection lens.

The optical paths of each color fluxes are turned back by mirrors 162, 163, 164 and directed to the cross prism 19. A good efficiency of light usage can be obtained when the green light is color-synthesized as P-type polarized state and the red and blue light are color-synthesized as S-type polarized state. Therefore, the cross prism 19 provides ½ wavelength plate 182, 183 which polarize the red and blue light as S-type polarized state.

Next, the basic configuration and functions of a projection optical unit according to the present invention are described below using FIG. 1. In the present invention, the projection optical unit for providing an enlarged projection of the images displayed by image display elements is divided into two lens groups. One of the lens groups constitutes a first projection optical unit that forms a first enlarged image, and the other lens group constitutes a second projection optical unit that forms a second enlarged image by further enlarging the first enlarged image, the second projection optical unit having positive refractive power.

Figure 1:
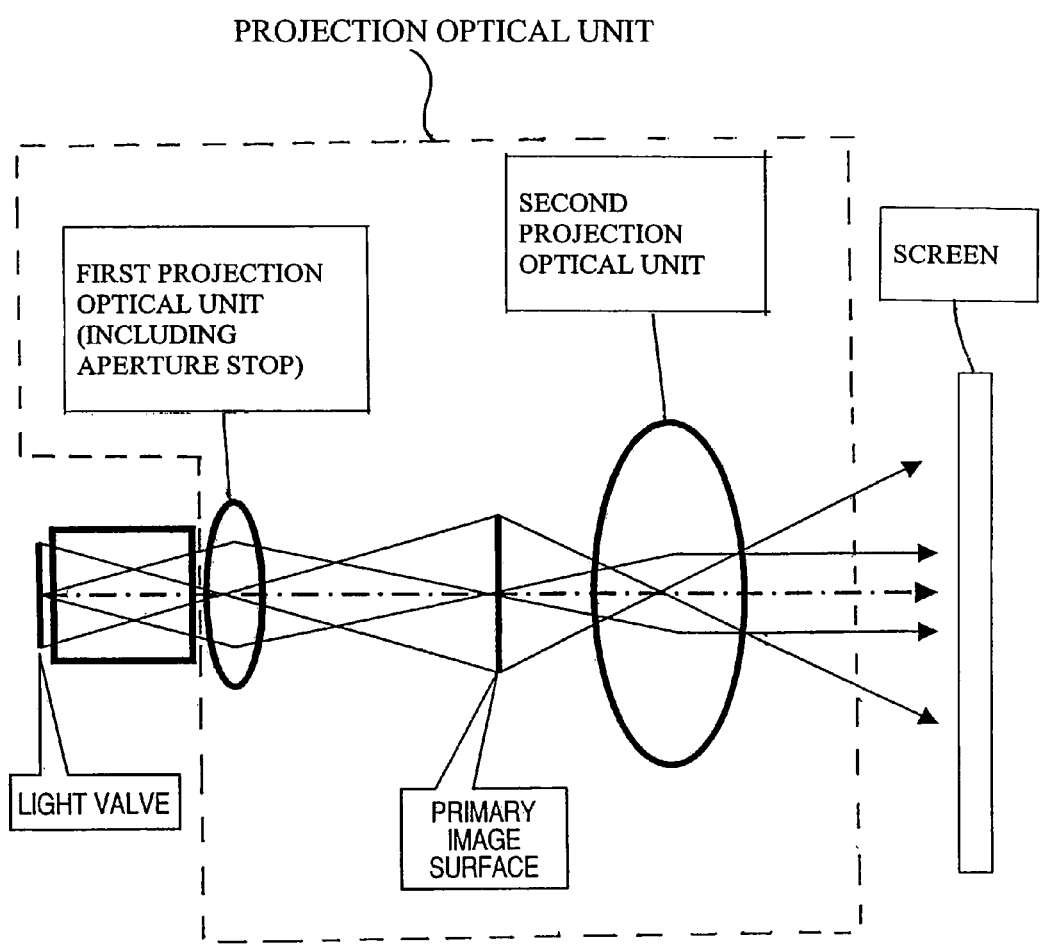
FIG. 1 is a configuration diagram of a projection optical unit according to the present invention.

Since one projection optical unit, as shown in dashed line in FIG. 1, is divided into the first projection optical unit and the second projection optical unit, although the total number of lenses increases, a distance between the secondary projection lens group and the first enlarged image can be reduced. Accordingly, even when the second projection optical unit is formed to take a wider-angle imaging scheme, size extension of the second projection optical unit can be prevented.

Problems associated with coupling the first projection optical unit and the second projection optical unit, are described below using FIG. 2. Although more specific data of the entire projection optical unit is described later herein, the first projection optical unit has a magnification of 3× in Embodiment 1 and the second projection optical unit has a magnification of 27× in Embodiment 1. If an F-value of the incident luminous flux irradiated from illumination optics onto the first projection optical unit is taken as F2.67, an F-value of the luminous flux emitted from the first projection optical unit becomes F8. This means that the flux that has entered the first projection optical unit at a cone angle of +/−10.6 degrees becomes a flux with a cone angle of +/−3.6 degrees after exiting the first projection optical unit. As the angle of the flux diminishes, the amount of flux is deteriorated more significantly by a shift in pupil position between the first projection optical unit and the second projection optical unit. Originally, the shift in pupil position varies pupil diameters. However, positions of the pupils have been fixed and then the pupils have been moved according to the particular difference in angle in order to estimate substantial amounts of overlapping and/or shifting of the pupils.

Referring to FIG. 2, the pupil diameter of the first projection optical unit is taken as circle 1, and the pupil diameter of the second projection optical unit, as circle 2. Circle 1 is represented by numerical equation 1, and circle 2, by numerical equation 2.

$$x^2+y^2=r^2 \qquad \text{[Numerical equation 1]}$$

$$x^2+(y-\delta)^2=r^2 \qquad \text{[Numerical equation 2]}$$

An area of overlapping between circles 1 and 2 can be obtained by integrating, in a range of a crossing point (taken as $x_0$) of the two circles, a differential area between an upper half of the circle 1 represented by numerical equation 3, and a lower half of the circle 2 represented by numerical equation 4.

$$y=\sqrt{(r^2-x^2)} \qquad \text{[Numerical equation 3]}$$

$$y=\delta-\sqrt{(r^2-x^2)} \qquad \text{[Numerical equation 4]}$$

An equation of the integration can be derived from numerical equation 5 shown below, and thus, a ratio with respect to the area of $S_0=\pi r^2$ obtained when the pupils match can be determined. The crossing point x0 of the two circles can be calculated from numerical equation 6.

$$S = \int \{x\sqrt{(r^2-x^2)} - [\delta - \sqrt{(r^2-x^2)}]\}dx \qquad \text{[Numerical equation 5]}$$

$$= [x\sqrt{(r^2-x^2)} + r^2\sin(x/r) - \delta x]$$

$$= 2[x_0\sqrt{(r^2-x_0^2)} + r^2\sin(x_0/r) - \delta x_0]$$

$$x_0 = \pm\sqrt{(r^2-\delta^2/4)} \qquad \text{[Numerical equation 6]}$$

For instance, if δ/r=0.1, then S/S0=93.6%, and if δ/r=0.2, then S/S0=87.3%.

It follows that for F8, tan θ=1/(2F)=0.0625, and for an angle difference of 0.1 degree, tan θ=0.00175. In this case, δ/r=0.00175/0.0625=0.028 was obtained, which means that S/S0=98.2%.

For an angle difference of 0.2 degrees, tan θ=0.00349 can be obtained by calculation similar to the above. In that case, δ/r=0.00349/0.0625=0.056 was obtained, which means that S/S0=96.4%. For 1 degree, δ/r=0.279 was obtained, which means that S/S0=82.3%. It can be seen from these results that at the first enlarged image side, an angle difference reduces the amount of light more significantly as an F-value is increased in comparison with that obtained at the image display element side.

Hereinafter, embodiments of a first projection optical unit and a second projection optical unit according to the present invention are described using more specific lens data.

First, embodiments of a first projection optical unit, based on more specific lens data, are described below.

Embodiment 1-1

Embodiment 1 of a first projection optical unit is described using FIGS. 3 to 12 and Table 1.

TABLE 1

| Surface No. | Radius of Curvature | Intersurface Distance | Glass Material |
| --- | --- | --- | --- |
| Object surface | ∞ | 6.528 | |
| 1 | ∞ | 31.342 | BSC7_HOYA |
| 2 | ∞ | 7.33 | |
| 3 | 190.8 | 6.1 | TAF3_HOYA |
| 4 | −55.5 | 0.2 | |
| 5 | 67.059 | 3.29 | TAF3_HOYA |
| 6 | 382.4 | 0.2 | |
| 7 | 34.8 | 3.61 | TAF3_HOYA |
| 8 | 60.172 | 9.7 | |
| 9 | −268.57 | 1 | EFD8_HOYA |
| 10 | 42.27 | 8.3 | |
| 11 | −439.45 | 0.8 | EFD8_HOYA |
| 12 | 17.976 | 3.02 | FCD1_HOYA |
| 13 | −40 | 0.2 | |

TABLE 1-continued

| Surface No. | Radius of Curvature | Intersurface Distance | Glass Material |
|---|---|---|---|
| 14 (Aperture stop surface) | 21.115 | 3.85 | BACD18_HOYA |
| 15 | 84.8 | 14.14 | |
| 16 | 50.616 | 6.92 | EFD4_HOYA |
| 17 | 25.943 | 9.39 | |
| 18 | −11.008 | 1.8 | FCD1_HOYA |
| 19 | 605.74 | 7.86 | |
| 20 | −72.6 | 14.58 | TAF3_HOYA |
| 21 | −28.1 | 0.2 | |
| 22 | 65.31 | 14.71 | TAF3_HOYA |
| 23 | 264.92 | 34.82 | |
| 24 | −31.65 | 5.11 | PMMA |
| 25 | −31.113 | 5 | |
| 1st enlarged image surface | ∞ | 0 | |

| Surface No. | K | A | B | C | D | E |
|---|---|---|---|---|---|---|
| 24 | 0 | 2.6583E−05 | −7.3374E−08 | 1.4933E−10 | −1.3814E−13 | 5.4234E−17 |
| 25 | 0 | 3.7074E−05 | −1.1429E−07 | 2.2442E−10 | −2.0717E−13 | 8.0805E−17 |

Figure 3:
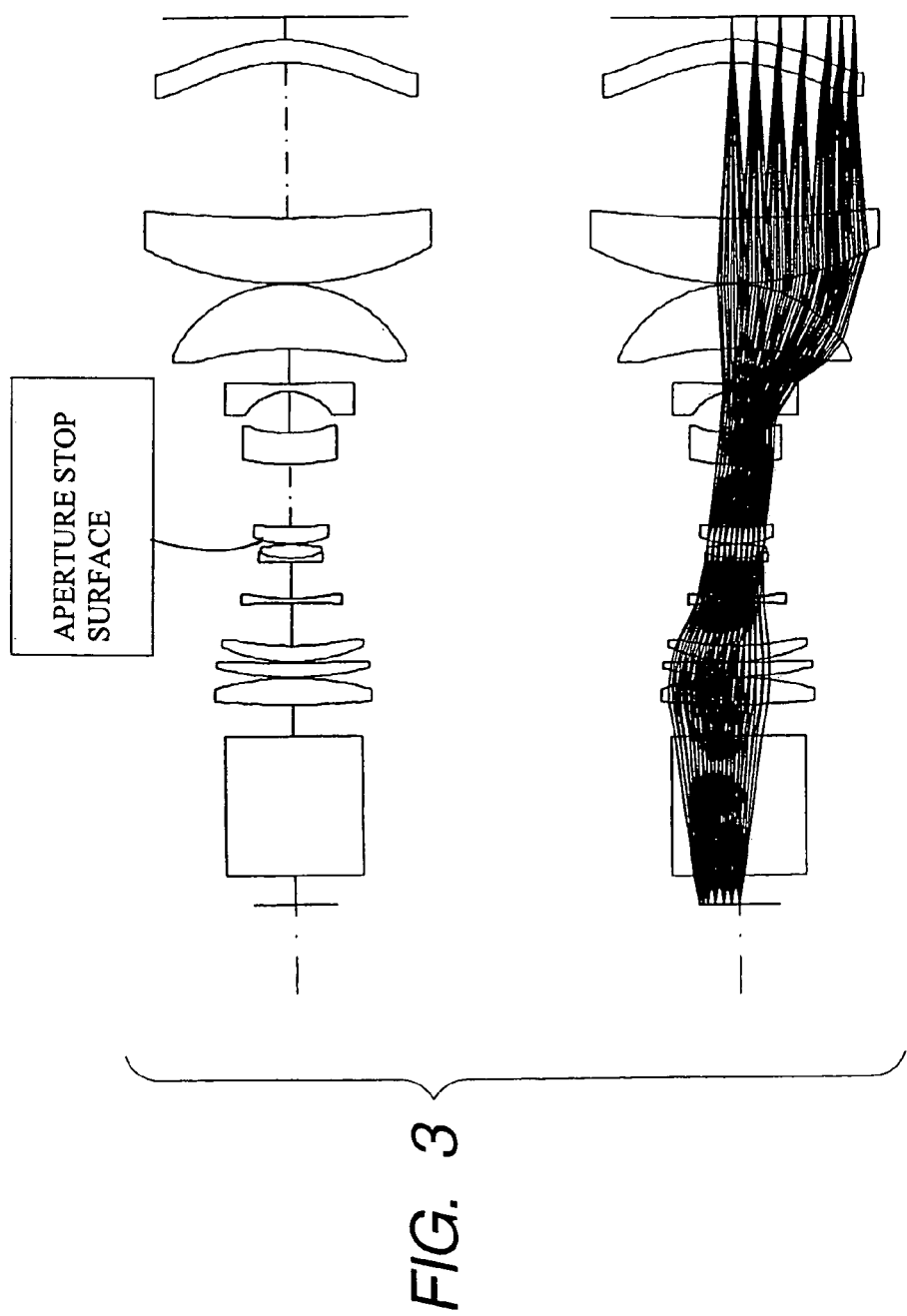
FIG. 3 is a configuration diagram of Embodiment 1 of a first projection optical unit according to the present invention.

FIG. 3 is a configuration diagram and spot diagram of a first projection optical unit. This figure indicates the way the luminous flux irradiated from an image display element in a telecentric state converges telecentrically at a first enlarged image side.

Table 1 lists lens data, with an object surface 0, No. 1 to No. 25 surfaces, and an image surface being listed in that order as surface numbers. A radius of curvature takes a positive value when a center of the curvature is present at the right of an optical axis, and takes a negative value in a reverse case. An intersurface distance is a distance from a lens surface to next lens surface, on the optical axis.

The No. 24 and No. 25 surfaces are aspheric surfaces expressed by the following aspherical equation, and values of the respective aspherical coefficients are listed in the table:

$$z=(y^2/r)/\{1+\sqrt{(1-(1+K)y^2/r^2)}\}+A\cdot h^4+B\cdot h^6+C\cdot h^8+D\cdot h^{10}+E\cdot h^{12}$$

Figure 4:
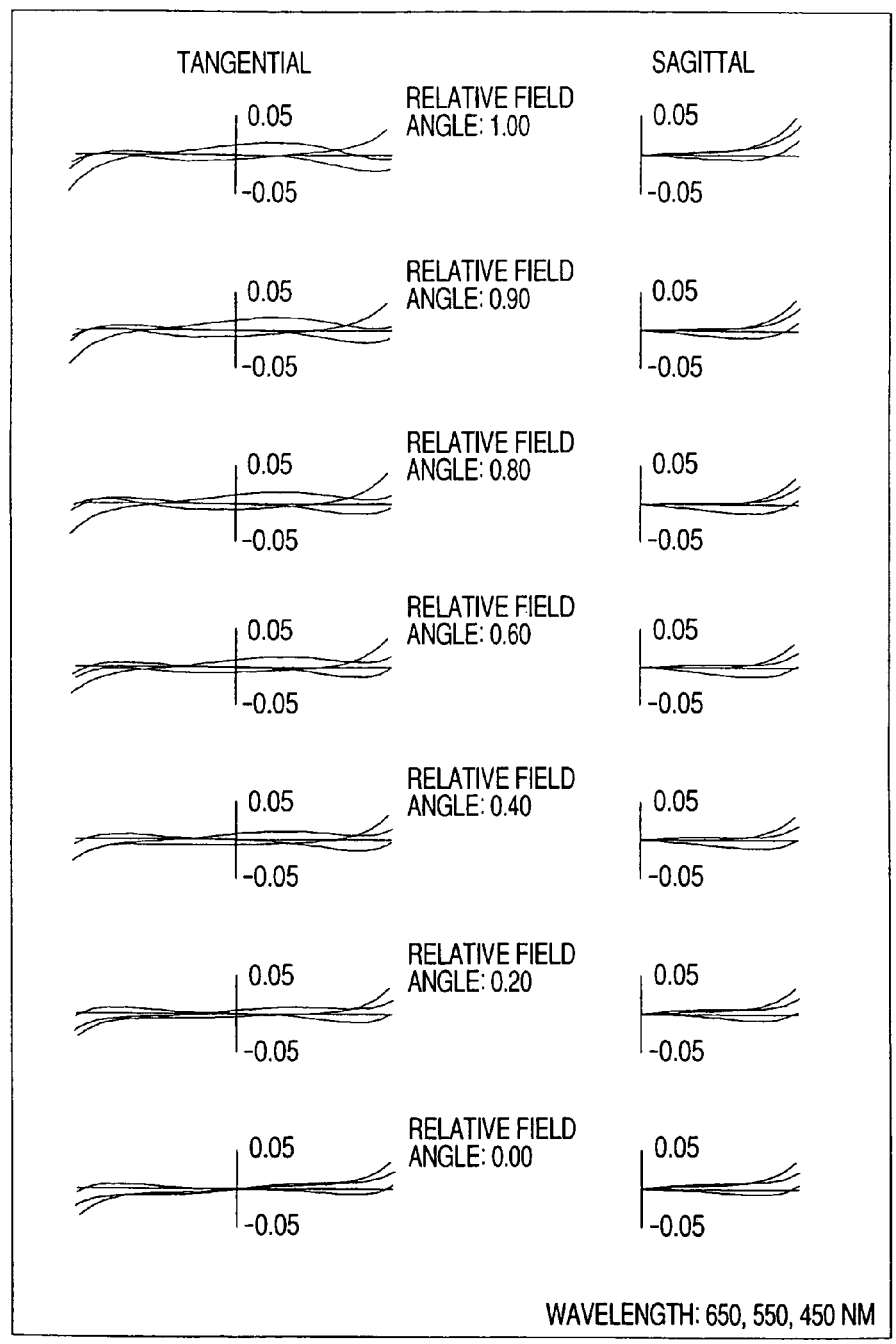
FIG. 4 is a diagram showing the aberration of white light rays in Embodiment 1 of the first projection optical unit according to the present invention.
Figure 5:
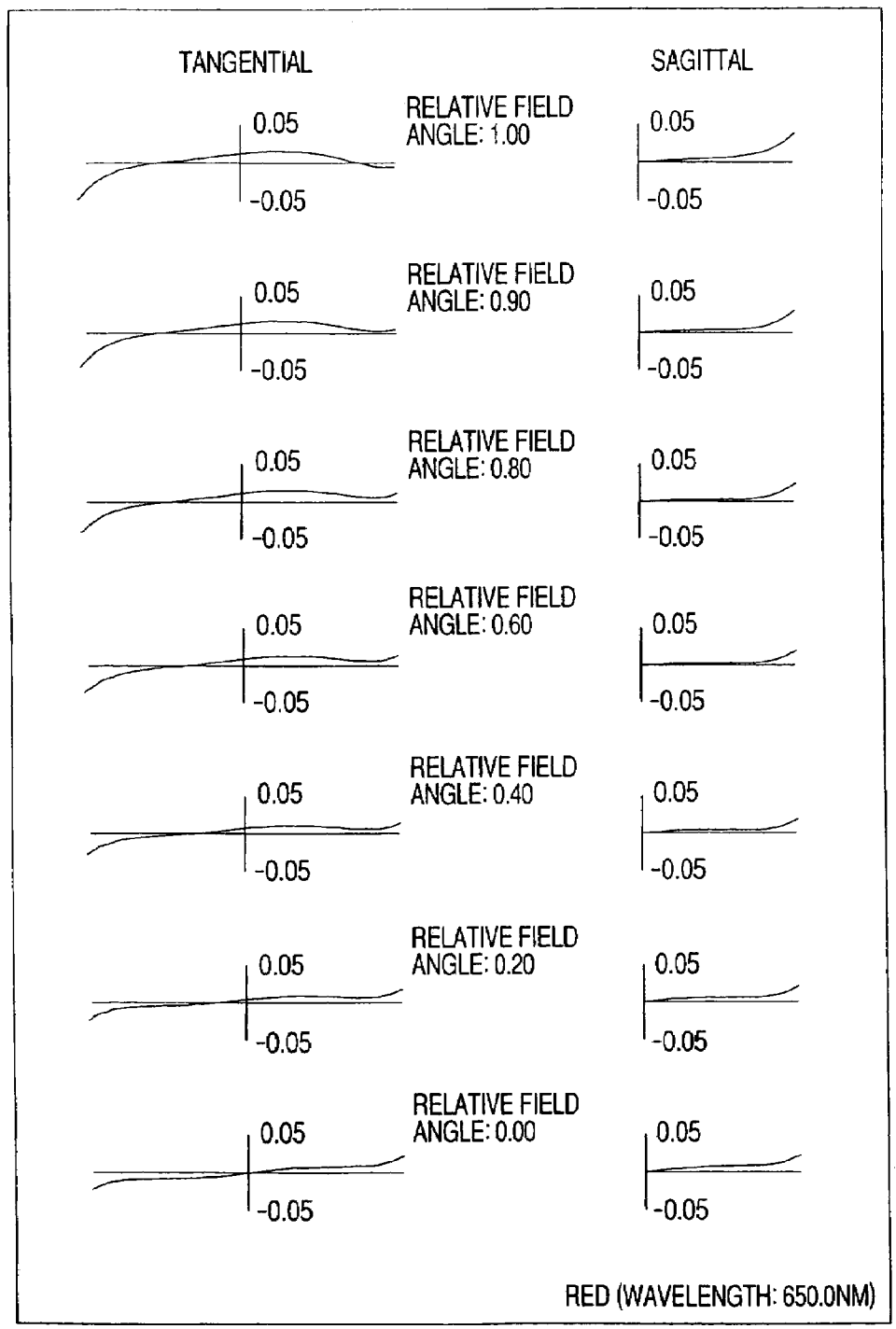
FIG. 5 is a diagram showing the aberration of red light rays in Embodiment 1 of the first projection optical unit according to the present invention.
Figure 6:
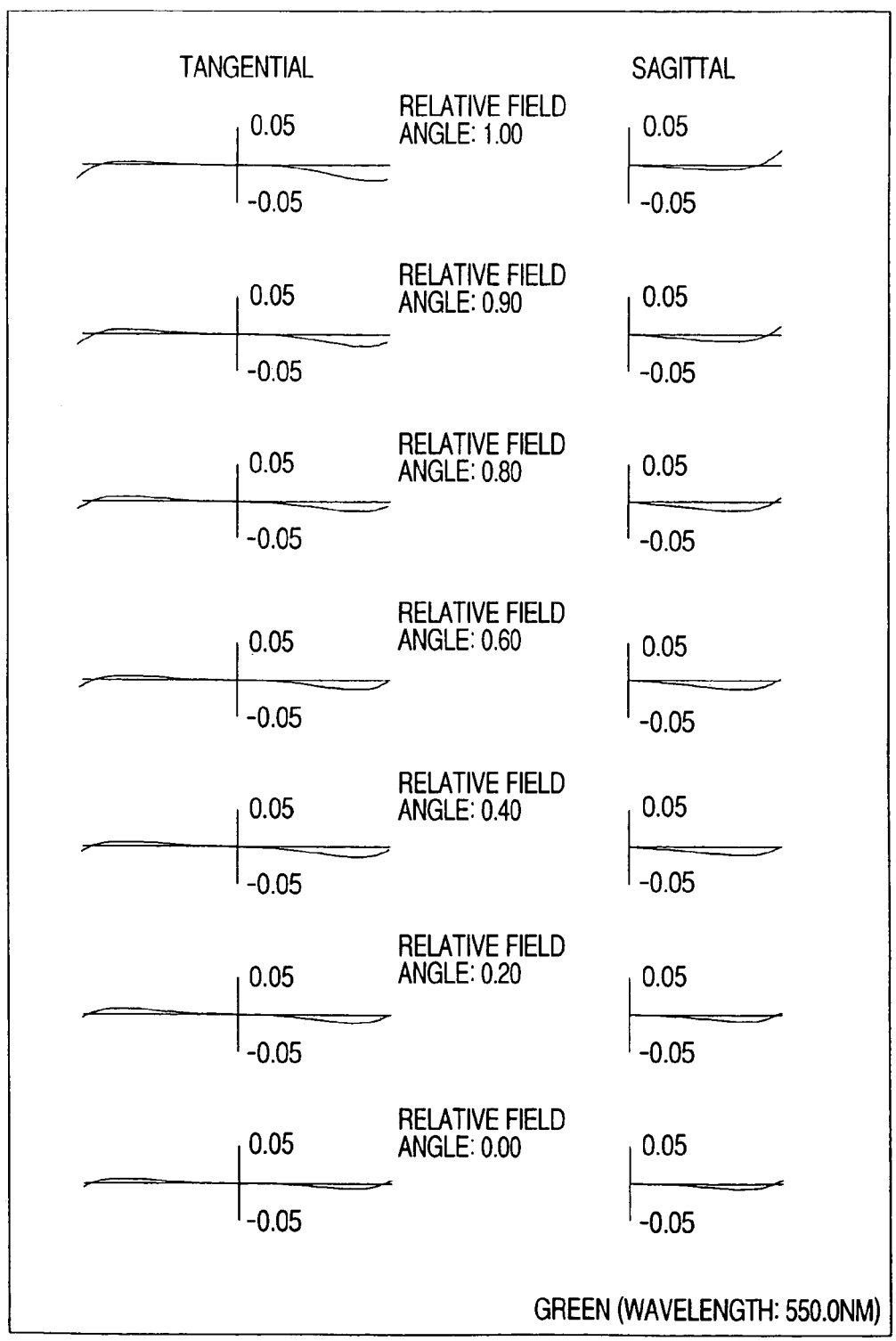
FIG. 6 is a diagram showing the aberration of green light rays in Embodiment 1 of the first projection optical unit according to the present invention.
Figure 7:
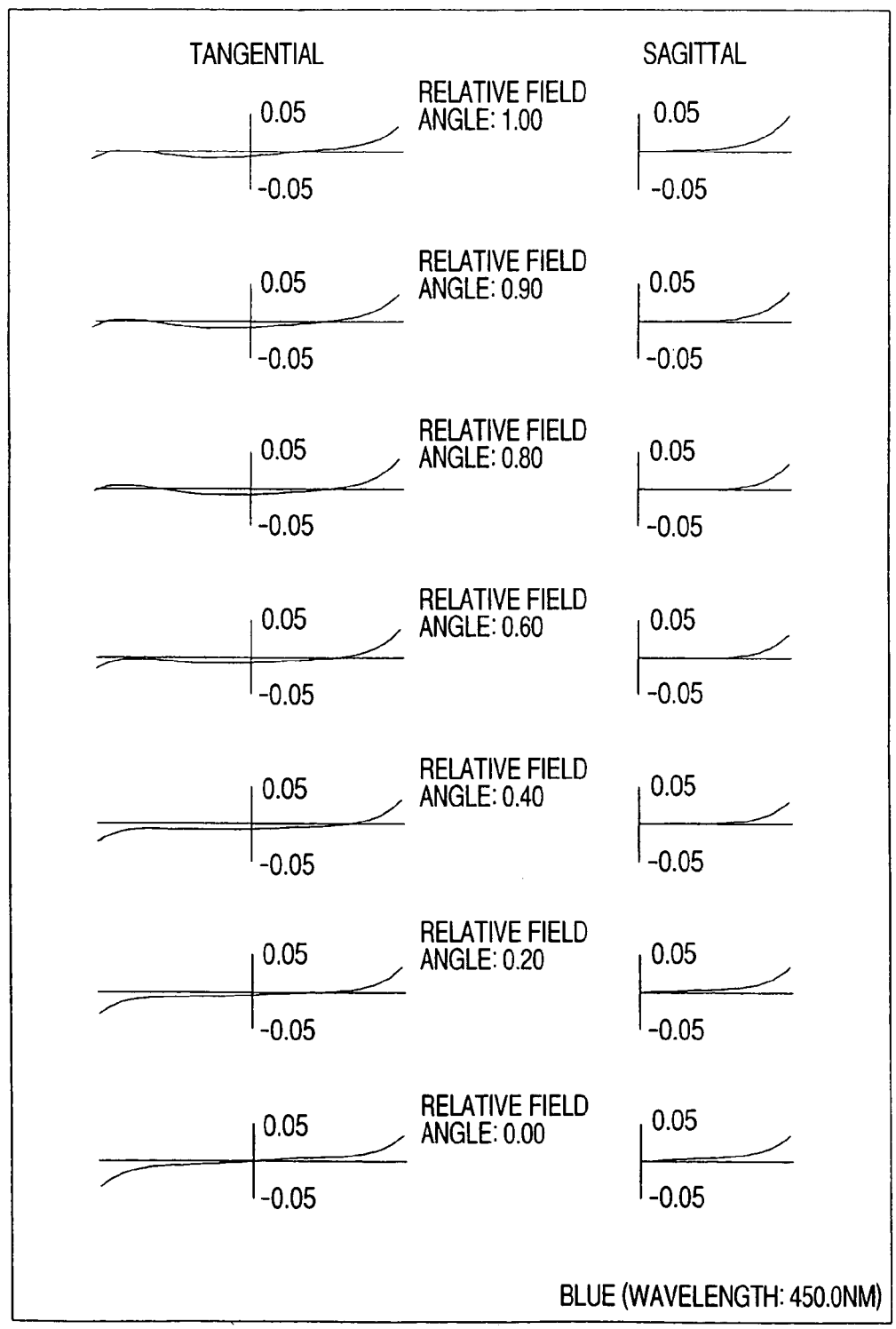
FIG. 7 is a diagram showing the aberration of blue light rays in Embodiment 1 of the first projection optical unit according to the present invention.

FIGS. 4 to 7 are diagrams showing how aberration occurs in Embodiment 1. FIG. 4 is an aberration diagram of the white light rays formed by synthesizing the rays having wavelengths of 650 nm, 550 nm, and 450 nm, wherein chromatic aberration is also shown so as to be understandable at the same time. FIG. 5 is an aberration diagram of red light rays at the wavelength of 650 nm, FIG. 6 an aberration diagram of green light rays at the wavelength of 550 nm, and FIG. 7 an aberration diagram of blue light rays at the wavelength of 450 nm. These diagrams are shown in units of 0.05 mm, and each of the diagrams indicates the way the rays are well aberration-corrected.

Figure 8:
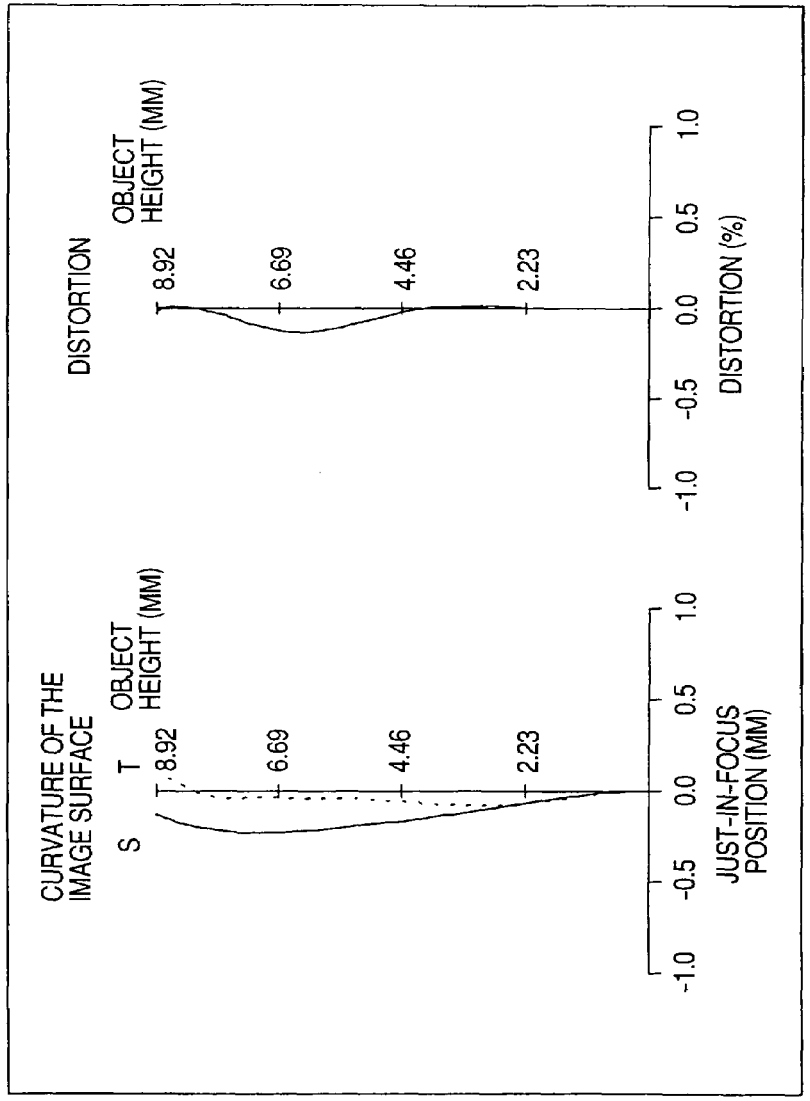
FIG. 8 is a diagram showing the astigmatism and distortion occurring in Embodiment 1 of the first projection optical unit according to the present invention.

FIG. 8 is a diagram of the astigmatism, and changes in distortion ratio, occurring in Embodiment 1. This diagram shows favorable data, with distortion ratios not greater than 0.1%.

Figure 9:
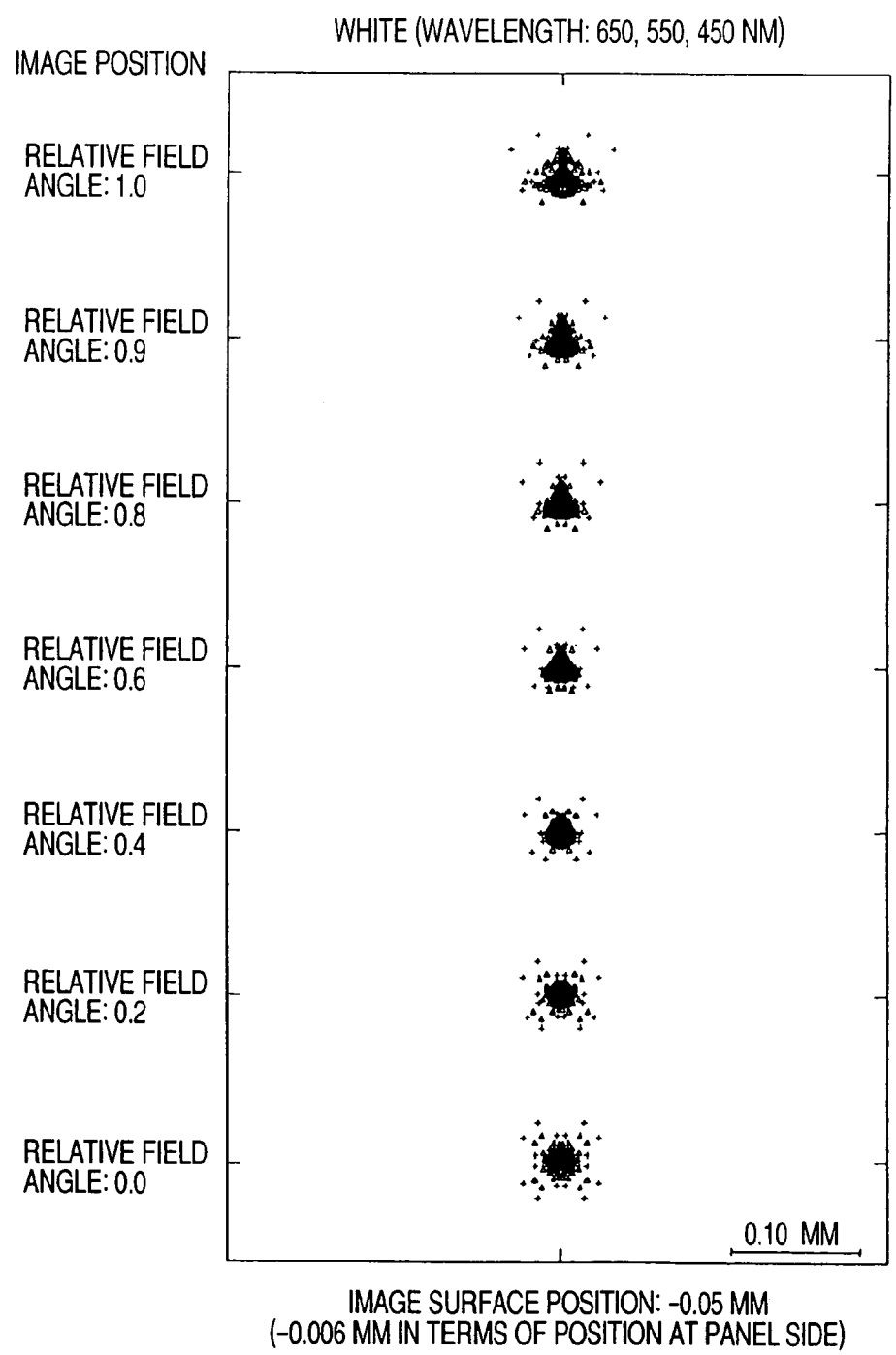
FIG. 9 is a spot diagram of white light rays in Embodiment 1 of the first projection optical unit according to the present invention.
Figure 10:
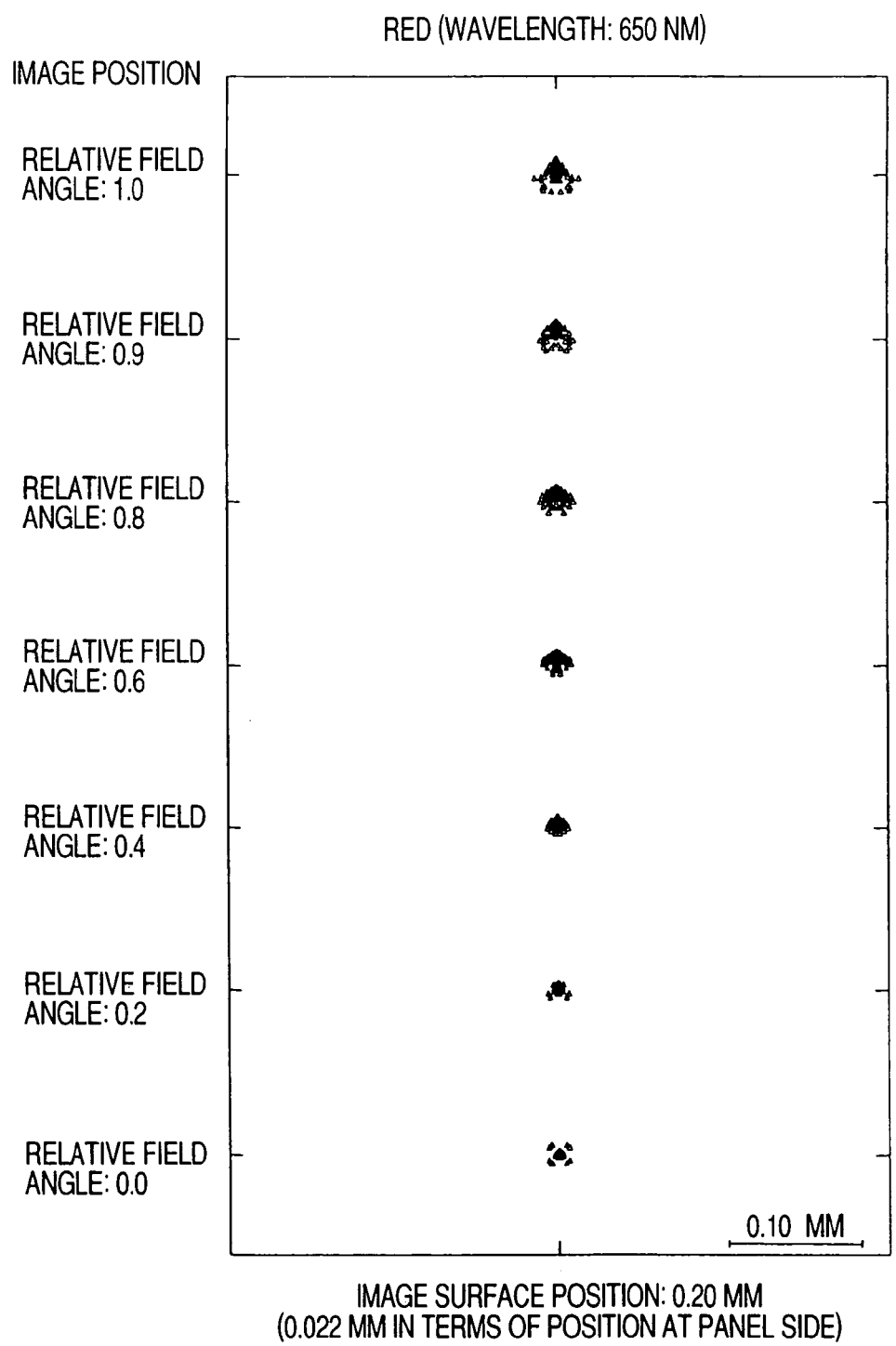
FIG. 10 is a spot diagram of red light rays in Embodiment 1 of the first projection optical unit according to the present invention.
Figure 11:
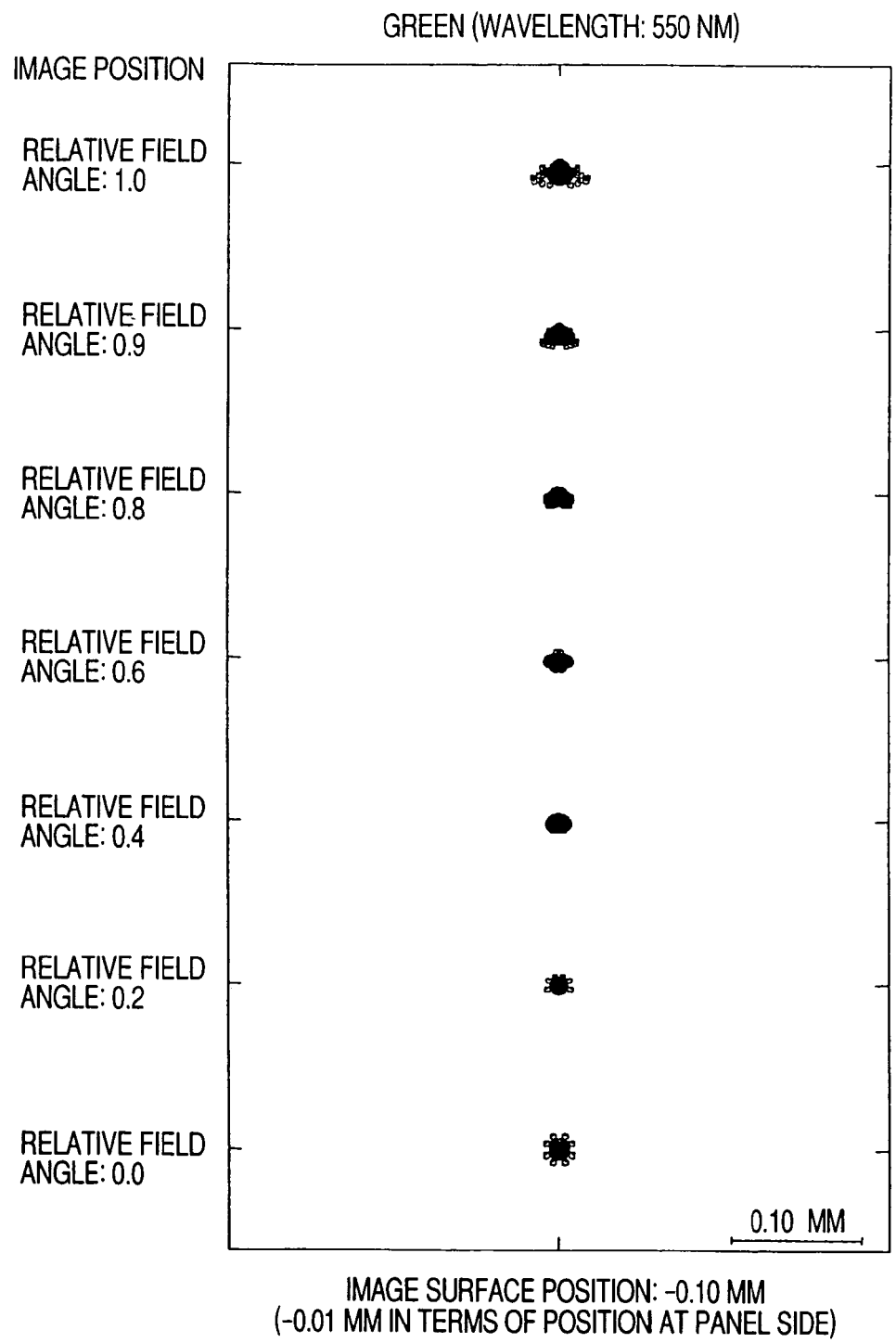
FIG. 11 is a spot diagram of green light rays in Embodiment 1 of the first projection optical unit according to the present invention.
Figure 12:
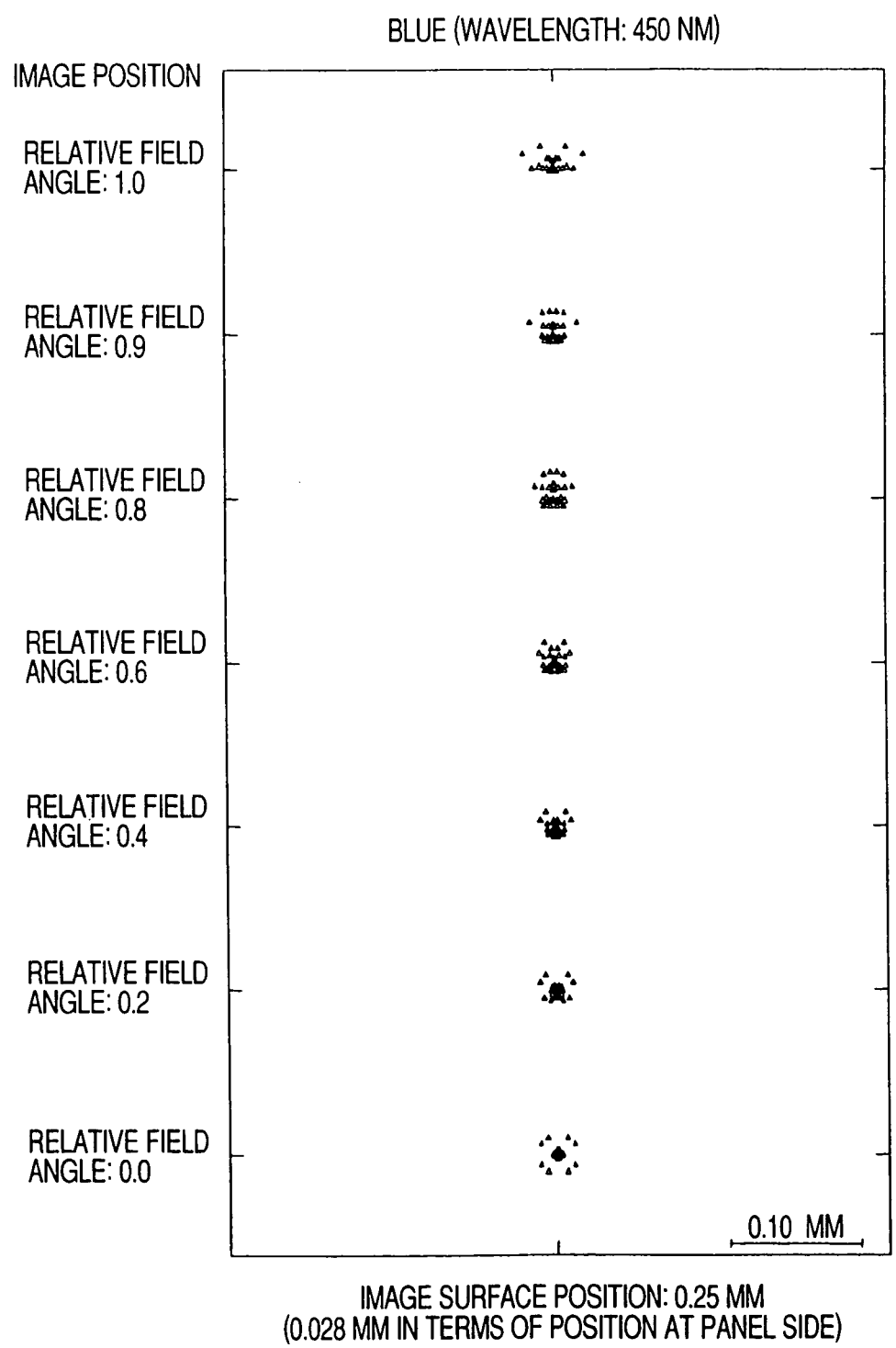
FIG. 12 is a spot diagram of blue light rays in Embodiment 1 of the first projection optical unit according to the present invention.

FIGS. 9 to 12 are spot diagrams pertaining to Embodiment 1. FIG. 9 is a spot diagram of the white light rays formed by synthesizing the rays having wavelengths of 650 nm, 550 nm, and 450 nm, wherein chromatic aberration is also shown so as to be understandable at the same time. FIG. 10 is a spot diagram of red light rays at the wavelength of 650 nm, FIG. 11 a spot diagram of green light rays at the wavelength of 550 nm, and FIG. 12 a spot diagram of blue light rays at the wavelength of 450 nm. These diagrams are shown in units of 0.1 mm, and each of the diagrams indicates the way the rays are well aberration-corrected.

A projection image display apparatus according to the present invention is adapted so that an image display element for red, an image display element for green, and an image display element for blue can each be adjusted to the optimum position independently. The above spot diagrams represent the spots at the particular optimum position.

Embodiment 1-2

Embodiment 2 of a first projection optical unit is described below using FIGS. 13 to 22 and Table 2.

TABLE 2

| Surface No. | Radius of Curvature | Intersurface Distance | Glass Material |
|---|---|---|---|
| Object Surface | ∞ (Panel surface) | 6.528 | |
| 1 | ∞ | 31.342 | BSC7_H0YA |
| 2 | ∞ | 7.33 | |
| 3 | 176.2237 | 6.1 | TAF3_HOYA |
| 4 | −46.36 | 0.2 | |
| 5 | 36.3345 | 3.99 | TAF3_HOYA |
| 6 | 106.5 | 0.2 | |
| 7 | 58.895 | 2.82 | TAF3_HOYA |
| 8 | 65.436 | 6.87 | |
| 9 | −79.8273 | 1 | EFD8_HOYA |
| 10 | 297.8 | 9.88 | |
| 11 | −102.38 | 0.8 | EFD8_HOYA |
| 12 | 15.9636 | 3.02 | FCD1_HOYA |
| 13 | −32.73 | 0.2 | |
| 14 (Aperture stop surface) | 18.6502 | 3.85 | BACD18_HOYA |
| 15 | 31.1066 | 17.97 | |
| 16 | 23.91 | 7.5 | EFD4_HOYA |
| 17 | 19.5 | 7.54 | |
| 18 | −11.25378321 | 1.8 | FCD1_HOYA |
| 19 | 217.63 | 11.35 | |
| 20 | −75 | 13.47 | TAF3_HOYA |
| 21 | −30.6814 | 0.2 | |
| 22 | 57.0473 | 11.85 | TAF3_HOYA |
| 23 | 305.5642 | 22.95 | |
| 24 | −37.4072 | 3.5 | PMMA |
| 25 | −48.9025 | 7.876 | |
| 1st enlarged image surface | ∞ (Image surface) | 0 | |

| Surface No. | K | A | B | C | D | E |
| --- | --- | --- | --- | --- | --- | --- |
| 24 | 0 | 3.4526E−05 | −3.6247E−08 | 3.3065E−11 | −1.4755E−14 | 3.6803E−18 |
| 25 | 0 | 3.5425E−05 | −5.1937E−08 | 8.6015E−11 | −9.3416E−14 | 5.0304E−17 |

Figure 13:
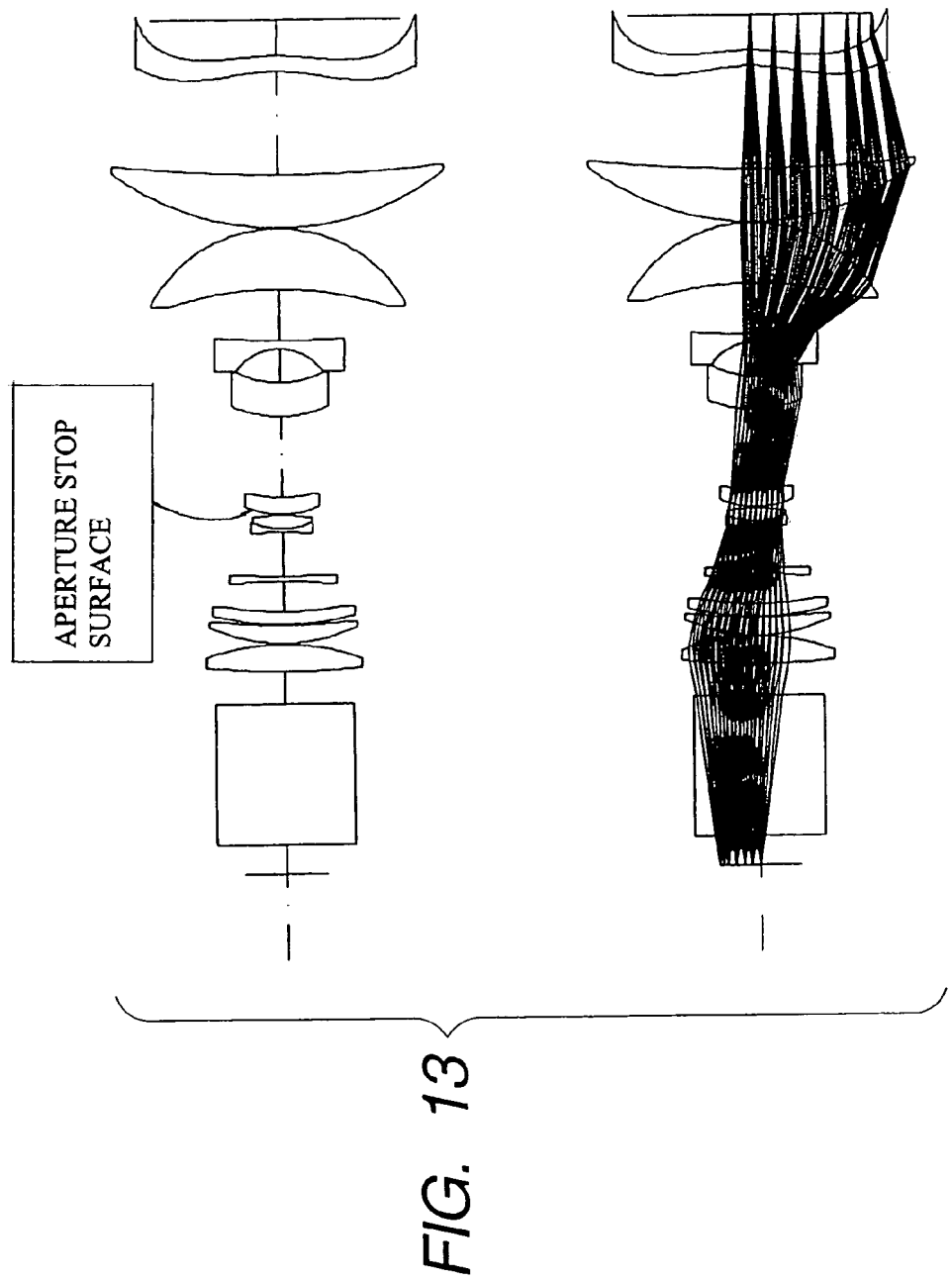
FIG. 13 is a configuration diagram of Embodiment 2 of a first projection optical unit according to the present invention.

FIG. 13 is a configuration diagram and spot diagram of Embodiment 2 of a first projection optical unit according to the present invention. This figure indicates the way the luminous flux irradiated from an image display element in a telecentric state converges telecentrically at a first enlarged image side.

Table 2 lists lens data, with an object surface 0, No. 1 to No. 25 surfaces, and an image surface being listed in that order as surface numbers. A radius of curvature takes a positive value when a center of the curvature is present at the right of an optical axis, and takes a negative value in a reverse case. An intersurface distance is a distance from a lens surface to next lens surface, on the optical axis.

The No. 24 and No. 25 surfaces are aspheric surfaces expressed by the following aspherical equation, and values of the respective aspherical coefficients are listed in Table 2:

$$z = (y^2/r) / \{1 + \sqrt{(1-(1+K)y^2/r^2)}\} + A \cdot h^4 + B \cdot h^6 + C \cdot h^8 + D \cdot h^{10} + E \cdot h^{12}$$

Figure 14:
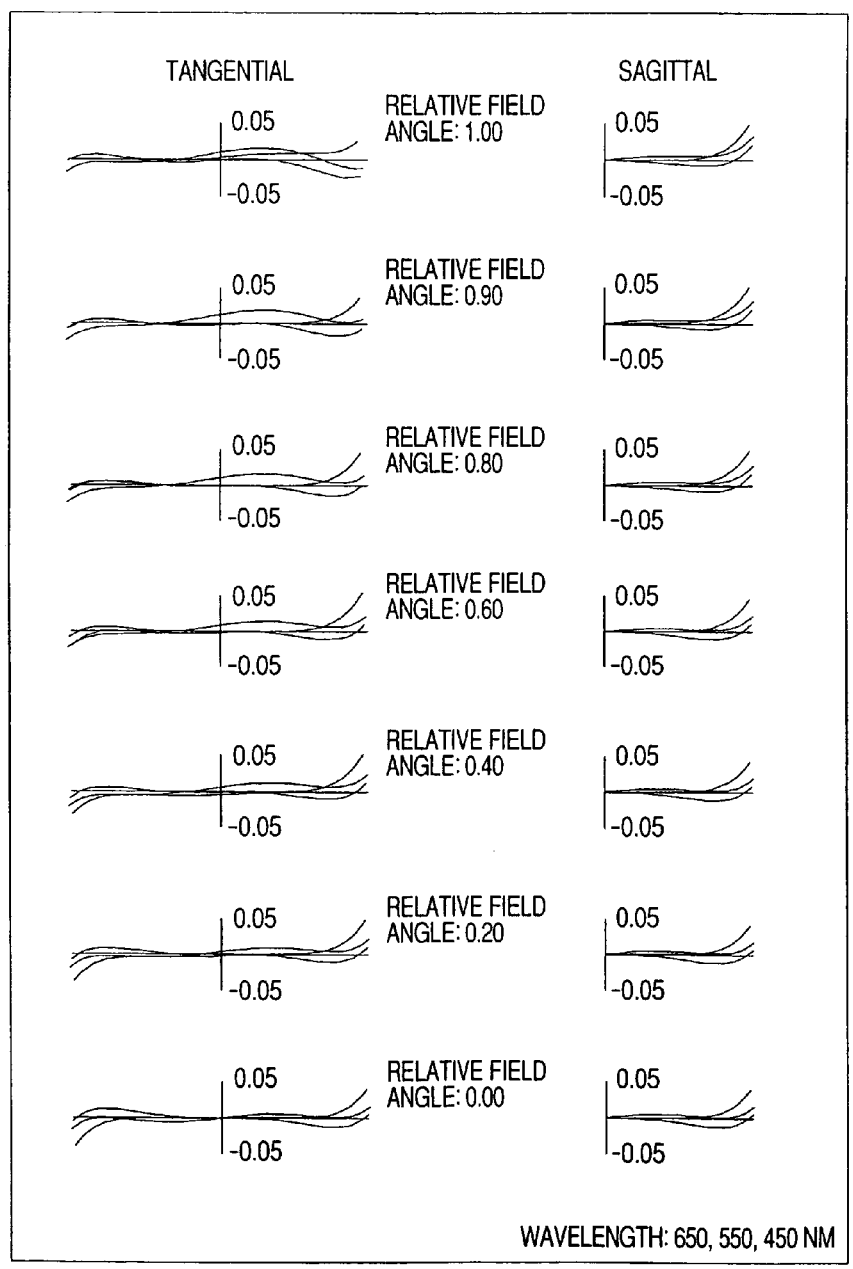
FIG. 14 is a diagram showing the aberration of white light rays in Embodiment 2 of the first projection optical unit according to the present invention.
Figure 15:
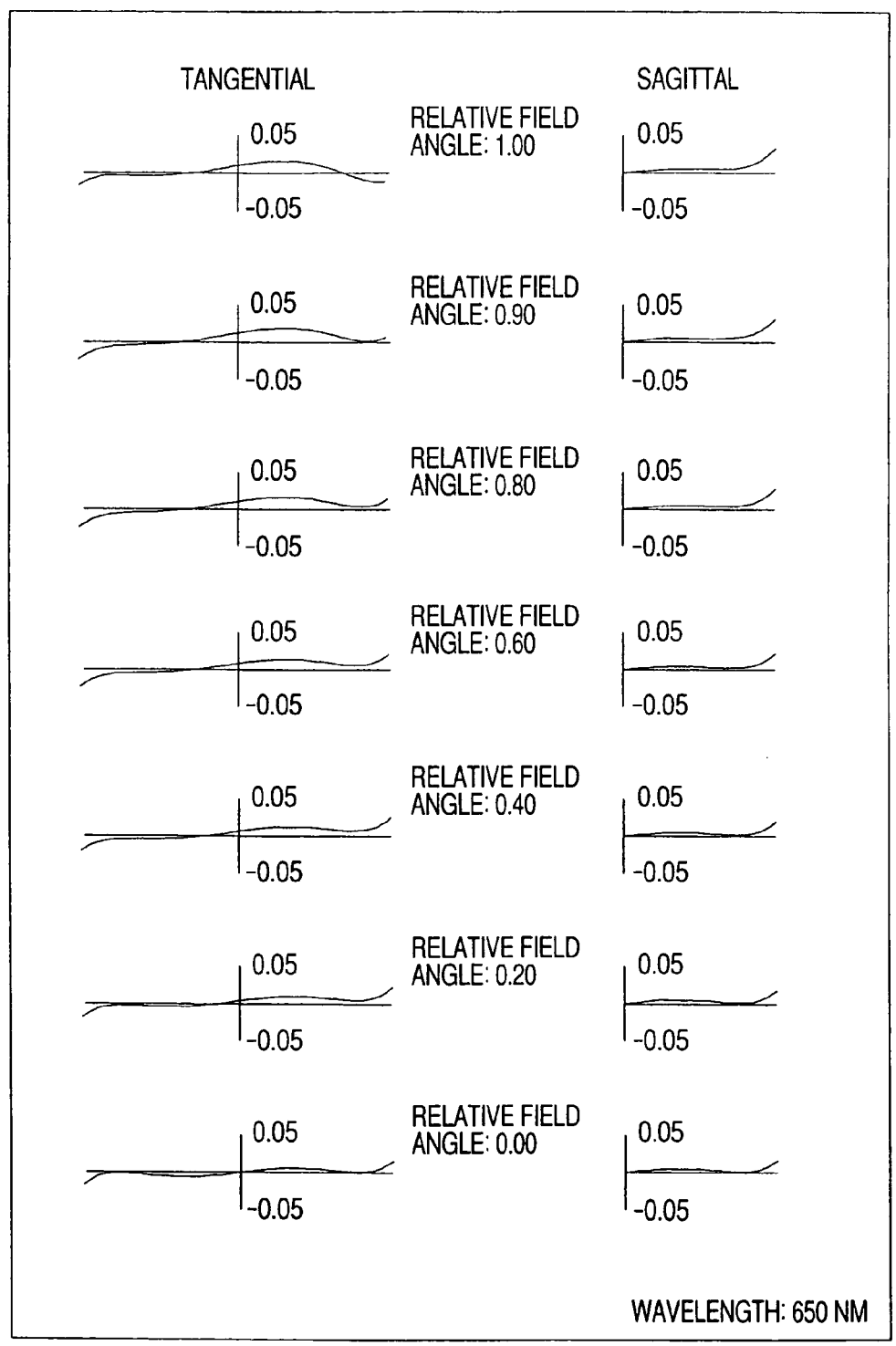
FIG. 15 is a diagram showing the aberration of red light rays in Embodiment 2 of the first projection optical unit according to the present invention.
Figure 16:
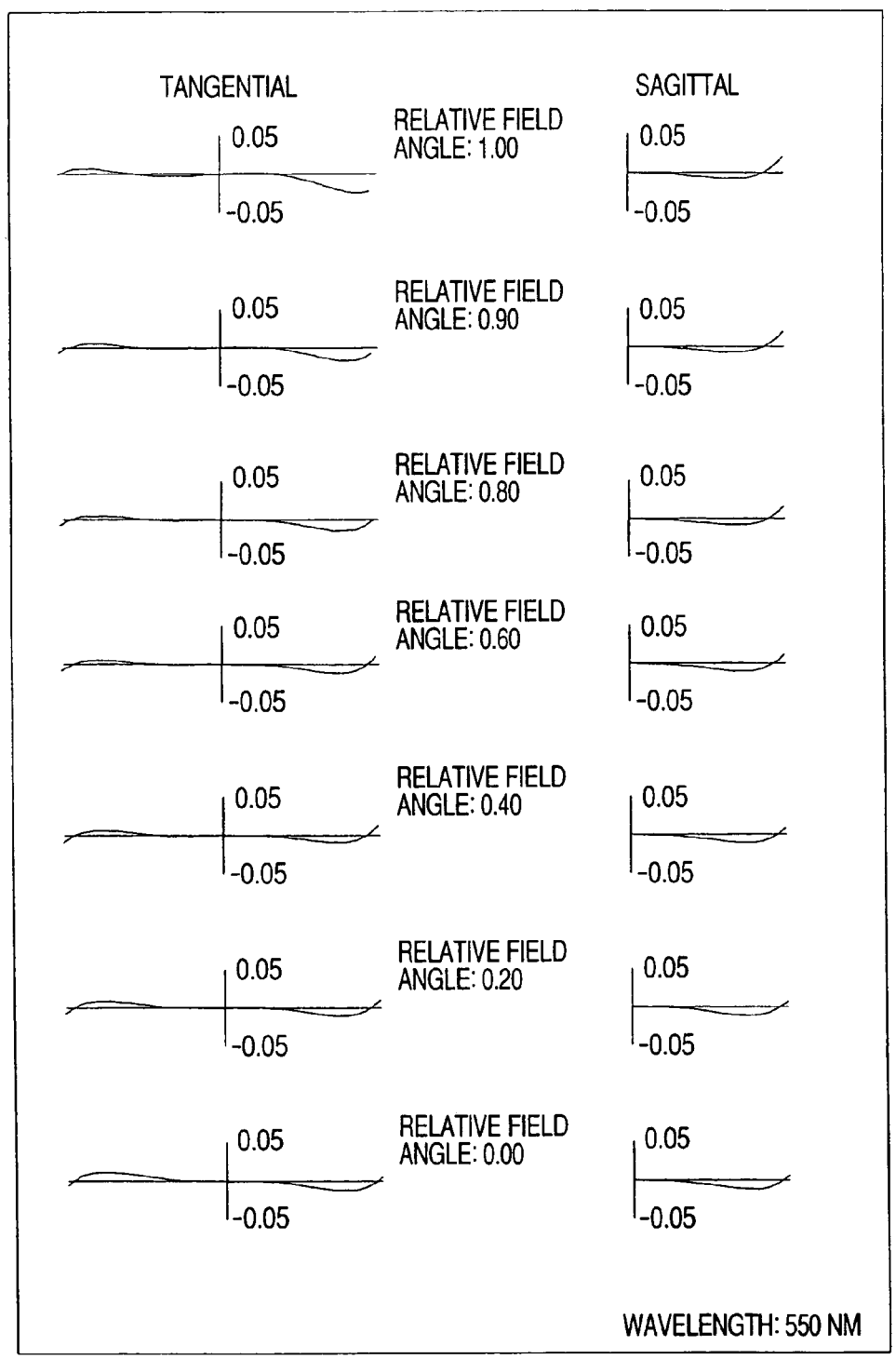
FIG. 16 is a diagram showing the aberration of green light rays in Embodiment 2 of the first projection optical unit according to the present invention.
Figure 17:
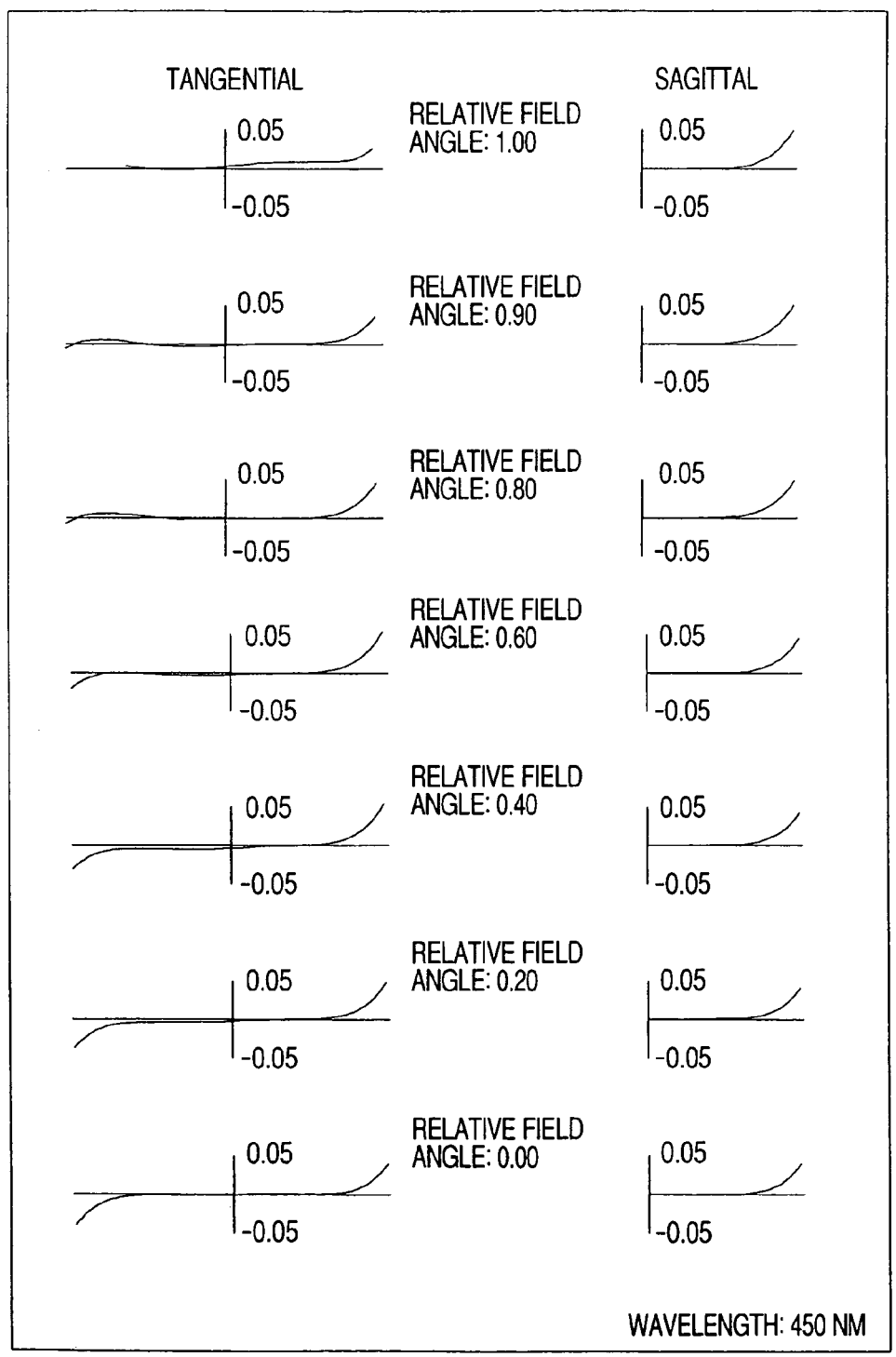
FIG. 17 is a diagram showing the aberration of blue light rays in Embodiment 2 of the first projection optical unit according to the present invention.

FIGS. 14 to 17 are diagrams showing how aberration occurs in Embodiment 2. FIG. 14 is an aberration diagram of the white light rays formed by synthesizing the rays having wavelengths of 650 nm, 550 nm, and 450 nm, wherein chromatic aberration is also shown so as to be understandable at the same time. FIG. 15 is an aberration diagram of red light rays at the wavelength of 650 nm, FIG. 16 an aberration diagram of green light rays at the wavelength of 550 nm, and FIG. 17 an aberration diagram of blue light rays at the wavelength of 450 nm. These diagrams are shown in units of 0.05 mm, and each of the diagrams indicates the way the rays are well aberration-corrected.

Figure 18:
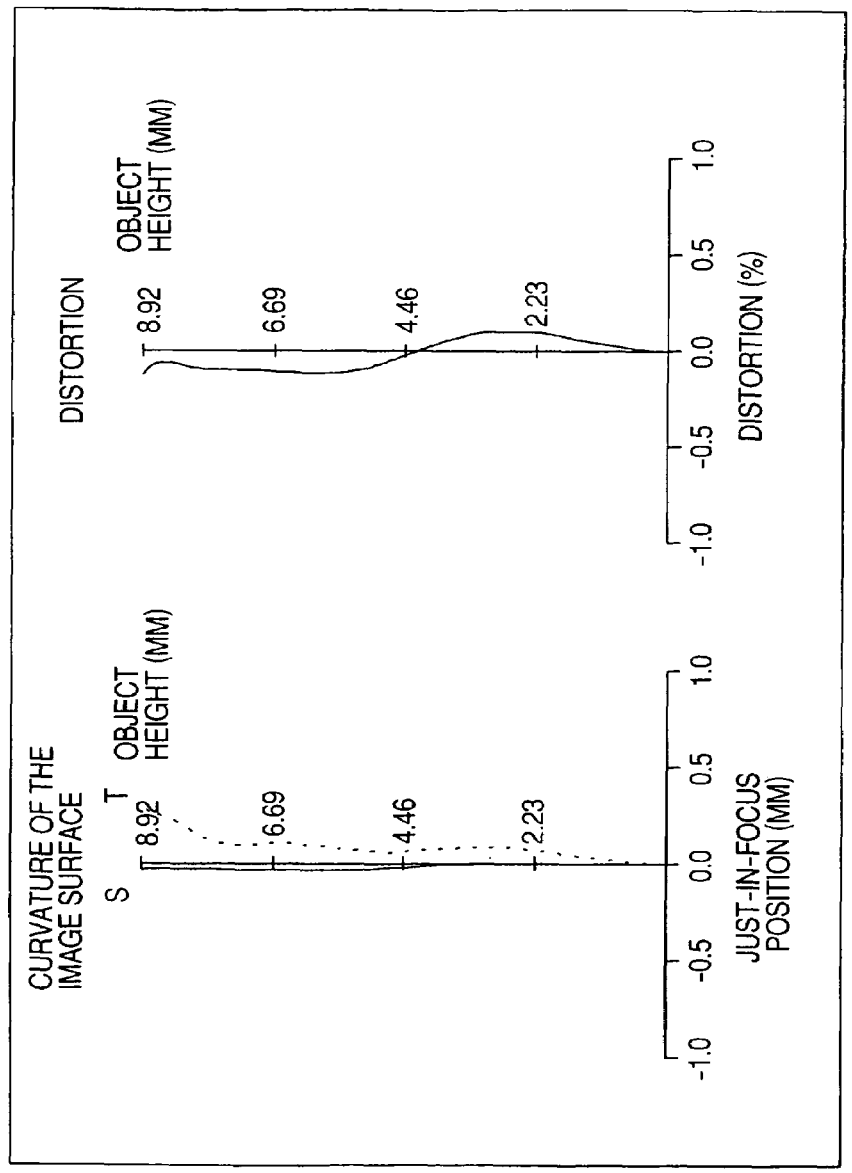
FIG. 18 is a diagram showing the astigmatism and distortion occurring in Embodiment 2 of the first projection optical unit according to the present invention.

FIG. 18 is a diagram of the astigmatism, and changes in distortion ratio, occurring in Embodiment 2. This diagram shows favorable data, with distortion ratios not greater than 0.1%.

Figure 19:
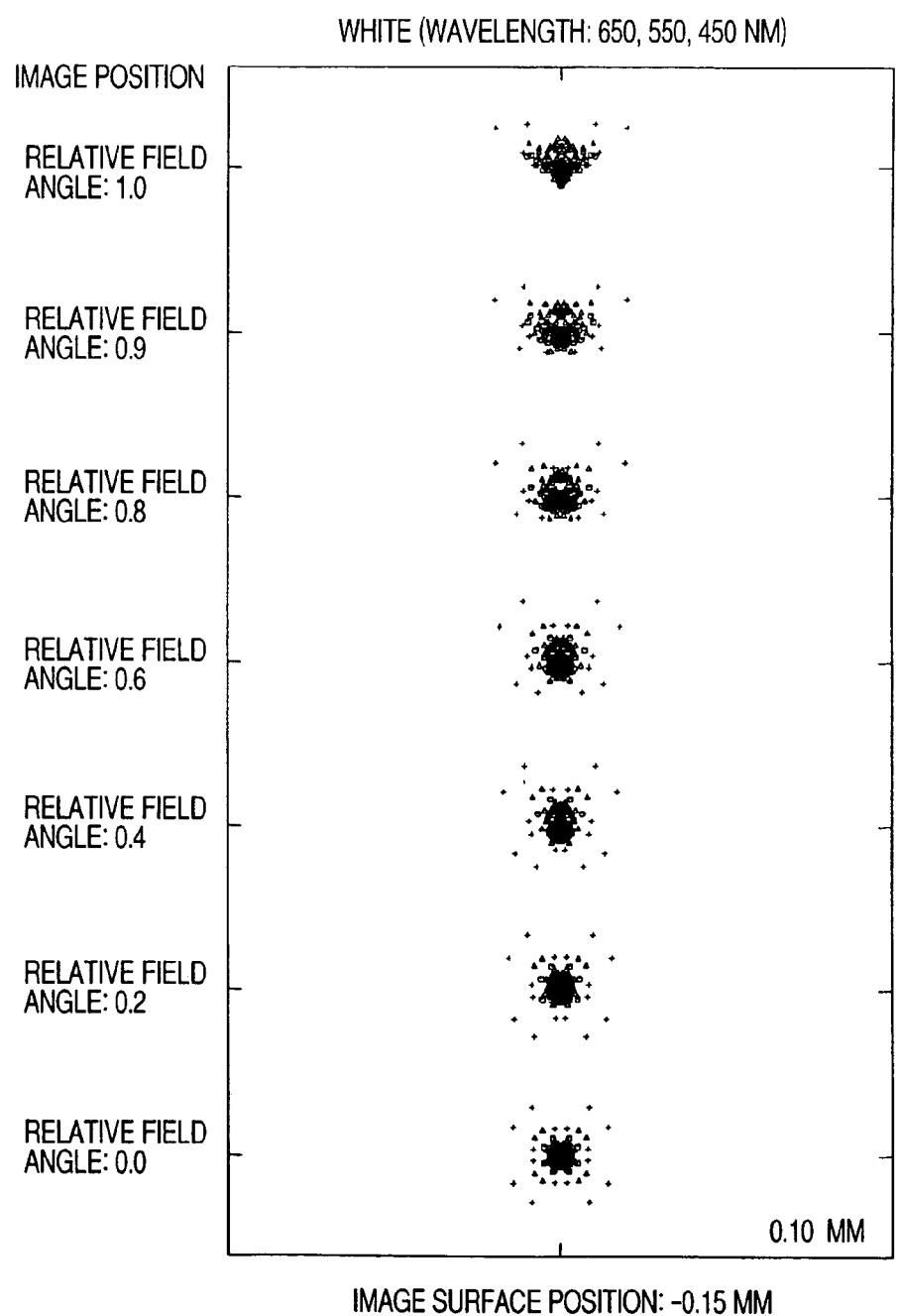
FIG. 19 is a spot diagram of white light rays in Embodiment 2 of the first projection optical unit according to the present invention.
Figure 20:
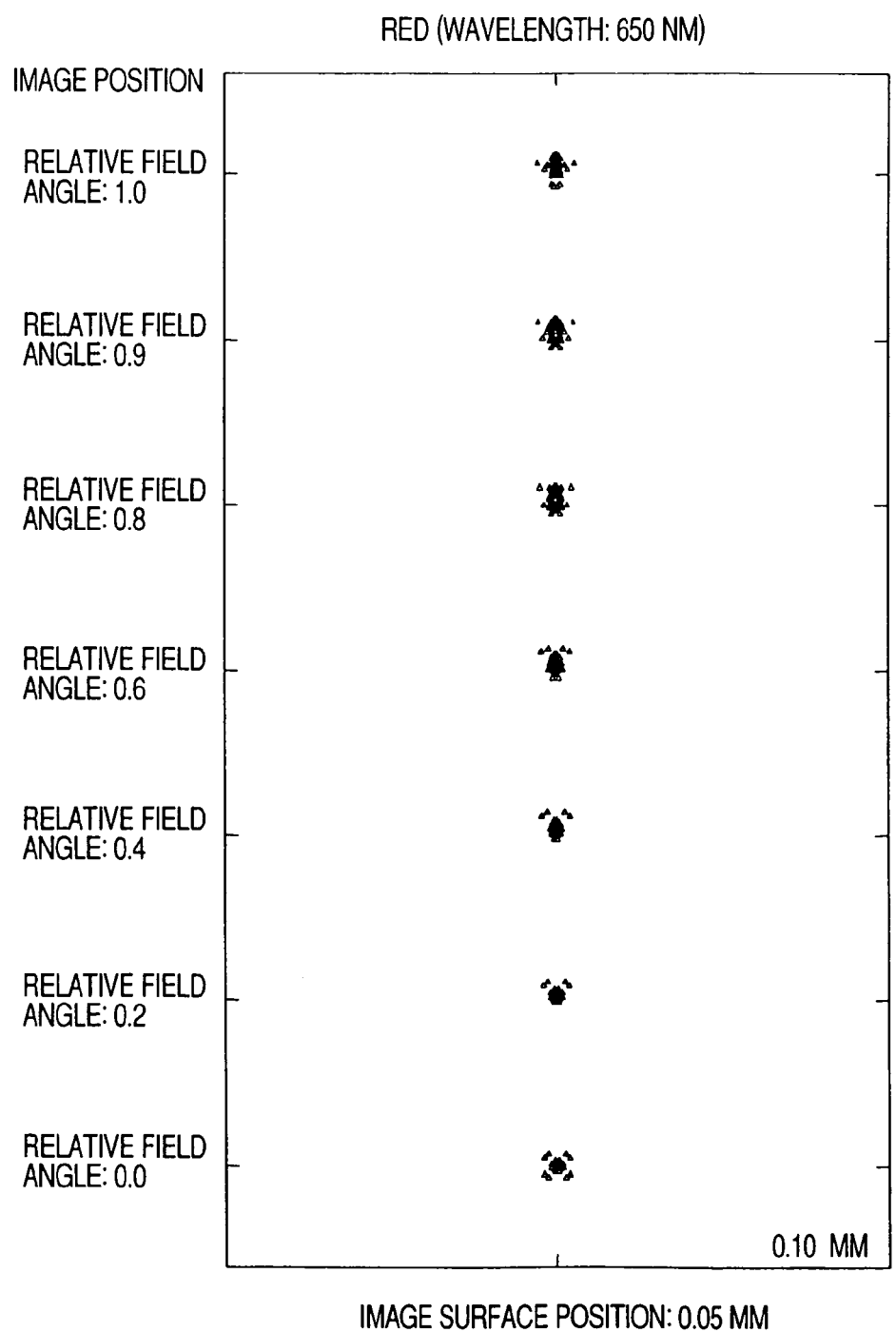
FIG. 20 is a spot diagram of red light rays in Embodiment 2 of the first projection optical unit according to the present invention.
Figure 21:
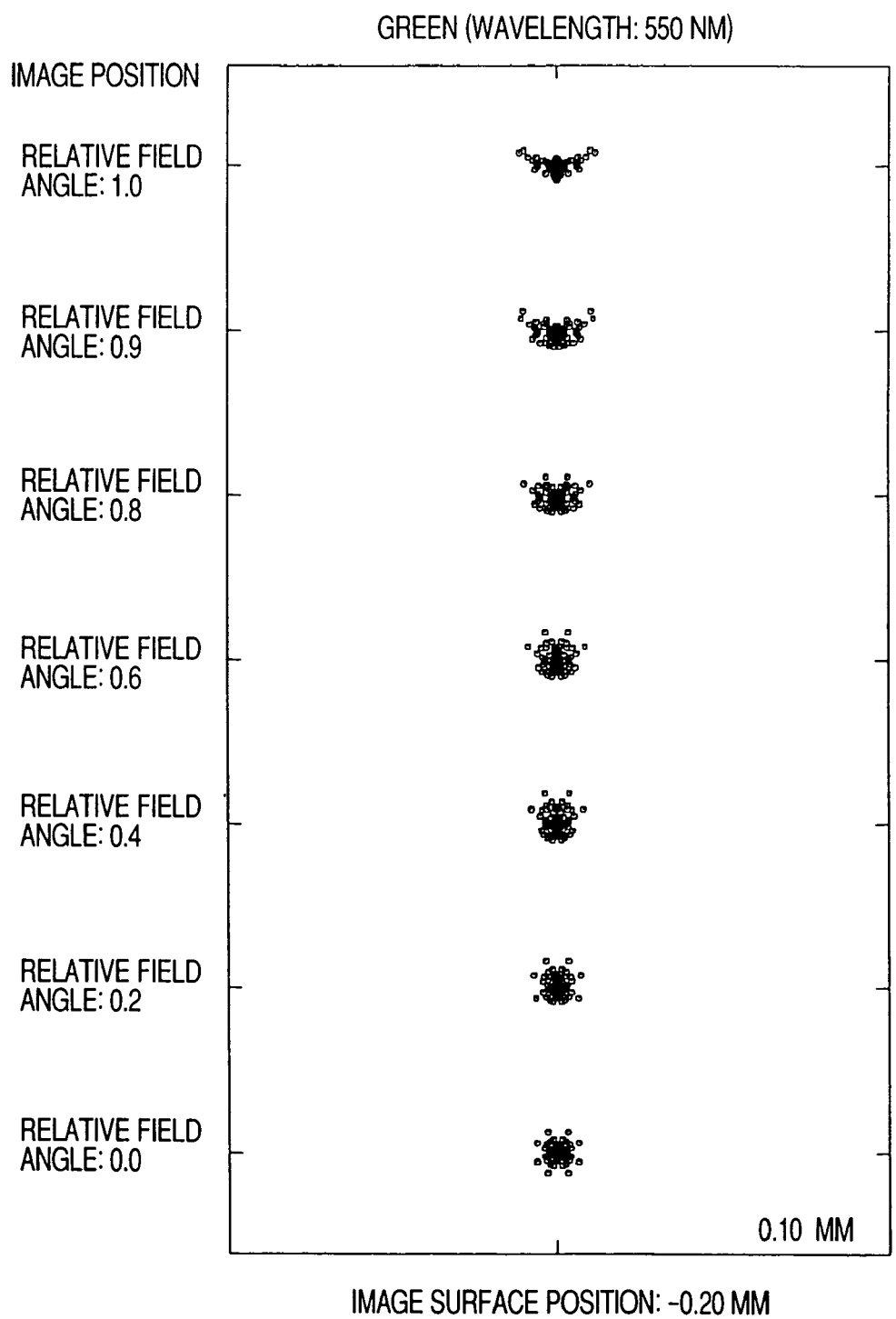
FIG. 21 is a spot diagram of green light rays in Embodiment 2 of the first projection optical unit according to the present invention.
Figure 22:
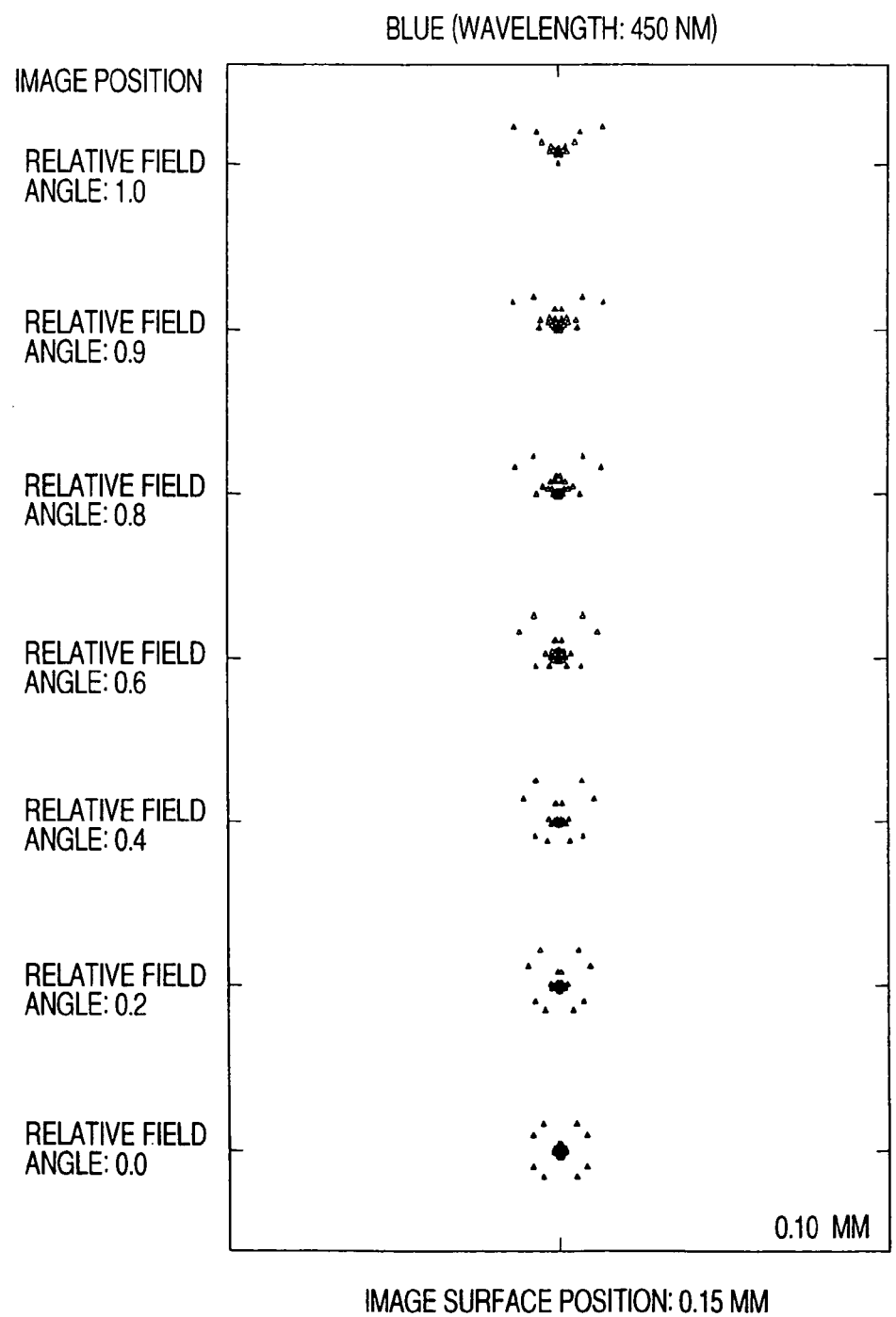
FIG. 22 is a spot diagram of blue light rays in Embodiment 2 of the first projection optical unit according to the present invention.

FIGS. 19 to 22 are spot diagrams pertaining to Embodiment 2. FIG. 19 is a spot diagram of the white light rays formed by synthesizing the rays having wavelengths of 650 nm, 550 nm, and 450 nm, wherein chromatic aberration is also shown so as to be understandable at the same time. FIG. 20 is a spot diagram of red light rays at the wavelength of 650 nm, FIG. 21 a spot diagram of green light rays at the wavelength of 550 nm, and FIG. 22 a spot diagram of blue light rays at the wavelength of 450 nm. These diagrams are shown in units of 0.1 mm, and each of the diagrams indicates the way the rays are well aberration-corrected.

A projection image display apparatus according to the present invention is adapted so that an image display element for red, an image display element for green, and an image display element for blue can each be adjusted to the optimum position independently. The above spot diagrams represent the spots at the particular optimum position.

Embodiment 1-3

Embodiment 3 of a first projection optical unit is described below using FIGS. 23 to 32 and Table 3.

TABLE 3

| Surface No. | Radius of Curvature | Intersurface Distance | Glass Material |
| --- | --- | --- | --- |
| Object surface | ∞ | 6.5280 | |
| 1 | ∞ | 31.342 | BSC7_HOYA |
| 2 | ∞ | 7.33 | |
| 3 | 127.7052 | 6.1 | TAF3_HOYA |
| 4 | −49.5508 | 0.2 | |
| 5 | 34.2747 | 4.1764 | TAF3_HOYA |
| 6 | 104.1570 | 0.2 | |
| 7 | 31.6237 | 5.7931 | TAF3_HOYA |
| 8 | 34.6721 | 5.1651 | |
| 9 | 741.7637 | 1.8 | EFD8_HOYA |
| 10 | 32.1716 | 5.8572 | |
| 11 | −33.5433 | 0.5618 | EFD8_HOYA |
| 12 | 15.4628 | 2.7796 | FCD1_HOYA |
| 13 | −27.3183 | 0.2 | |
| 14 (Aperture stop surface) | 21.1404 | 3.85 | BACD18_HOYA |
| 15 | 302.9889 | 16.0096 | |
| 16 | 28.3531 | 6.6145 | EFD4_HOYA |
| 17 | 22.6032 | 6.9384 | |
| 18 | −11.3689 | 1.8 | FCD1_HOYA |
| 19 | 212.0065 | 10.5911 | |
| 20 | −89.0163 | 12.8067 | TAF3_HOYA |
| 21 | −31.2439 | 0.2 | |
| 22 | 59.1155 | 10.4768 | TAF3_HOYA |
| 23 | 256.4774 | 32.9590 | |
| 24 | −38.0308 | 3.5 | PMMA |
| 25 | −35.1510 | 6.2208 | |
| 1st enlarged image surface | ∞ (Image surface) | 0 | |

| Surface No. | K | A | B | C | D | E |
| --- | --- | --- | --- | --- | --- | --- |
| 24 | 0 | 2.9332E−05 | −3.1299E−08 | 3.7631E−11 | −2.2287E−14 | 4.7490E−18 |
| 25 | 0 | 3.6927E−05 | −4.4805E−08 | 5.1104E−11 | −1.8533E−14 | −1.4722E−18 |

Figure 23:
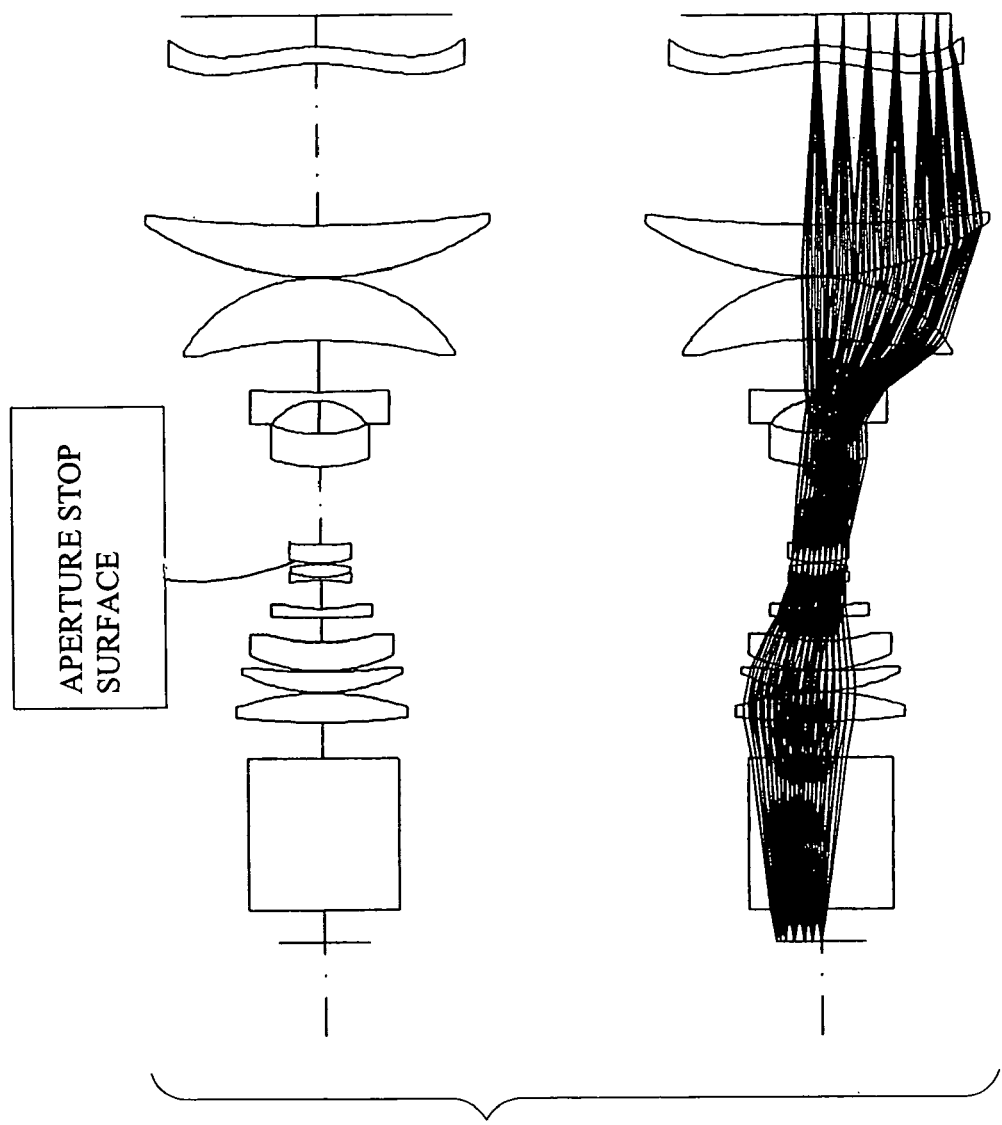
FIG. 23 is a configuration diagram of Embodiment 3 of a first projection optical unit according to the present invention.

FIG. 23 is a configuration diagram and spot diagram of Embodiment 3 of a first projection optical unit according to the present invention. This figure indicates the way the luminous flux irradiated from an image display element in a telecentric state converges telecentrically at a first enlarged image side.

Table 3 lists lens data, with an object surface 0, No. 1 to No. 25 surfaces, and an image surface being listed in that order as surface numbers. A radius of curvature takes a positive value when a center of the curvature is present at the right of an optical axis, and takes a negative value in a reverse case. An intersurface distance is a distance from a lens surface to next lens surface, on the optical axis.

The No. 24 and No. 25 surfaces are aspheric surfaces expressed by the following aspherical equation, and values of the respective aspherical coefficients are listed in Table 3:

$$z=(y^2/r)/\{1+\sqrt{(1-(1+K)y^2/r^2)}\}+A \cdot h^4+B \cdot h^6+C \cdot h^8+D \cdot h^{10}+E \cdot h^{12}$$

Figure 24:
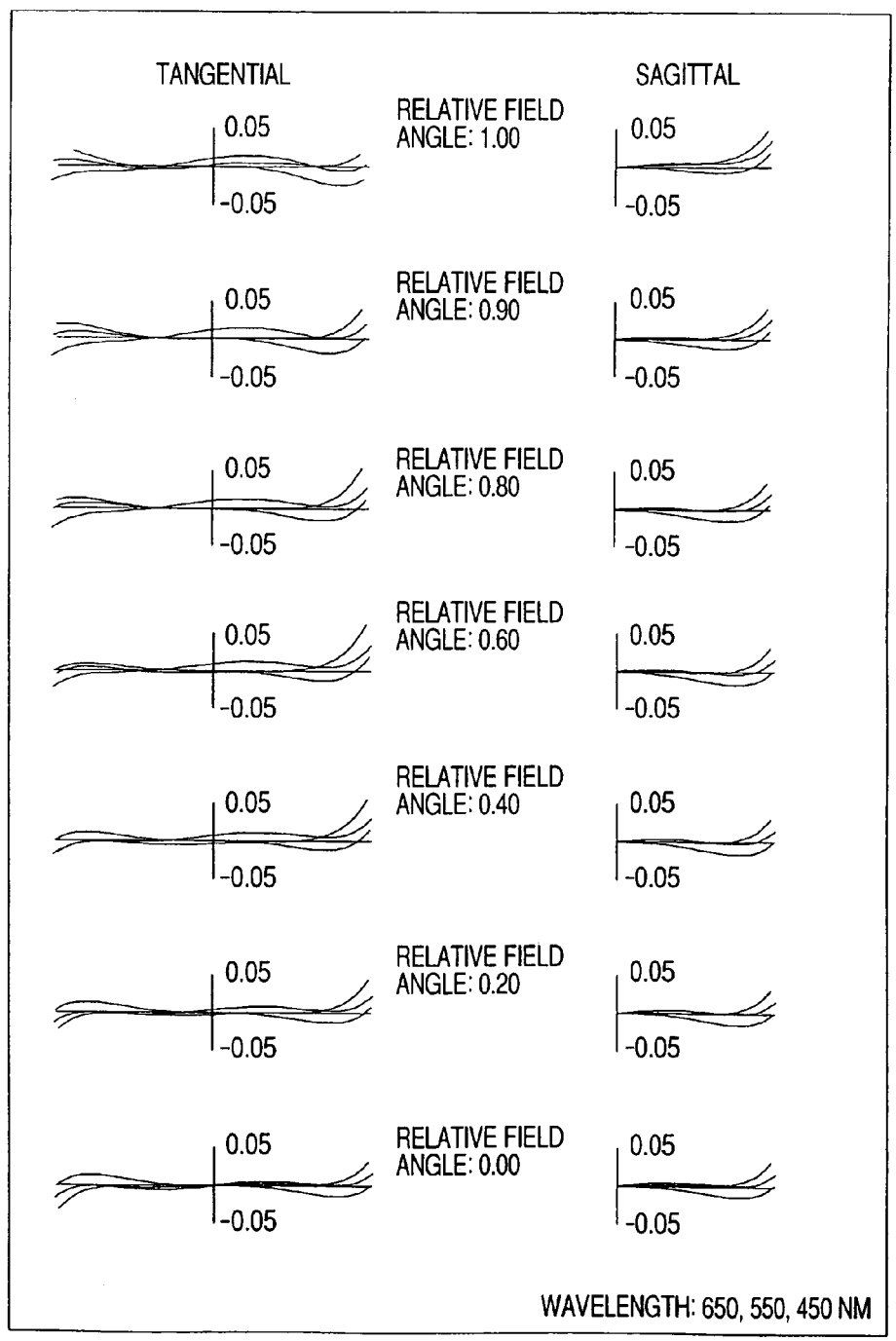
FIG. 24 is a diagram showing the aberration of white light rays in Embodiment 3 of the first projection optical unit according to the present invention.
Figure 25:
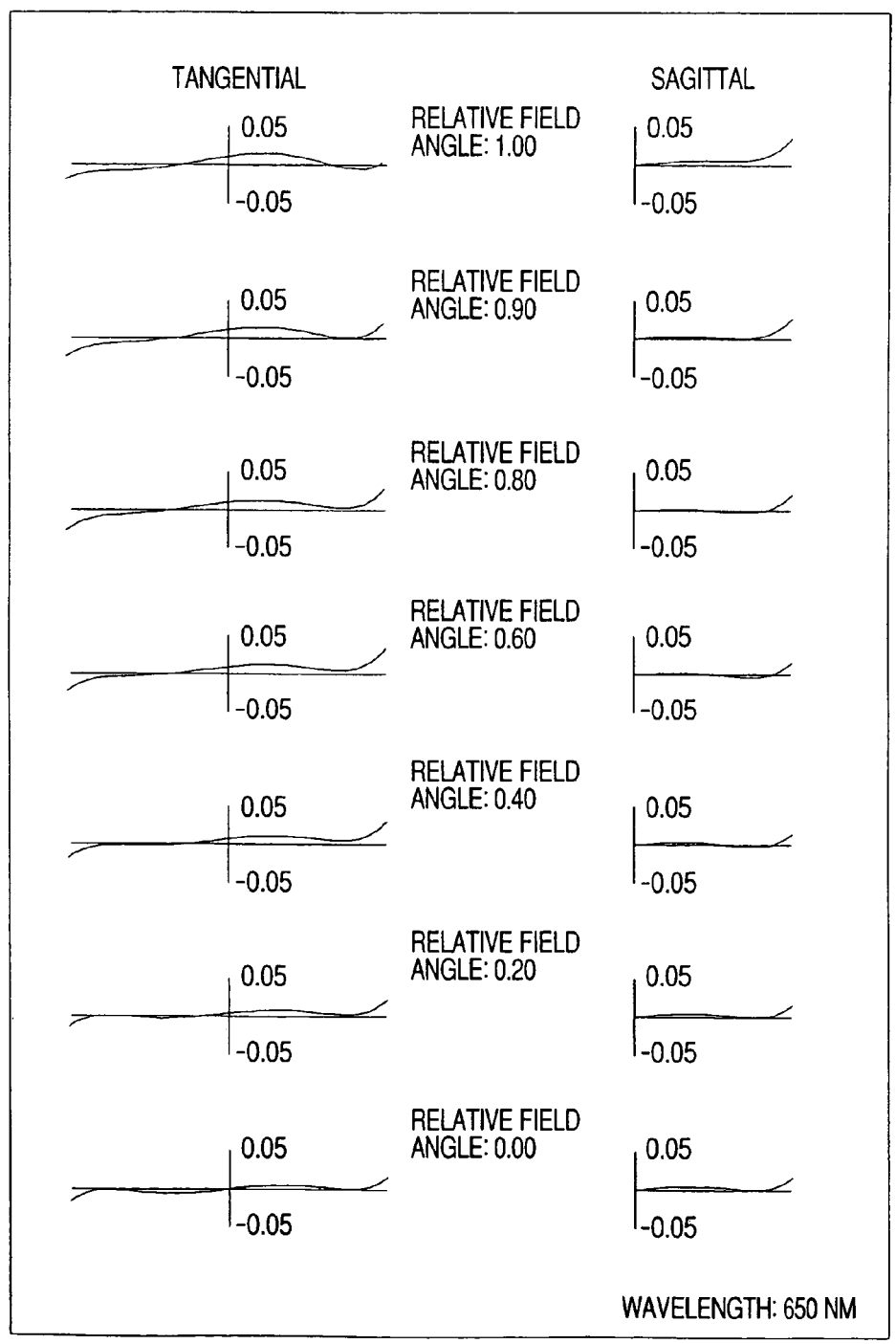
FIG. 25 is a diagram showing the aberration of red light rays in Embodiment 3 of the first projection optical unit according to the present invention.
Figure 26:
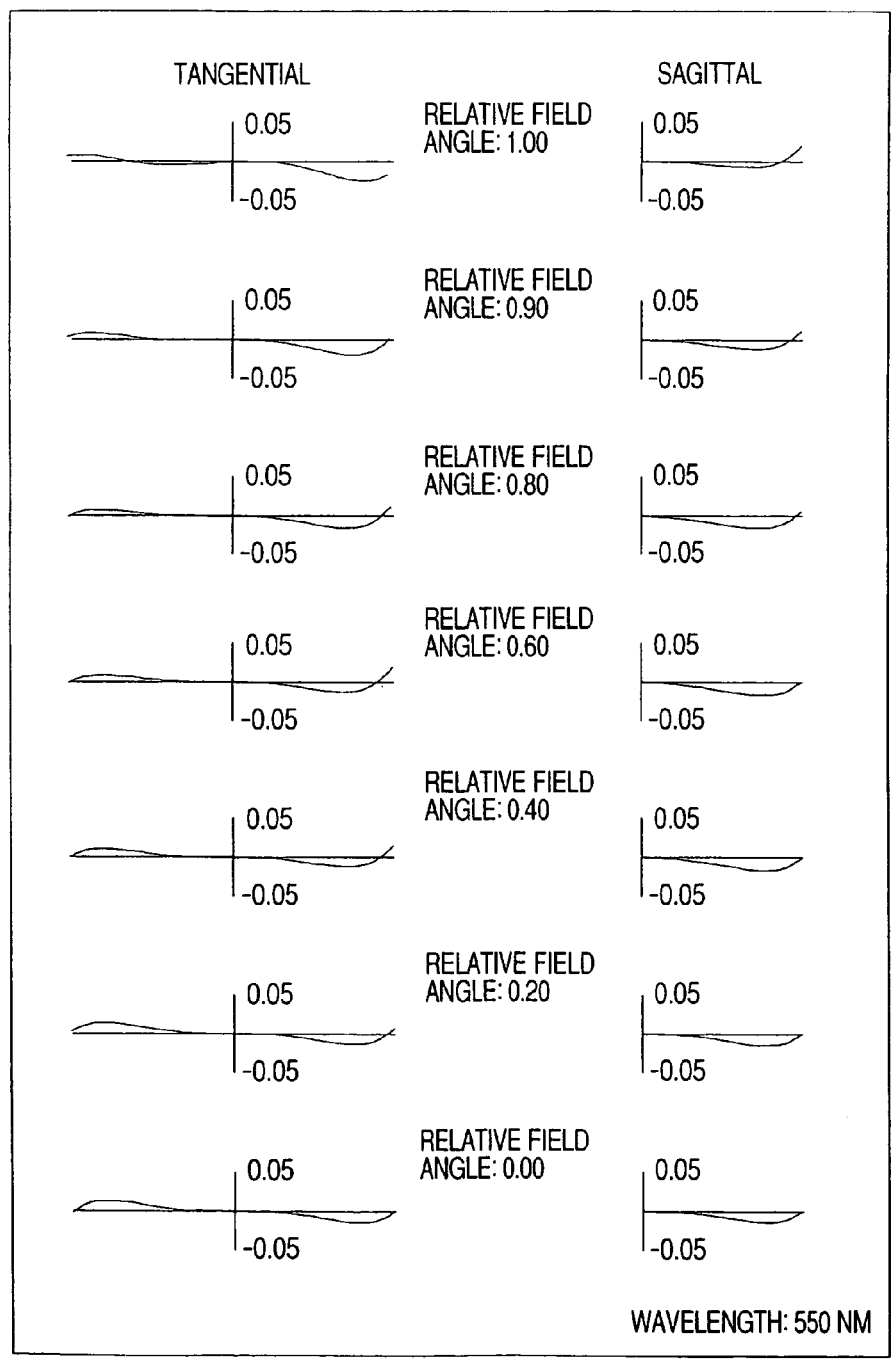
FIG. 26 is a diagram showing the aberration of green light rays in Embodiment 3 of the first projection optical unit according to the present invention.
Figure 27:
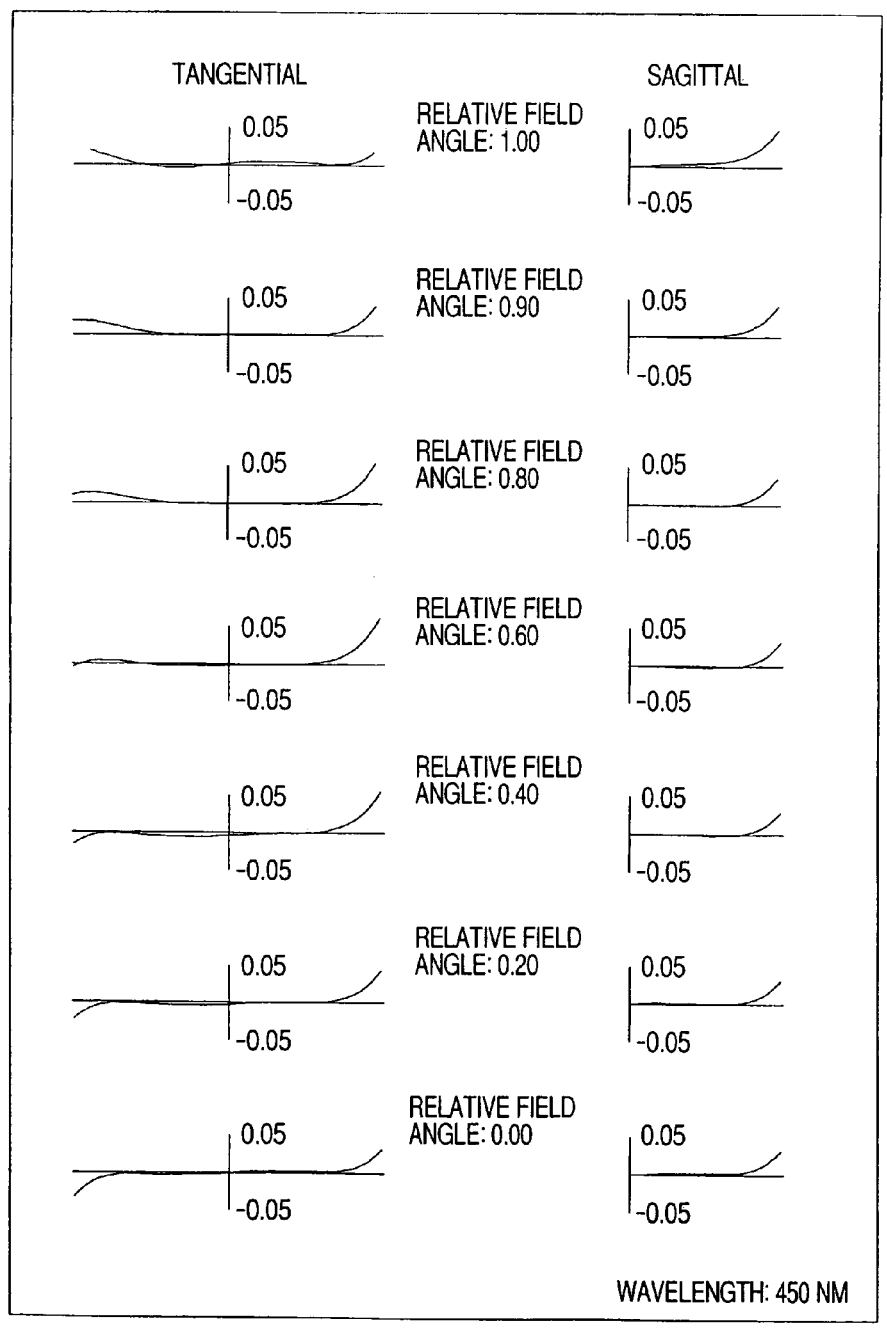
FIG. 27 is a diagram showing the aberration of blue light rays in Embodiment 3 of the first projection optical unit according to the present invention.

FIGS. 24 to 27 are diagrams showing how aberration occurs in Embodiment 3. FIG. 24 is an aberration diagram of the white light rays formed by synthesizing the rays having wavelengths of 650 nm, 550 nm, and 450 nm, wherein chromatic aberration is also shown so as to be understandable at the same time. FIG. 25 is an aberration diagram of red light rays at the wavelength of 650 nm, FIG. 26 an aberration diagram of green light rays at the wavelength of 550 nm, and FIG. 27 an aberration diagram of blue light rays at the wavelength of 450 nm. These diagrams are shown in units of 0.05 mm, and each of the diagrams indicates the way the rays are well aberration-corrected.

Figure 28:
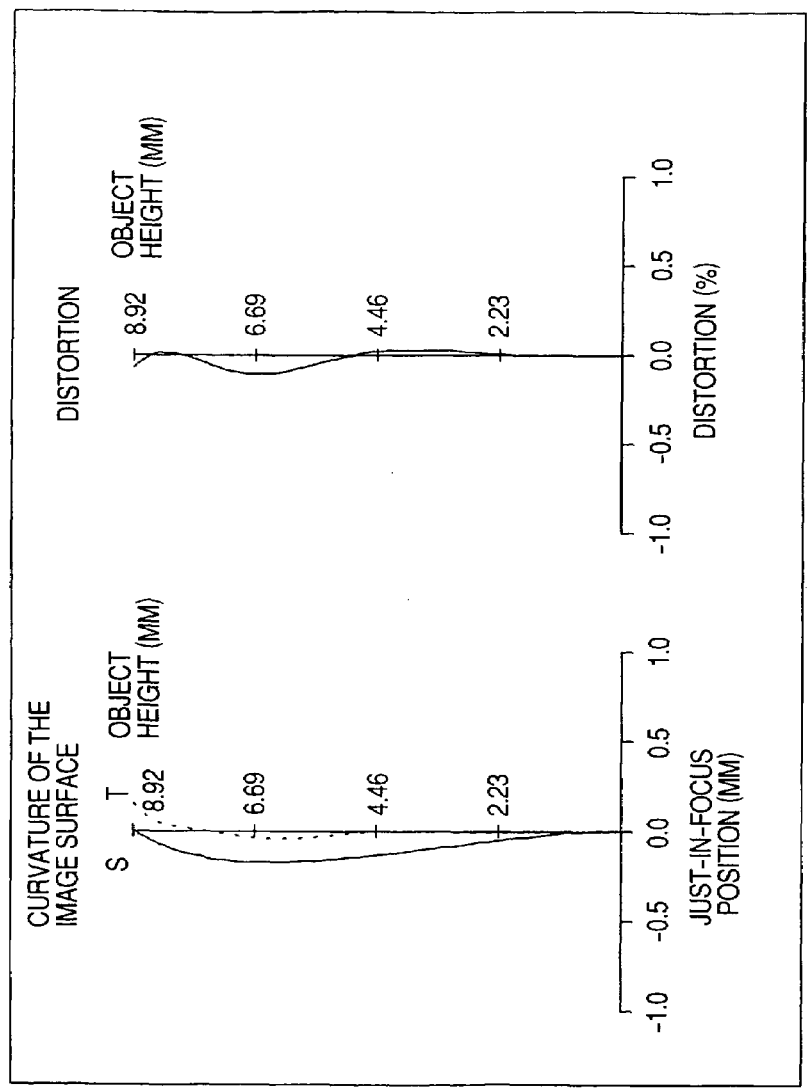
FIG. 28 is a diagram showing the astigmatism and distortion occurring in Embodiment 3 of the first projection optical unit according to the present invention.

FIG. 28 is a diagram of the astigmatism, and changes in distortion ratio, occurring in Embodiment 3. This diagram shows favorable data, with distortion ratios not greater than 0.1%.

Figure 29:
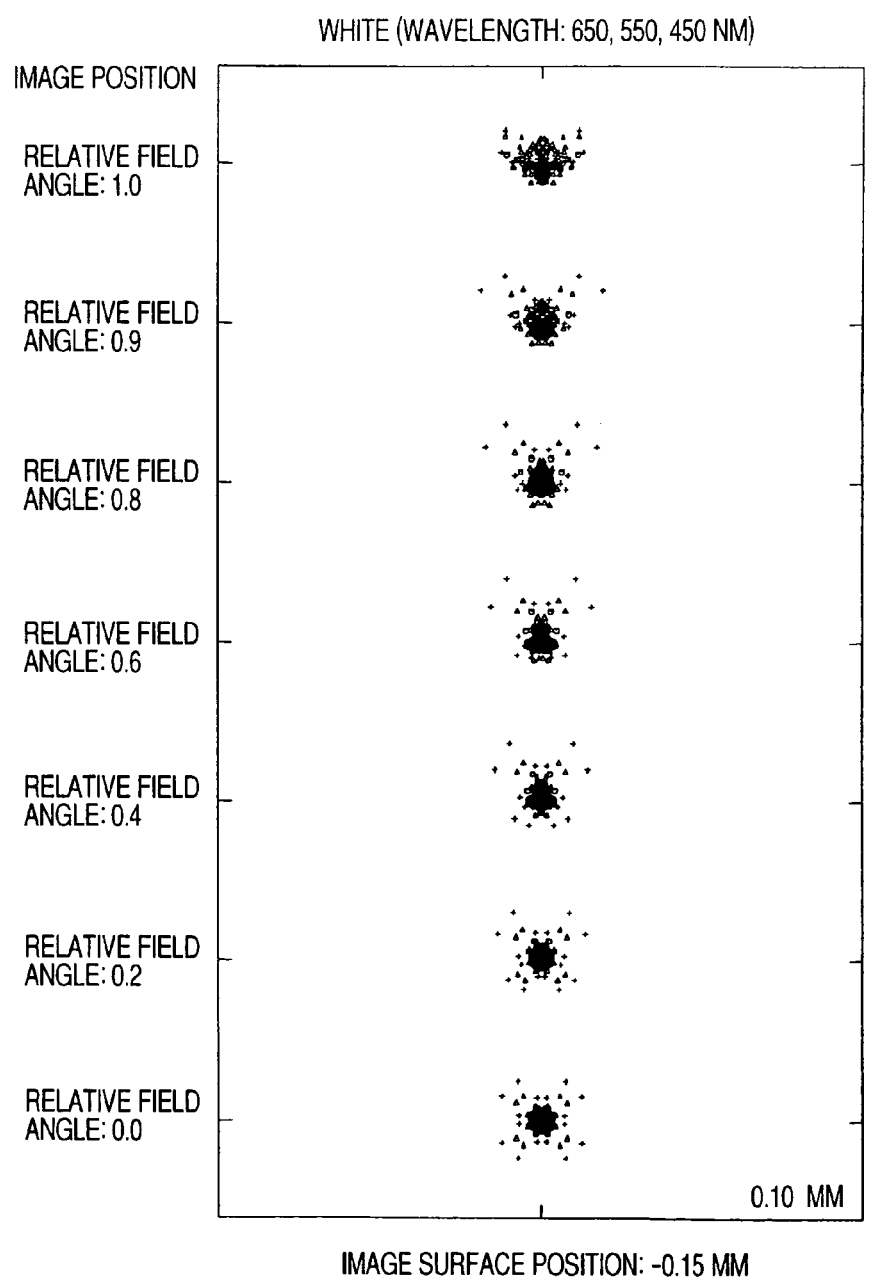
FIG. 29 is a spot diagram of white light rays in Embodiment 3 of the first projection optical unit according to the present invention.
Figure 30:
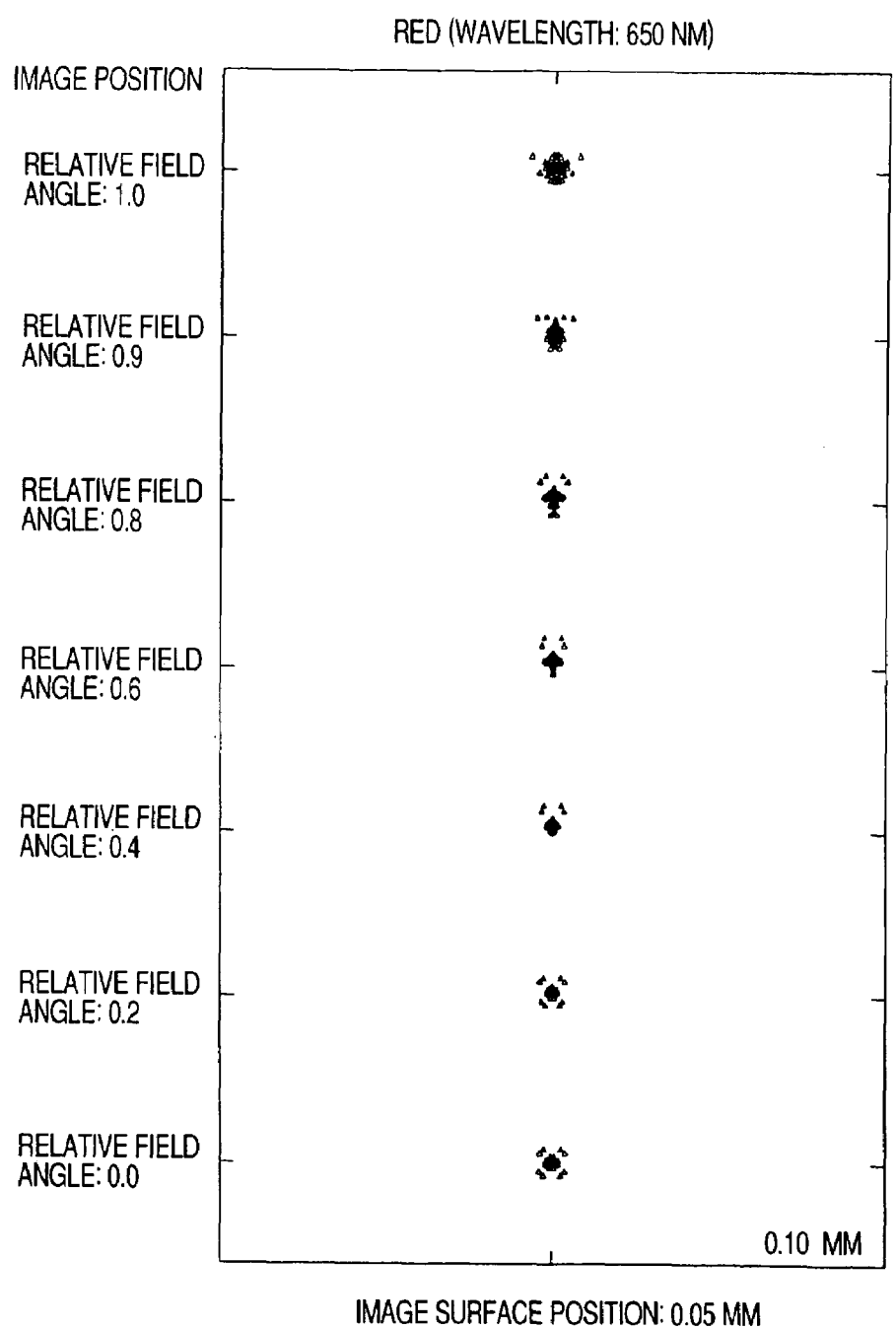
FIG. 30 is a spot diagram of red light rays in Embodiment 3 of the first projection optical unit according to the present invention.
Figure 31:
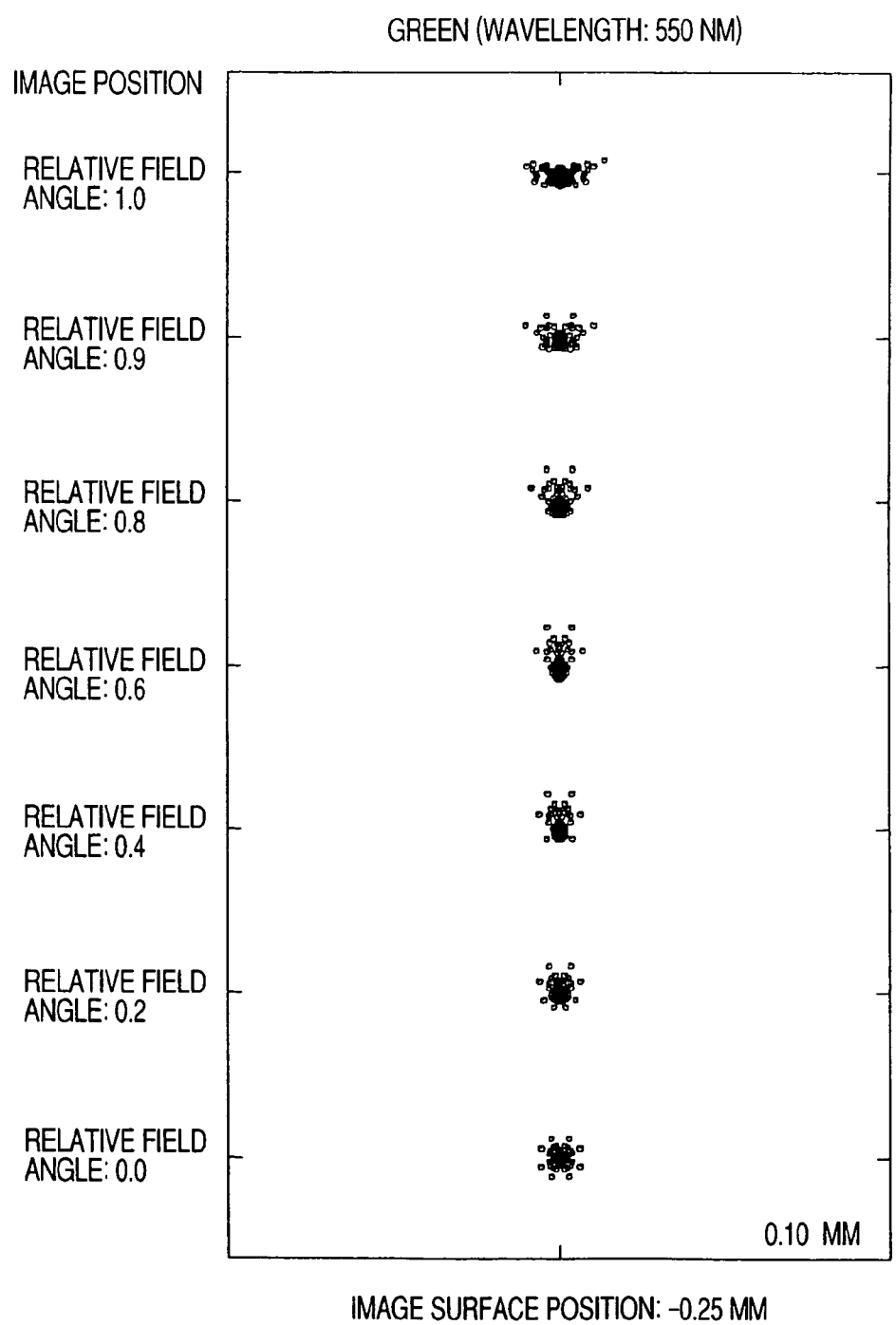
FIG. 31 is a spot diagram of green light rays in Embodiment 3 of the first projection optical unit according to the present invention.
Figure 32:
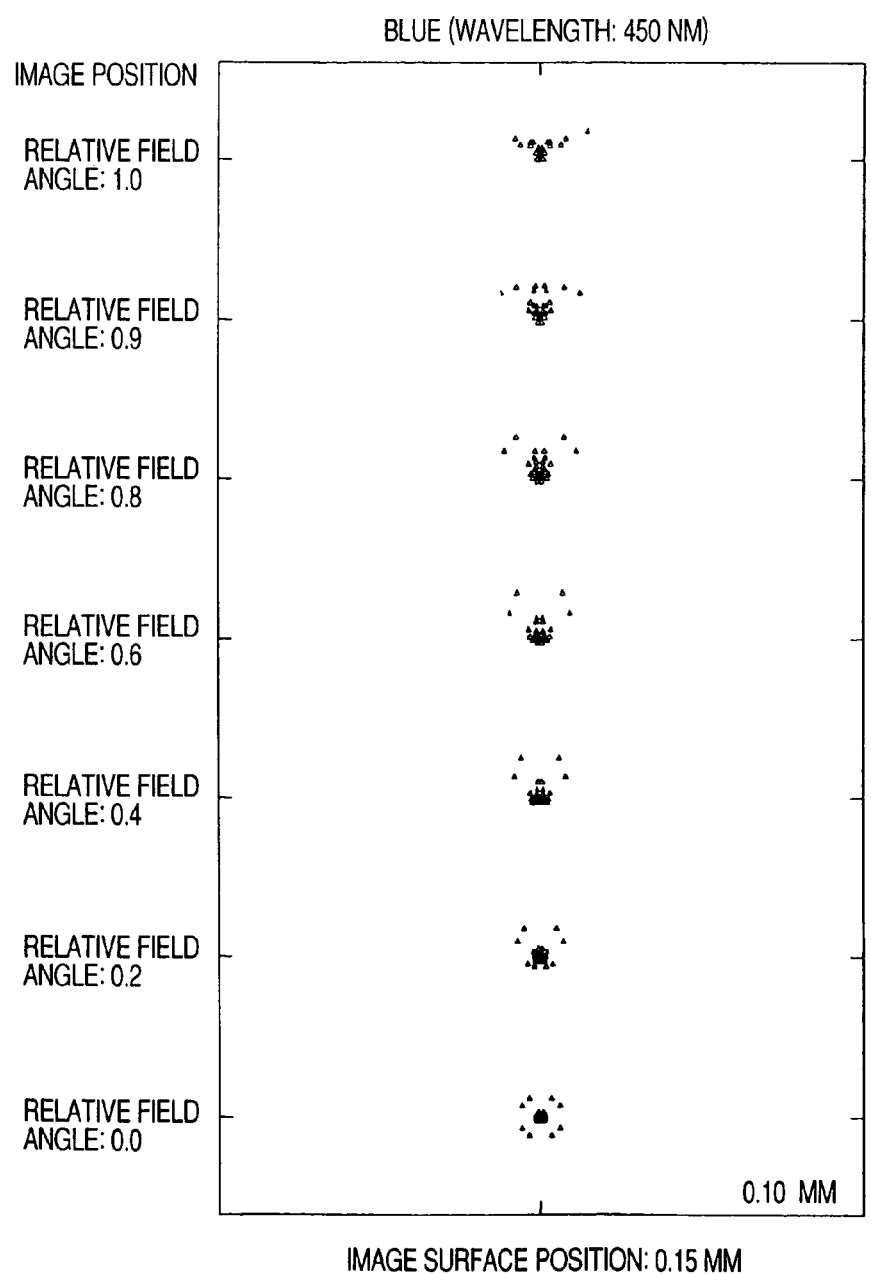
FIG. 32 is a spot diagram of blue light rays in Embodiment 3 of the first projection optical unit according to the present invention.

FIGS. 29 to 32 are spot diagrams pertaining to Embodiment 3. FIG. 29 is a spot diagram of the white light rays formed by synthesizing the rays having wavelengths of 650 nm, 550 nm, and 450 nm, wherein chromatic aberration is also shown so as to be understandable at the same time. FIG. 30 is a spot diagram of red light rays at the wavelength of 650 nm, FIG. 31 a spot diagram of green light rays at the wavelength of 550 nm, and FIG. 32 a spot diagram of blue light rays at the wavelength of 450 nm. These diagrams are shown in units of 0.1 mm, and each of the diagrams indicates the way the rays are well aberration-corrected.

A projection image display apparatus according to the present invention is adapted so that an image display element for red, an image display element for green, and an image display element for blue can each be adjusted to the optimum position independently. The above spot diagrams represent the spots at the particular optimum position.

When lens balls are taken as L1 to L13 in order from the image display element side in each of the data-based embodiments described above, focal length "$f_{凹}$" of a concave lens L10 and focal length "$f_{凸}$" of a combination of convex lenses L11 and L12 are standardized with total length L of the lenses and take the following values:

Embodiment 1 $f_{凹}/L=-0.108$, $f_{凸}/L=0.160$

Embodiment 2 $f_{凹}/L=-0.113$, $f_{凸}/L=0.172$

Embodiment 3 $f_{凹}/L=-0.114$, $f_{凸}/L=0.174$

Next, embodiments of a second projection optical unit according to the present invention are described using more specific lens data.

Embodiment 2-1

Embodiments of a second projection optical unit according to the present invention are shown in FIGS. 33 to 42. Each of these embodiments is described below using the accompanying drawings. For FIGS. 33 to 42, however, description is omitted since the respective embodiments seem to be made understandable similarly to FIG. 33 by referring to the data listed in Tables 4 to 12. Therefore, description is given, based primarily on FIG. 33.

Figure 33:
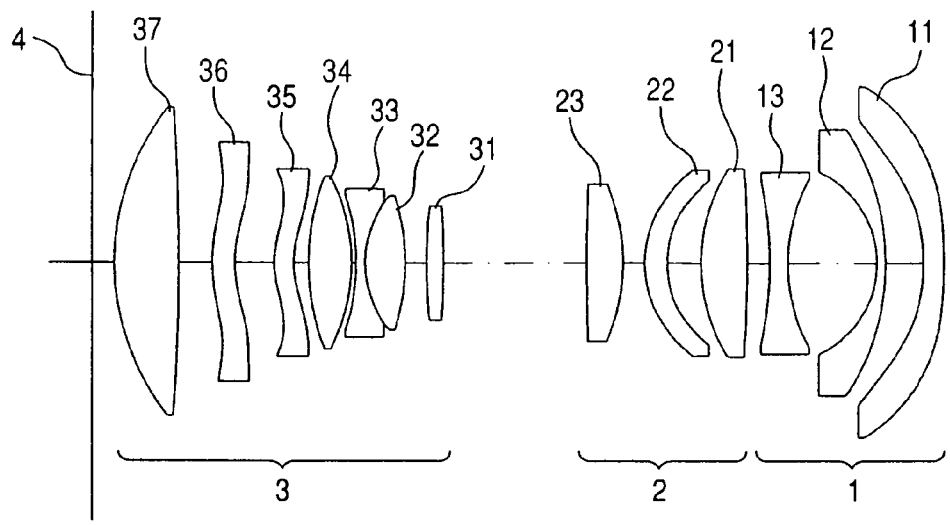
FIG. 33 is a configuration diagram of Embodiment 1 of a second projection optical unit according to the present invention.
Figure 34:
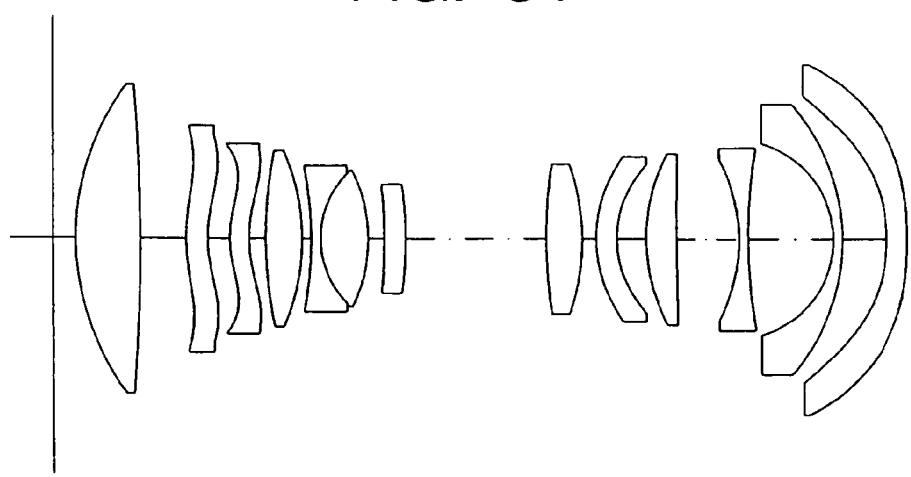
FIG. 34 is a configuration diagram of Embodiment 2 of a second projection optical unit according to the present invention.
Figure 35:
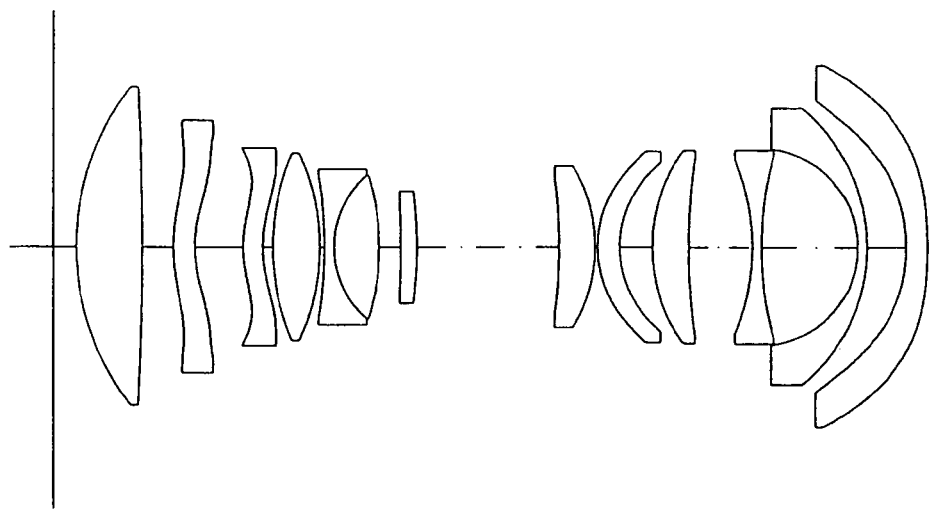
FIG. 35 is a configuration diagram of Embodiment 3 of a second projection optical unit according to the present invention.
Figure 36:
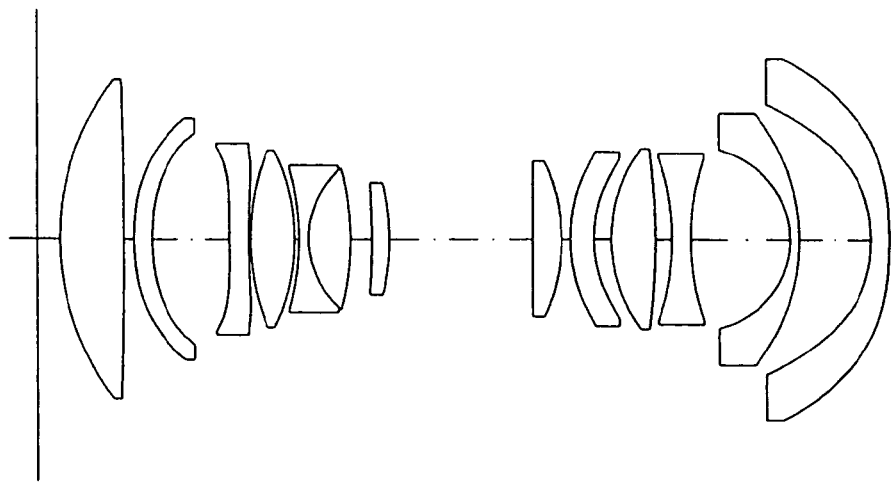
FIG. 36 is a configuration diagram of Embodiment 4 of a second projection optical unit according to the present invention.
Figure 37:
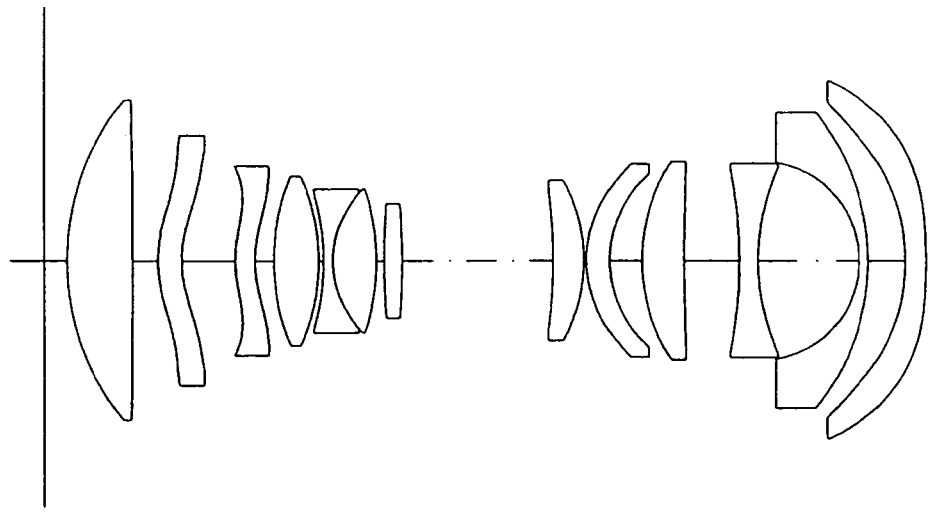
FIG. 37 is a configuration diagram of Embodiment 5 of a second projection optical unit according to the present invention.
Figure 38:
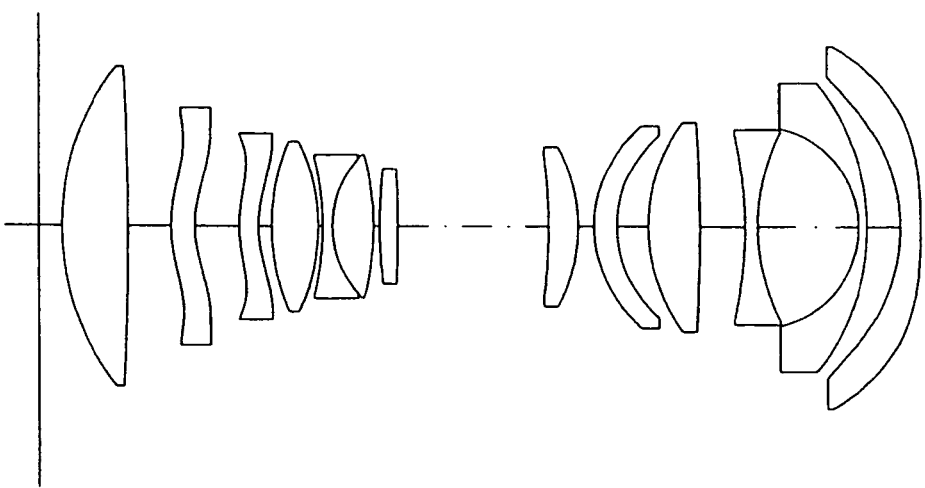
FIG. 38 is a configuration diagram of Embodiment 6 of a second projection optical unit according to the present invention.
Figure 39:
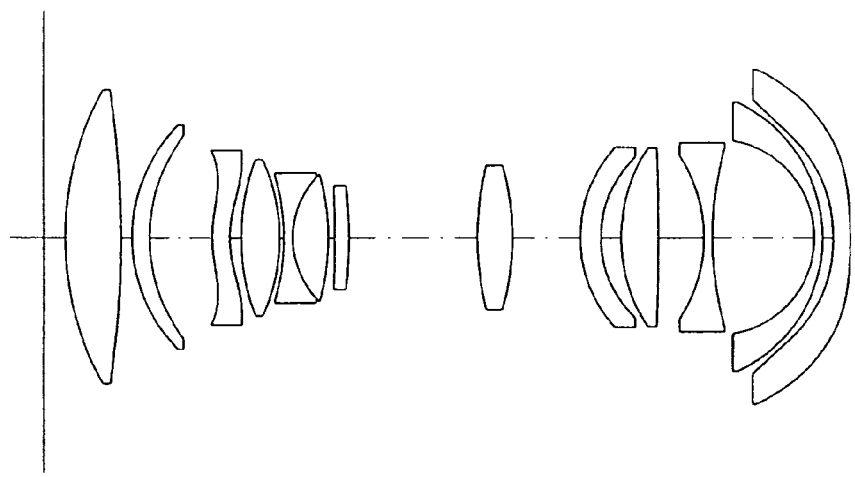
FIG. 39 is a configuration diagram of Embodiment 7 of a second projection optical unit according to the present invention.
Figure 40:
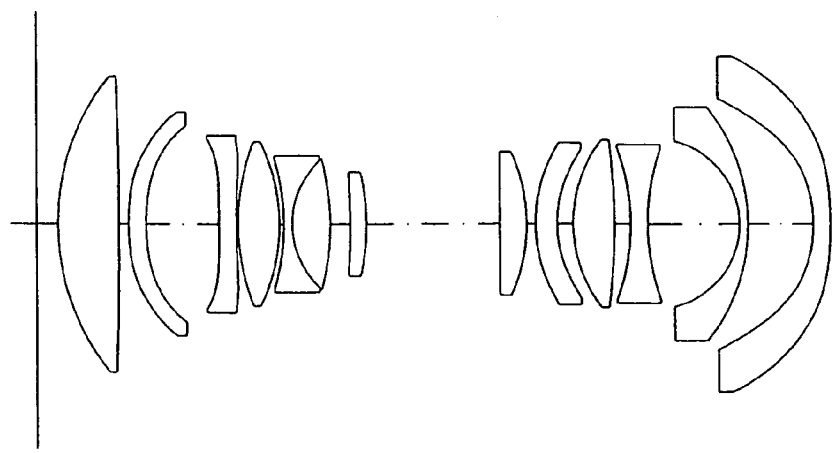
FIG. 40 is a configuration diagram of Embodiment 8 of a second projection optical unit according to the present invention.
Figure 41:
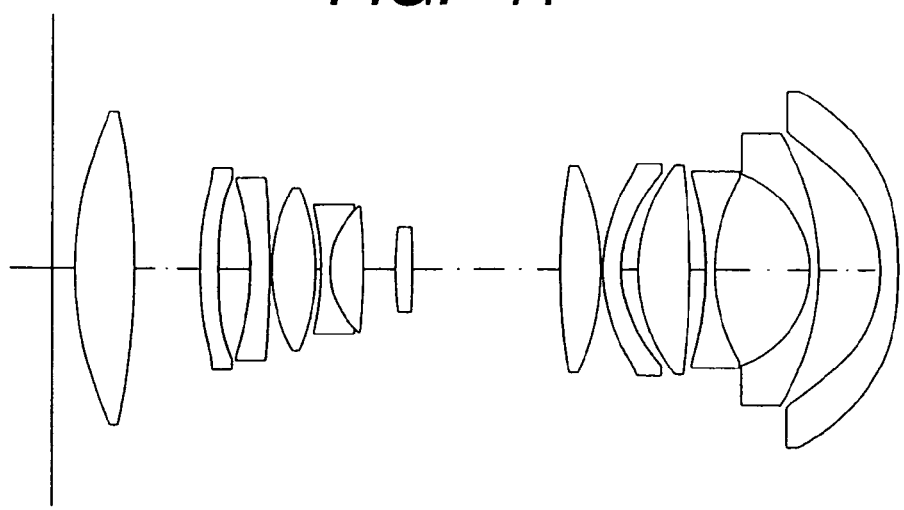
FIG. 41 is a configuration diagram of Embodiment 9 of a second projection optical unit according to the present invention.
Figure 42:
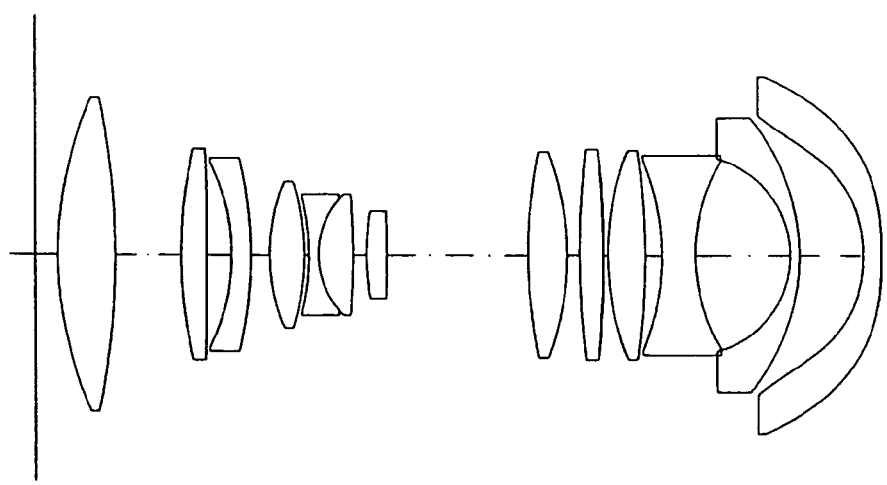
FIG. 42 is a configuration diagram of Embodiment 10 of a second projection optical unit according to the present invention.

The second projection optical unit shown in FIG. 33 further enlarges a first enlarged image obtained from a first projection optical unit by irradiating light from the left side of the second projection optical unit. In short, in a projection optical unit of the present invention, the image displayed on, for example, a liquid-crystal panel, is enlarged at two stages, one using a first lens unit and the other using a second lens unit. Optical calculation using the lens data listed in the tables below makes it possible that the second projection optical unit also has high optical performance.

As shown in FIG. 33, the second projection optical unit provides a first lens group 1, a second lens group 2 and a third lens group 3 in order to project in an enlarged form the image surface 4 formed by the first projection optical unit. The first lens group 1 includes a first lens element 11, a second lens element 12 and a third lens element 13. The second lens group 2 includes a forth lens element 21, a fifth lens element 22 and a sixth lens element 23. The third lens group 3 includes a seventh lens element 31, a eighth lens element 32, a ninth lens element 33, a tenth lens element 34, a eleventh lens element 35, a twelfth lens element 36 and a thirteenth lens element 37. In Table 14 and 15, "fn" shows a focal length of the lens group or the lens element numbered "n".

TABLE 4

| Surface | Rd | TH | nd | vd |
|---|---|---|---|---|
| 1 | Infinity | 596 | | |
| 2 | 151.43541 | 4.5 | 1.492 | 57.9 |
| 3 | 41.1067 | 8.57 | 1 | — |
| 4 | 55.732 | 2 | 1.804 | 46.5 |
| 5 | 23 | 19.92 | 1 | — |
| 6 | −41.105 | 4 | 1.847 | 23.8 |
| 7 | 89.12 | 5.02 | 1 | — |
| 8 | 324.7 | 10.5 | 1.699 | 30.1 |
| 9 | −40.49 | 7.58 | 1 | — |
| 10 | −24.0383 | 5 | 1.492 | 57.9 |
| 11 | −26.22955 | 4.91 | 1 | — |
| 12 | 46.6 | 8 | 1.697 | 55.5 |
| 13 | −550 | 31.98 | 1 | — |
| 14 | 292 | 3.72 | 1.847 | 23.8 |
| 15 | −128.16 | 4.59 | 1 | — |
| 16 | 51 | 8.83 | 1.497 | 81.6 |
| 17 | −24.397 | 2 | 1.847 | 23.8 |
| 18 | 51.75 | 1 | 1 | — |
| 19 | 44.4 | 9.34 | 1.497 | 81.6 |
| 20 | −56.84 | 3.29 | 1 | — |
| 21 | −23.11699 | 4.25 | 1.492 | 57.9 |
| 22 | −23.67003 | 8.74 | 1 | — |
| 23 | −28.03851 | 5 | 1.492 | 57.9 |
| 24 | −39.44504 | 7.4 | 1 | — |
| 25 | 519.1 | 14.5 | 1.847 | 23.8 |
| 26 | −57.15 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 9.38948E−06 | −7.95089E−09 | 5.91417E−12 | −2.59805E−15 | 5.89630E−19 |
| 2 | 0 | 4.23722E−06 | −3.53822E−10 | −1.05402E−11 | 8.59179E−15 | −2.65268E−18 |
| 10 | 0 | −1.29568E−05 | 3.41557E−08 | −7.00521E−11 | 1.14632E−13 | 3.38777E−17 |
| 11 | 0 | −7.83237E−06 | 2.34579E−08 | −4.31157E−11 | 7.15221E−14 | −4.96275E−18 |
| 21 | 0 | 5.67205E−05 | −4.33455E−09 | −7.23421E−11 | 8.13128E−14 | 1.01703E−16 |
| 22 | 0 | 7.17389E−05 | −1.99623E−08 | −6.95659E−12 | −8.43203E−14 | 2.19098E−16 |
| 23 | 0 | 3.21282E−05 | 1.71080E−08 | −2.88990E−11 | −4.28861E−14 | 6.19433E−17 |
| 24 | 0 | 9.99976E−06 | 4.78000E−08 | −6.05943E−11 | −1.00246E−14 | 3.02143E−17 |

TABLE 5

| Surface | Rd | TH | nd | νd |
|---|---|---|---|---|
| 1 | Infinity | 596 | | |
| 2 | 89.321 | 4.5 | 1.492 | 57.9 |
| 3 | 37.603 | 10.055 | 1 | — |
| 4 | 47.306 | 2 | 1.804 | 46.5 |
| 5 | 22.79 | 19.167 | 1 | — |
| 6 | −129.17 | 2 | 1.847 | 23.8 |
| 7 | 40.204 | 13.969 | 1 | — |
| 8 | −699.91 | 6.78 | 1.699 | 30.1 |
| 9 | −43.006 | 6.559 | 1 | — |
| 10 | −25.482 | 4.623 | 1.492 | 57.9 |
| 11 | −33.435 | 3.076 | 1 | — |
| 12 | 51.141 | 8 | 1.697 | 55.5 |
| 13 | −119.455 | 31.336 | 1 | — |
| 14 | 91.47 | 4.764 | 1.847 | 23.8 |
| 15 | 128.458 | 3.522 | 1 | — |
| 16 | 36.118 | 10.542 | 1.497 | 81.6 |
| 17 | −21.518 | 2 | 1.847 | 23.8 |
| 18 | 89.257 | 1.969 | 1 | — |
| 19 | 51.705 | 8.01 | 1.497 | 81.6 |
| 20 | −102.338 | 3.795 | 1 | — |
| 21 | −28.178 | 4.155 | 1.492 | 57.9 |
| 22 | −25.14 | 4.867 | 1 | — |
| 23 | −30.384 | 4.58 | 1.492 | 57.9 |
| 24 | −48.312 | 10.231 | 1 | — |
| 25 | 445.05 | 14.5 | 1.847 | 23.8 |
| 26 | −59.275 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 5.69978E−06 | −1.03270E−09 | −7.42610E−14 | 2.93660E−16 | 0.00000E+00 |
| 2 | 0 | 2.41874E−06 | 4.03182E−09 | −6.48449E−12 | 4.69028E−16 | 0.00000E+00 |
| 10 | 0 | −9.63220E−06 | 3.25708E−08 | −5.09953E−11 | 1.11528E−13 | 0.00000E+00 |
| 11 | 0 | −7.78930E−06 | 2.09417E−08 | −2.71403E−11 | 4.67136E−14 | 0.00000E+00 |
| 21 | 0 | 3.33539E−05 | 2.78360E−08 | −6.83261E−11 | 4.81959E−14 | 0.00000E+00 |
| 22 | 0 | 6.20605E−05 | 3.64150E−09 | −5.23463E−11 | 7.32597E−14 | 0.00000E+00 |
| 23 | 0 | 3.55801E−05 | 6.89950E−09 | −4.50025E−11 | 3.61050E−14 | 0.00000E+00 |
| 24 | 0 | 9.48511E−06 | 4.12848E−08 | −6.74424E−11 | 2.87720E−14 | 0.00000E+00 |

TABLE 6

| Surface | Rd | TH | nd | νd |
|---|---|---|---|---|
| 1 | Infinity | 596 | | |
| 2 | 94.38 | 4.57 | 1.492 | 57.9 |
| 3 | 36.448 | 8.539 | 1 | — |
| 4 | 39.735 | 2 | 1.804 | 46.5 |
| 5 | 21.85 | 20.884 | 1 | — |
| 6 | −79.427 | 2 | 1.847 | 23.8 |
| 7 | 50.748 | 13.773 | 1 | — |
| 8 | −143.365 | 7.961 | 1.699 | 30.1 |
| 9 | −36.82 | 7.124 | 1 | — |
| 10 | −24.37 | 4.827 | 1.492 | 57.9 |
| 11 | −25.836 | 0.5 | 1 | — |
| 12 | 35.112 | 7.823 | 1.697 | 55.5 |
| 13 | 126.183 | 30.929 | 1 | — |
| 14 | 97.719 | 3.395 | 1.847 | 23.8 |
| 15 | 290.128 | 4.685 | 1 | — |
| 16 | 54.715 | 9.799 | 1.497 | 81.6 |
| 17 | −21.399 | 2 | 1.847 | 23.8 |
| 18 | 101.576 | 1 | 1 | — |
| 19 | 49.763 | 10.27 | 1.497 | 81.6 |
| 20 | −52.498 | 2.249 | 1 | — |
| 21 | −26.914 | 4 | 1.492 | 57.9 |
| 22 | −26.387 | 10.249 | 1 | — |
| 23 | −27.334 | 4.722 | 1.492 | 57.9 |
| 24 | −41.9 | 6.798 | 1 | — |
| 25 | 752.495 | 14.5 | 1.847 | 23.8 |
| 26 | −57.145 | 5 | 1 | — |
| 27 | Infinity | — | — | — |

Aspherical Coefficient

| Surface | K | A | B | C | D | E |
|---|---|---|---|---|---|---|
| 1 | 0 | 7.39476E−06 | −3.05169E−09 | 1.29568E−12 | −7.78036E−17 | 0.00000E+00 |
| 2 | 0 | 3.70183E−06 | 2.30197E−09 | −5.10070E−12 | −8.28100E−17 | 0.00000E+00 |
| 10 | 0 | −1.06004E−05 | 3.15151E−08 | −4.62026E−11 | 8.91471E−14 | 0.00000E+00 |
| 11 | 0 | −6.67002E−06 | 2.15127E−08 | −2.85053E−11 | 4.76403E−14 | 0.00000E+00 |
| 21 | 0 | 3.70060E−05 | 2.62198E−08 | −9.28702E−11 | 7.44670E−14 | 0.00000E+00 |
| 22 | 0 | 5.77088E−05 | 2.29302E−09 | −5.01384E−11 | 4.35275E−14 | 0.00000E+00 |
| 23 | 0 | 3.55808E−05 | 6.89952E−09 | −4.50025E−11 | 3.61050E−14 | 0.00000E+00 |
| 24 | 0 | 9.48511E−06 | 4.12848E−08 | −6.74424E−11 | 2.87720E−14 | 0.00000E+00 |

TABLE 7

| Surface | Rd | TH | nd | νd |
|---|---|---|---|---|
| 1 | Infinity | 596 | | |
| 2 | 96.272 | 4.5 | 1.492 | 57.9 |
| 3 | 38.887 | 8.964 | 1 | — |
| 4 | 43.795 | 2 | 1.804 | 46.5 |
| 5 | 22.338 | 20.468 | 1 | — |
| 6 | −71.685 | 3.071 | 1.847 | 23.8 |
| 7 | 58.915 | 13.317 | 1 | — |
| 8 | −169.272 | 8 | 1.699 | 30.1 |
| 9 | −39.983 | 7.921 | 1 | — |
| 10 | −23.879 | 4.291 | 1.492 | 57.9 |
| 11 | −25.361 | 0.5 | 1 | — |
| 12 | 38.048 | 7.315 | 1.697 | 55.5 |
| 13 | 256.247 | 32.33 | 1 | — |
| 14 | 126.489 | 3.501 | 1.847 | 23.8 |
| 15 | −3032.738 | 3.95 | 1 | — |
| 16 | 51.373 | 9.554 | 1.497 | 81.6 |
| 17 | −21.857 | 2 | 1.847 | 23.8 |
| 18 | 74.129 | 1 | 1 | — |
| 19 | 49.476 | 10.506 | 1.497 | 81.6 |
| 20 | −42.937 | 2.409 | 1 | — |
| 21 | −27.249 | 4 | 1.492 | 57.9 |
| 22 | −29.701 | 7.318 | 1 | — |
| 23 | −22.92 | 4.506 | 1.492 | 57.9 |
| 24 | −33.036 | 8.325 | 1 | — |

TABLE 7-continued

| Surface | Rd | TH | nd | νd |
|---|---|---|---|---|
| 25 | 551.053 | 14.5 | 1.847 | 23.8 |
| 26 | −58.234 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 7.38138E−06 | −3.26580E−09 | 1.33965E−12 | −5.61360E−17 | 0.00000E+00 |
| 2 | 0 | 4.48905E−06 | 1.34351E−09 | −5.30479E−12 | 9.24183E−16 | 0.00000E+00 |
| 10 | 0 | −1.07520E−05 | 3.09272E−08 | −5.01466E−11 | 1.04715E−13 | 0.00000E+00 |
| 11 | 0 | −7.05928E−06 | 2.17856E−08 | −3.02041E−11 | 5.61766E−14 | 0.00000E+00 |
| 21 | 0 | 3.26985E−05 | 2.07055E−08 | −1.21388E−10 | 1.51111E−13 | 0.00000E+00 |
| 22 | 0 | 5.10620E−05 | −1.09151E−08 | −4.33841E−11 | 2.50678E−14 | 0.00000E+00 |
| 23 | 0 | 4.21419E−05 | 1.07177E−08 | −7.00023E−11 | 9.94258E−14 | 0.00000E+00 |
| 24 | 0 | 1.90739E−05 | 2.37272E−08 | −5.28854E−11 | 2.63355E−14 | 0.00000E+00 |

TABLE 8

| Surface | Rd | TH | nd | vd |
|---|---|---|---|---|
| 1 | Infinity | 596 | | |
| 2 | 113.93 | 4.5 | 1.492 | 57.9 |
| 3 | 45.093 | 8.109 | 1 | — |
| 4 | 51.033 | 2 | 1.804 | 46.5 |
| 5 | 21.942 | 21.95 | 1 | — |
| 6 | −51.995 | 4 | 1.847 | 23.8 |
| 7 | 103.239 | 11.853 | 1 | — |
| 8 | −525.77 | 9.145 | 1.699 | 30.1 |
| 9 | −40.819 | 7.066 | 1 | — |
| 10 | −26.4 | 5 | 1.492 | 57.9 |
| 11 | −27.754 | 0.5 | 1 | — |
| 12 | 36.254 | 6.799 | 1.697 | 55.5 |
| 13 | 119.678 | 32.821 | 1 | — |
| 14 | 179.013 | 3.814 | 1.847 | 23.8 |
| 15 | −185.608 | 1.768 | 1 | — |
| 16 | 53.59 | 9.155 | 1.497 | 81.6 |
| 17 | −23.188 | 2 | 1.847 | 23.8 |
| 18 | 57.622 | 1 | 1 | — |
| 19 | 48.5 | 9.393 | 1.497 | 81.6 |
| 20 | −50.839 | 3.994 | 1 | — |
| 21 | −27.136 | 4 | 1.492 | 57.9 |
| 22 | −30.891 | 11.245 | 1 | — |
| 23 | −26.713 | 5 | 1.492 | 57.9 |
| 24 | −31.129 | 5.302 | 1 | — |
| 25 | 1923.53 | 14.5 | 1.847 | 23.8 |
| 26 | −55.452 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 6.35181E−06 | −1.32042E−09 | 1.50471E−13 | 3.56963E−16 | 0.00000E+00 |
| 2 | 0 | 2.11474E−06 | 3.98613E−09 | −6.53463E−12 | 1.81474E−15 | 0.00000E+00 |
| 10 | 0 | −1.02931E−05 | 2.51426E−08 | −3.07743E−11 | 4.97740E−14 | 0.00000E+00 |
| 11 | 0 | −6.27111E−06 | 1.91231E−08 | −2.22236E−11 | 3.12476E−14 | 0.00000E+00 |
| 21 | 0 | 3.84969E−05 | 1.89479E−08 | −8.63546E−11 | 6.18055E−14 | 0.00000E+00 |
| 22 | 0 | 4.98121E−05 | 1.03342E−09 | −3.64562E−11 | 1.39570E−15 | 0.00000E+00 |
| 23 | 0 | 2.96909E−05 | 1.60940E−08 | −5.19460E−11 | 4.73874E−14 | 0.00000E+00 |
| 24 | 0 | 1.78764E−05 | 2.25405E−08 | −3.95436E−11 | 1.98088E−14 | 0.00000E+00 |

TABLE 9

| Surface | Rd | TH | nd | vd |
|---|---|---|---|---|
| 1 | Infinity | 596 | | |
| 2 | 143.925 | 4.5 | 1.492 | 57.9 |
| 3 | 43.474 | 7.197 | 1 | — |
| 4 | 50.672 | 2 | 1.804 | 46.5 |
| 5 | 22.327 | 21.899 | 1 | — |
| 6 | −46.727 | 2.746 | 1.847 | 23.8 |
| 7 | 94.009 | 9.626 | 1 | — |
| 8 | 389.86 | 11.056 | 1.699 | 30.1 |
| 9 | −39.949 | 6.772 | 1 | — |
| 10 | −27.861 | 5 | 1.492 | 57.9 |
| 11 | −29.255 | 3.433 | 1 | — |
| 12 | 37.245 | 6.448 | 1.697 | 55.5 |
| 13 | 119.956 | 32.923 | 1 | — |
| 14 | 306.709 | 3.884 | 1.847 | 23.8 |
| 15 | −113.027 | 1.318 | 1 | — |
| 16 | 61.97 | 8.832 | 1.497 | 81.6 |
| 17 | −22.669 | 2 | 1.847 | 23.8 |
| 18 | 62.974 | 1 | 1 | — |
| 19 | 46.069 | 9.72 | 1.497 | 81.6 |
| 20 | −49.622 | 2.796 | 1 | — |
| 21 | −26.699 | 4 | 1.492 | 57.9 |
| 22 | −31.09 | 9.238 | 1 | — |
| 23 | −25.858 | 5 | 1.492 | 57.9 |
| 24 | −31.863 | 9.113 | 1 | — |
| 25 | 719.259 | 14.5 | 1.847 | 23.8 |
| 26 | −57.284 | 5 | 1 | — |
| 27 | Infinity | — | — | — |

| | | | Aspherical Coefficient | | |
|---|---|---|---|---|---|
| Surface | K | A | B | C | D | E |
| 1 | 0 | 7.41310E−06 | −3.13090E−09 | 1.39794E−12 | −1.23509E−16 | 0.00000E+00 |
| 2 | 0 | 2.71372E−06 | 3.60725E−09 | −7.37223E−12 | 2.17043E−15 | 0.00000E+00 |
| 10 | 0 | −9.90995E−06 | 2.16060E−08 | −2.64091E−11 | 3.54640E−14 | 0.00000E+00 |
| 11 | 0 | −6.08815E−06 | 1.64517E−08 | −1.85623E−11 | 2.22548E−14 | 0.00000E+00 |
| 21 | 0 | 3.88410E−05 | 1.81436E−08 | −7.51838E−11 | 4.28144E−14 | 0.00000E+00 |
| 22 | 0 | 4.79896E−05 | 7.10203E−09 | −2.55853E−11 | −3.02056E−14 | 0.00000E+00 |
| 23 | 0 | 3.86814E−05 | 1.17892E−08 | −4.90164E−11 | 4.60862E−14 | 0.00000E+00 |
| 24 | 0 | 2.66697E−05 | 1.56203E−08 | −3.80999E−11 | 1.68612E−14 | 0.00000E+00 |

TABLE 10

| Surface | Rd | TH | nd | νd |
|---|---|---|---|---|
| 1 | Infinity | 596 | | |
| 2 | 136.746 | 4 | 1.492 | 57.9 |
| 3 | 40.121 | 2.48 | 1 | — |
| 4 | 35.297 | 2 | 1.816 | 46.6 |
| 5 | 23.305 | 24.305 | 1 | — |
| 6 | −79.026 | 2 | 1.847 | 23.8 |
| 7 | 35.805 | 10.617 | 1 | — |
| 8 | 666.731 | 8.724 | 1.699 | 30.1 |
| 9 | −39.205 | 4.712 | 1 | — |
| 10 | −30.553 | 4.875 | 1.492 | 57.9 |
| 11 | −36.63 | 15.682 | 1 | — |
| 12 | 66.376 | 8 | 1.697 | 55.5 |
| 13 | −76.974 | 30.054 | 1 | — |
| 14 | 112.963 | 3.411 | 1.847 | 23.8 |
| 15 | 555.875 | 1.61 | 1 | — |
| 16 | 59.77 | 8.285 | 1.497 | 81.6 |
| 17 | −21.498 | 2 | 1.847 | 23.8 |
| 18 | 53.871 | 1 | 1 | — |
| 19 | 46.012 | 8.992 | 1.497 | 81.6 |
| 20 | −53.112 | 2.605 | 1 | — |
| 21 | −25.52 | 4 | 1.492 | 57.9 |
| 22 | −32.492 | 14.213 | 1 | — |
| 23 | −41.591 | 4 | 1.492 | 57.9 |
| 24 | −39.263 | 2.603 | 1 | — |
| 25 | 264.351 | 12.915 | 1.847 | 23.8 |
| 26 | −74.144 | 5 | 1 | — |
| 27 | Infinity | — | — | — |

| | | | Aspherical Coefficient | | |
|---|---|---|---|---|---|
| Surface | K | A | B | C | D | E |
| 1 | 0 | 9.58608E−06 | −4.08266E−09 | 1.14741E−12 | 1.33697E−16 | 0.00000E+00 |
| 2 | 0 | 6.03412E−06 | 7.67505E−09 | −1.54579E−11 | 4.48365E−15 | 0.00000E+00 |
| 10 | 0 | −1.48267E−05 | 1.70970E−08 | −2.70638E−11 | 5.19430E−14 | 0.00000E+00 |
| 11 | 0 | −1.09467E−05 | 1.37712E−08 | −1.59448E−11 | 2.72140E−14 | 0.00000E+00 |
| 21 | 0 | 5.18069E−05 | −1.43694E−08 | −6.06068E−11 | 9.54935E−14 | 0.00000E+00 |
| 22 | 0 | 5.15159E−05 | −8.36696E−09 | −6.37484E−11 | 6.78810E−14 | 0.00000E+00 |
| 23 | 0 | 0.00000E+00 | 0.00000E+00 | 0.00000E+00 | 0.00000E+00 | 0.00000E+00 |
| 24 | 0 | 0.00000E+00 | 0.00000E+00 | 0.00000E+00 | 0.00000E+00 | 0.00000E+00 |

TABLE 11

| Surface | Rd | TH | nd | νd |
|---|---|---|---|---|
| 1 | Infinity | 596 | | |
| 2 | 107.53 | 4 | 1.492 | 57.9 |
| 3 | 33.362 | 15.688 | 1 | — |

TABLE 11-continued

| Surface | Rd | TH | nd | νd |
|---|---|---|---|---|
| 4 | 44.967 | 2 | 1.816 | 46.6 |
| 5 | 20.233 | 21.647 | 1 | — |
| 6 | −55.919 | 4 | 1.847 | 23.8 |
| 7 | 55.019 | 3.687 | 1 | — |
| 8 | 151.307 | 9.724 | 1.699 | 30.1 |
| 9 | −33.547 | 3.766 | 1 | — |
| 10 | −29.697 | 5 | 1.492 | 57.9 |
| 11 | −37.675 | 1.896 | 1 | — |
| 12 | 41.345 | 6.171 | 1.697 | 55.5 |
| 13 | 50488.451 | 31.142 | 1 | — |
| 14 | 53.4 | 3.805 | 1.847 | 23.8 |
| 15 | 189.029 | 4.721 | 1 | — |
| 16 | 60.669 | 8.982 | 1.497 | 81.6 |
| 17 | −21.111 | 2 | 1.847 | 23.8 |
| 18 | 56.435 | 1 | 1 | — |
| 19 | 45.623 | 9.622 | 1.497 | 81.6 |
| 20 | −54.328 | 0.5 | 1 | — |
| 21 | −161.376 | 4 | 1.492 | 57.9 |
| 22 | 5879.089 | 16.449 | 1 | — |
| 23 | −55.002 | 4 | 1.492 | 57.9 |
| 24 | −58.343 | 2.158 | 1 | — |
| 25 | 1113.132 | 14.041 | 1.847 | 23.8 |
| 26 | −58.123 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 1.08587E−05 | −5.70653E−09 | 1.53202E−12 | 1.28148E−16 | 0.00000E+00 |
| 2 | 0 | 8.60370E−06 | 8.50188E−09 | −1.82568E−11 | 5.41080E−15 | 0.00000E+00 |
| 10 | 0 | −3.32482E−06 | 1.03728E−08 | 4.75247E−12 | 6.69849E−14 | 0.00000E+00 |
| 11 | 0 | −3.70398E−06 | 2.45996E−09 | 1.46863E−11 | 7.83244E−15 | 0.00000E+00 |
| 21 | 0 | 2.00195E−06 | 1.30050E−08 | 2.05974E−11 | −3.51437E−14 | 0.00000E+00 |
| 22 | 0 | 1.23852E−05 | 7.76720E−09 | −6.56793E−12 | 2.03190E−14 | 0.00000E+00 |
| 23 | 0 | −1.47407E−05 | 9.35306E−09 | 3.35208E−12 | −3.15128E−14 | 0.00000E+00 |
| 24 | 0 | −1.46684E−05 | 9.54830E−09 | 5.86675E−12 | −1.20468E−14 | 0.00000E+00 |

TABLE 12

| Surface | Rd | TH | nd | νd |
|---|---|---|---|---|
| 1 | Infinity | 596 | | |
| 2 | 107.697 | 4 | 1.492 | 57.9 |
| 3 | 34.176 | 13.434 | 1 | — |
| 4 | 58.628 | 2 | 1.816 | 46.6 |
| 5 | 22.741 | 20.847 | 1 | — |
| 6 | −41.577 | 2 | 1.847 | 23.8 |
| 7 | 74.865 | 3.59 | 1 | — |
| 8 | 189.577 | 11.314 | 1.702 | 34.6 |
| 9 | −37.603 | 3.582 | 1 | — |
| 10 | −30.045 | 4 | 1.492 | 57.9 |
| 11 | −37.921 | 0.5 | 1 | — |
| 12 | 56.028 | 9.027 | 1.74 | 50 |
| 13 | −132.433 | 32.399 | 1 | — |
| 14 | 237.475 | 3.615 | 1.847 | 23.8 |
| 15 | −78.584 | 7.141 | 1 | — |
| 16 | 137.917 | 7.227 | 1.497 | 81.6 |
| 17 | −19.111 | 2 | 1.847 | 23.8 |
| 18 | 67.721 | 1.104 | 1 | — |
| 19 | 48.947 | 9.502 | 1.497 | 81.6 |
| 20 | −39.443 | 0.5 | 1 | — |
| 21 | 260.671 | 4 | 1.492 | 57.9 |
| 22 | 61.197 | 6.717 | 1 | — |
| 23 | −184.323 | 4 | 1.492 | 57.9 |
| 24 | −101.106 | 14.412 | 1 | — |
| 25 | 174.931 | 13.09 | 1.847 | 23.8 |
| 26 | −82.338 | 5 | 1 | — |
| 27 | Infinity | — | — | — |

| | | | Aspherical Coefficient | | | |
|---|---|---|---|---|---|---|
| Surface | K | A | B | C | D | E |
| 1 | 0 | 9.87981E−06 | −5.53910E−09 | 1.87701E−12 | −4.73542E−17 | 0.00000E+00 |
| 2 | 0 | 7.75122E−06 | 5.03342E−09 | −1.29693E−11 | 4.91184E−16 | 0.00000E+00 |
| 10 | 0 | −1.21775E−06 | −9.24022E−10 | 6.55637E−12 | 2.25956E−14 | 0.00000E+00 |
| 11 | 0 | −1.11169E−07 | −2.33462E−09 | 1.14346E−11 | 5.76967E−15 | 0.00000E+00 |
| 21 | 0 | −2.15266E−06 | 3.63555E−10 | 1.91034E−11 | −1.80540E−14 | 0.00000E+00 |
| 22 | 0 | −2.07711E−06 | 3.40073E−09 | −4.01429E−12 | 8.60232E−16 | 0.00000E+00 |
| 23 | 0 | −1.20097E−05 | 3.34151E−09 | −1.40100E−12 | 6.72588E−15 | 0.00000E+00 |
| 24 | 0 | −5.61406E−06 | −2.18317E−09 | 1.44287E−11 | 1.79912E−14 | 0.00000E+00 |

TABLE 13

| Surface | Rd | TH | nd | νd |
|---|---|---|---|---|
| 1 | Infinity | 596 | | |
| 2 | 99.811 | 4 | 1.492 | 57.9 |
| 3 | 34.003 | 14.034 | 1 | — |

TABLE 13-continued

| Surface | Rd | TH | nd | νd |
|---|---|---|---|---|
| 4 | 48.218 | 2 | 1.816 | 46.6 |
| 5 | 22.314 | 20.907 | 1 | — |
| 6 | −41.696 | 7.459 | 1.847 | 23.8 |
| 7 | 56.843 | 3.629 | 1 | — |
| 8 | 170.607 | 8.178 | 1.828 | 33.8 |
| 9 | −64.265 | 0.979 | 1 | — |
| 10 | 286.843 | 5 | 1.492 | 57.9 |
| 11 | −210.251 | 2.792 | 1 | — |
| 12 | 65.577 | 8.616 | 1.813 | 35.9 |
| 13 | −111.102 | 30.904 | 1 | — |
| 14 | 354.585 | 4.377 | 1.847 | 23.8 |
| 15 | −61.589 | 3.012 | 1 | — |
| 16 | 162.902 | 7.707 | 1.497 | 81.6 |
| 17 | −19.031 | 2 | 1.847 | 23.8 |
| 18 | 54.095 | 1 | 1 | — |
| 19 | 56.209 | 7.531 | 1.497 | 81.6 |
| 20 | −43.366 | 4.063 | 1 | — |
| 21 | 94.473 | 4 | 1.492 | 57.9 |
| 22 | 48.444 | 5.239 | 1 | — |
| 23 | 1172.561 | 5.454 | 1.492 | 57.9 |
| 24 | −109.747 | 14.491 | 1 | — |
| 25 | 177.551 | 12.628 | 1.847 | 23.8 |
| 26 | −87.026 | 5 | 1 | — |
| 27 | Infinity | — | — | — |

| Surface | K | A | B | C | D | E |
|---|---|---|---|---|---|---|
| | | | Aspherical Coefficient | | | |
| 1 | 0 | 1.11939E−05 | −5.42582E−09 | 1.39594E−12 | 1.98686E−16 | 0.00000E+00 |
| 2 | 0 | 9.65213E−06 | 8.27956E−09 | −1.20252E−11 | −3.52677E−15 | 0.00000E+00 |
| 10 | 0 | 0.00000E+00 | 0.00000E+00 | 0.00000E+00 | 0.00000E+00 | 0.00000E+00 |
| 11 | 0 | 0.00000E+00 | 0.00000E+00 | 0.00000E+00 | 0.00000E+00 | 0.00000E+00 |
| 21 | 0 | 0.00000E+00 | 0.00000E+00 | 0.00000E+00 | 0.00000E+00 | 0.00000E+00 |
| 22 | 0 | 0.00000E+00 | 0.00000E+00 | 0.00000E+00 | 0.00000E+00 | 0.00000E+00 |
| 23 | 0 | 0.00000E+00 | 0.00000E+00 | 0.00000E+00 | 0.00000E+00 | 0.00000E+00 |
| 24 | 0 | 0.00000E+00 | 0.00000E+00 | 0.00000E+00 | 0.00000E+00 | 0.00000E+00 |

TABLE 14

| | DATA1 | DATA2 | DATA3 | DATA4 | DATA5 |
|---|---|---|---|---|---|
| $f_0/f_1$ | −1.887 | −1.627 | −1.592 | −1.565 | −1.602 |
| $f_0/f_2$ | 0.684 | 0.633 | 0.635 | 0.630 | 0.635 |
| $f_0/f_3$ | 0.385 | 0.370 | 0.382 | 0.382 | 0.396 |
| $f_0/f_{11}$ | −0.198 | −0.170 | −0.187 | −0.170 | −0.149 |
| $f_0/f_{12}$ | −0.462 | −0.409 | −0.365 | −0.393 | −0.470 |
| $f_0/f_{13}$ | −0.708 | −0.647 | −0.642 | −0.617 | −0.577 |
| $f_0/f_{21}$ | 0.444 | 0.343 | 0.325 | 0.306 | 0.356 |
| $f_0/f_{22}$ | −0.010 | −0.086 | 0.002 | −0.001 | 0.005 |
| $f_0/f_{23}$ | 0.373 | 0.443 | 0.344 | 0.367 | 0.321 |
| $f_0/f_{31}$ | 0.220 | 0.066 | 0.135 | 0.162 | 0.215 |
| $f_0/f_{32}$ | −0.091 | −0.026 | −0.150 | −0.128 | −0.119 |
| $f_0/f_{33}$ | −0.481 | −0.405 | −0.388 | −0.431 | −0.469 |
| $f_0/f_{34}$ | 0.446 | 0.330 | 0.436 | 0.482 | 0.450 |
| $f_0/f_{35}$ | 0.018 | 0.071 | 0.030 | −0.016 | −0.033 |
| $f_0/f_{36}$ | −0.100 | −0.127 | −0.129 | −0.130 | −0.038 |
| $f_0/f_{37}$ | 0.377 | 0.372 | 0.368 | 0.371 | 0.365 |
| $T_{2-3}$ | 31.980 | 31.336 | 30.929 | 32.330 | 32.821 |
| $D_{30}/2$ | 11.000 | 10.713 | 10.880 | 10.982 | 11.000 |
| $D_{2I}/2$ | 15.000 | 14.924 | 15.000 | 15.102 | 15.015 |
| $(D_{30} + D_{2I})/2$ | 26.000 | 25.638 | 25.880 | 26.084 | 26.015 |
| $f_{L22L23}$ | −51.151 | −102.625 | −69.193 | −60.959 | −52.115 |
| S1 Inflection Point | 1 | 0 | 0 | 0 | 0 |
| S2 Inflection Point | 0 | 1 | 0 | 0 | 1 |
| S10 Inflection Point | 0 | 0 | 0 | 0 | 0 |
| S11 Inflection Point | 0 | 0 | 0 | 0 | 0 |
| S21 Inflection Point | 2 | 1 | 1 | 1 | 1 |
| S22 Inflection Point | 2 | 1 | 1 | 1 | 1 |
| S23 Inflection Point | 2 | 1 | 2 | 2 | 2 |
| S24 Inflection Point | 2 | 1 | 2 | 2 | 2 |

TABLE 15

| | DATA6 | DATA7 | DATA8 | DATA9 | DATA10 |
|---|---|---|---|---|---|
| $f_0/f_1$ | −1.726 | −1.667 | −2.201 | −2.147 | −2.249 |
| $f_0/f_2$ | 0.658 | 0.633 | 0.793 | 0.789 | 0.850 |
| $f_0/f_3$ | 0.396 | 0.364 | 0.360 | 0.373 | 0.379 |
| $f_0/f_{11}$ | −0.180 | −0.197 | −0.231 | −0.223 | −0.216 |
| $f_0/f_{12}$ | −0.452 | −0.255 | −0.495 | −0.496 | −0.440 |
| $f_0/f_{13}$ | −0.636 | −0.804 | −0.722 | −0.742 | −0.848 |
| $f_0/f_{21}$ | 0.426 | 0.419 | 0.557 | 0.508 | 0.405 |
| $f_0/f_{22}$ | 0.004 | −0.045 | −0.064 | −0.065 | 0.093 |
| $f_0/f_{23}$ | 0.308 | 0.442 | 0.390 | 0.426 | 0.448 |
| $f_0/f_{31}$ | 0.237 | 0.139 | 0.268 | 0.332 | 0.374 |
| $f_0/f_{32}$ | −0.159 | −0.171 | −0.180 | −0.338 | −0.354 |
| $f_0/f_{33}$ | −0.453 | −0.502 | −0.497 | −0.484 | −0.536 |
| $f_0/f_{34}$ | 0.465 | 0.452 | 0.449 | 0.507 | 0.458 |
| $f_0/f_{35}$ | −0.042 | −0.077 | −0.072 | −0.141 | −0.111 |
| $f_0/f_{36}$ | −0.060 | 0.025 | −0.007 | 0.052 | 0.113 |
| $f_0/f_{37}$ | 0.368 | 0.334 | 0.355 | 0.343 | 0.330 |
| $T_{2-3}$ | 32.923 | 30.054 | 31.142 | 32.399 | 30.904 |
| $D_{30}/2$ | 11.000 | 10.899 | 11.000 | 8.063 | 8.062 |
| $D_{2I}/2$ | 15.000 | 15.000 | 15.013 | 21.022 | 20.953 |
| $(D_{30} + D_{2I})/2$ | 26.000 | 25.899 | 26.013 | 29.086 | 29.015 |
| $f_{L22L23}$ | −50.295 | −44.154 | −44.895 | −36.746 | −32.173 |
| S1 Inflection Point | 0 | 0 | 0 | 0 | 0 |
| S2 Inflection Point | 1 | 1 | 0 | 1 | 1 |
| S10 Inflection Point | 0 | 0 | 1 | 1 | 0 |
| S11 Inflection Point | 0 | 0 | 0 | 1 | 0 |
| S21 Inflection Point | 1 | 1 | 1 | 0 | 0 |
| S22 Inflection Point | 1 | 1 | 0 | 0 | 0 |
| S23 Inflection Point | 2 | 0 | 0 | 0 | 0 |
| S24 Inflection Point | 2 | 0 | 0 | 1 | 0 |

Next, an example of a projection optical system in which Embodiment 1 of a first projection optical unit and Embodiment 1 of a second projection optical unit are combined is described below using FIGS. 43 to 55.

Figure 43:
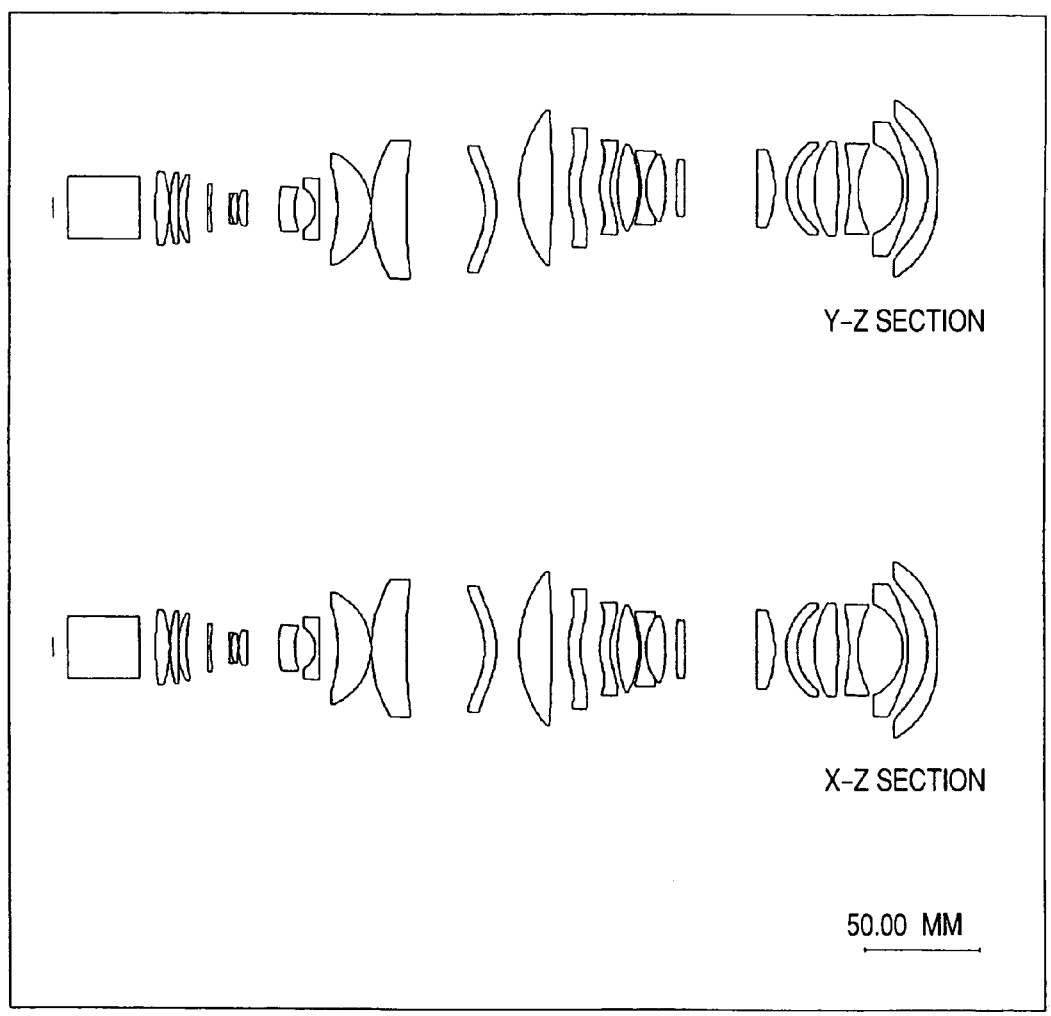
FIG. 43 is a configuration diagram of an optical system having a first projection optical unit and a second projection optical unit combined according to the present invention.

FIG. 43 is a configuration diagram of the projection optical system, wherein the second projection optical unit is Y-Z sectionally decentered by 9.8 mm with respect to the first projection optical unit. Layout suitable for a more compact design of the display apparatus for projecting an image from screen rear can thus be realized.

Figure 44:
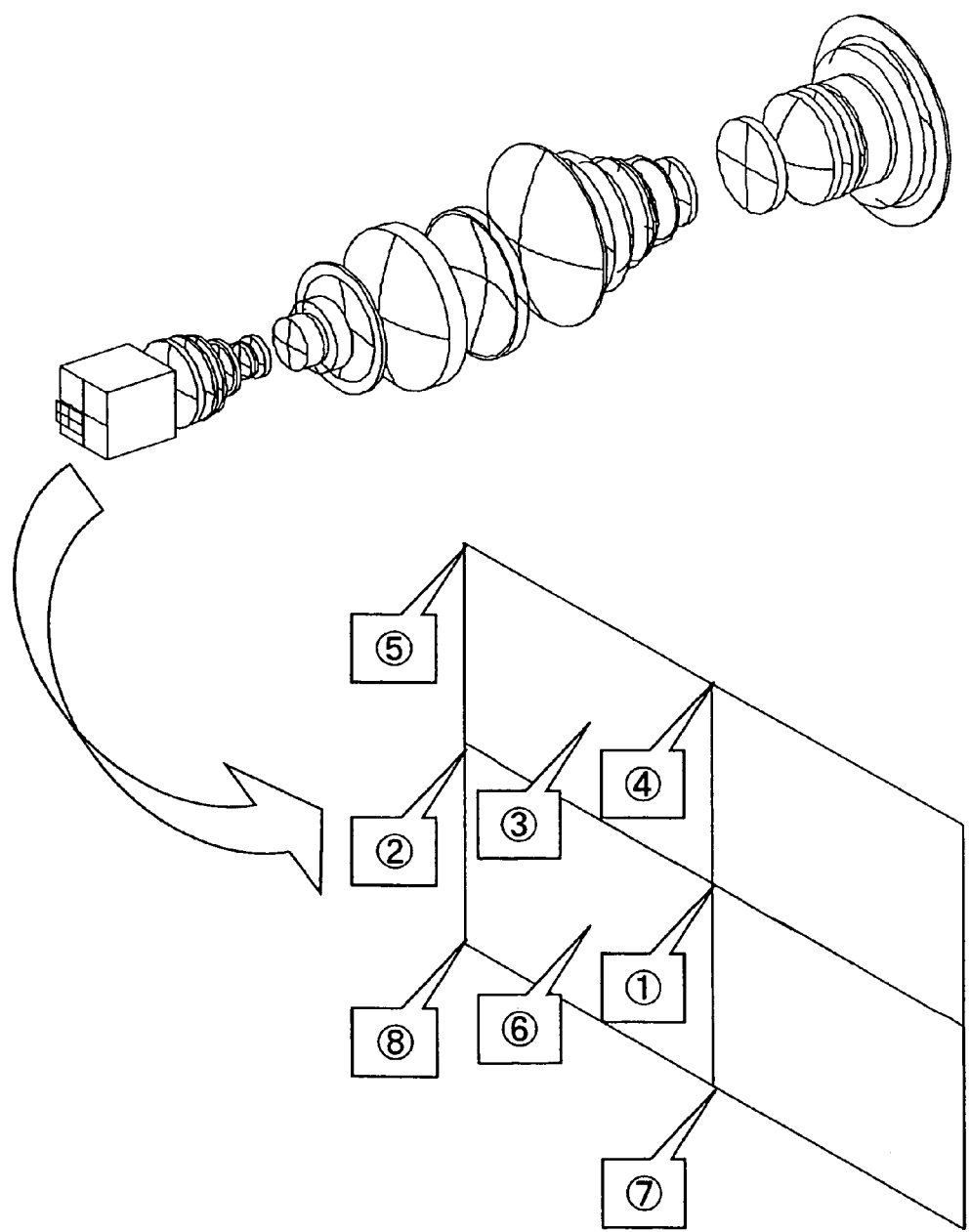
FIG. 44 is an explanatory diagram of object points.

FIG. 44 is an explanatory diagram of object points. As a result of the first projection optical unit and the second projection optical unit having been decentered with respect to each other, rotational symmetry is not established, for which reason, vertical and horizontal points of image display elements, and half-way points between the vertical and horizontal points have been set as object points.

Figure 45:
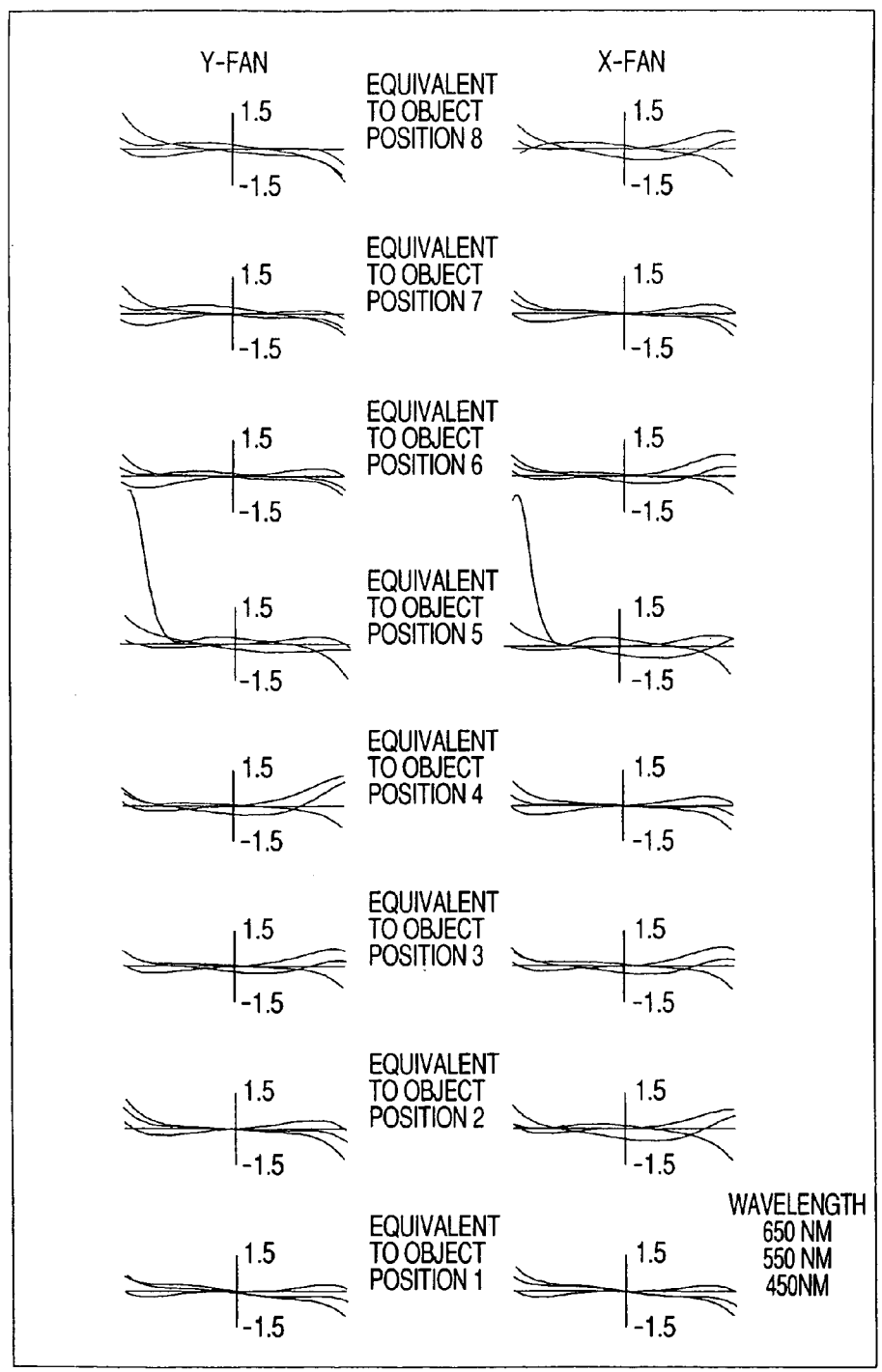
FIG. 45 is a diagram showing the aberration of white light rays in an optical system having a first projection optical unit and a second projection optical unit combined according to the present invention.
Figure 46:
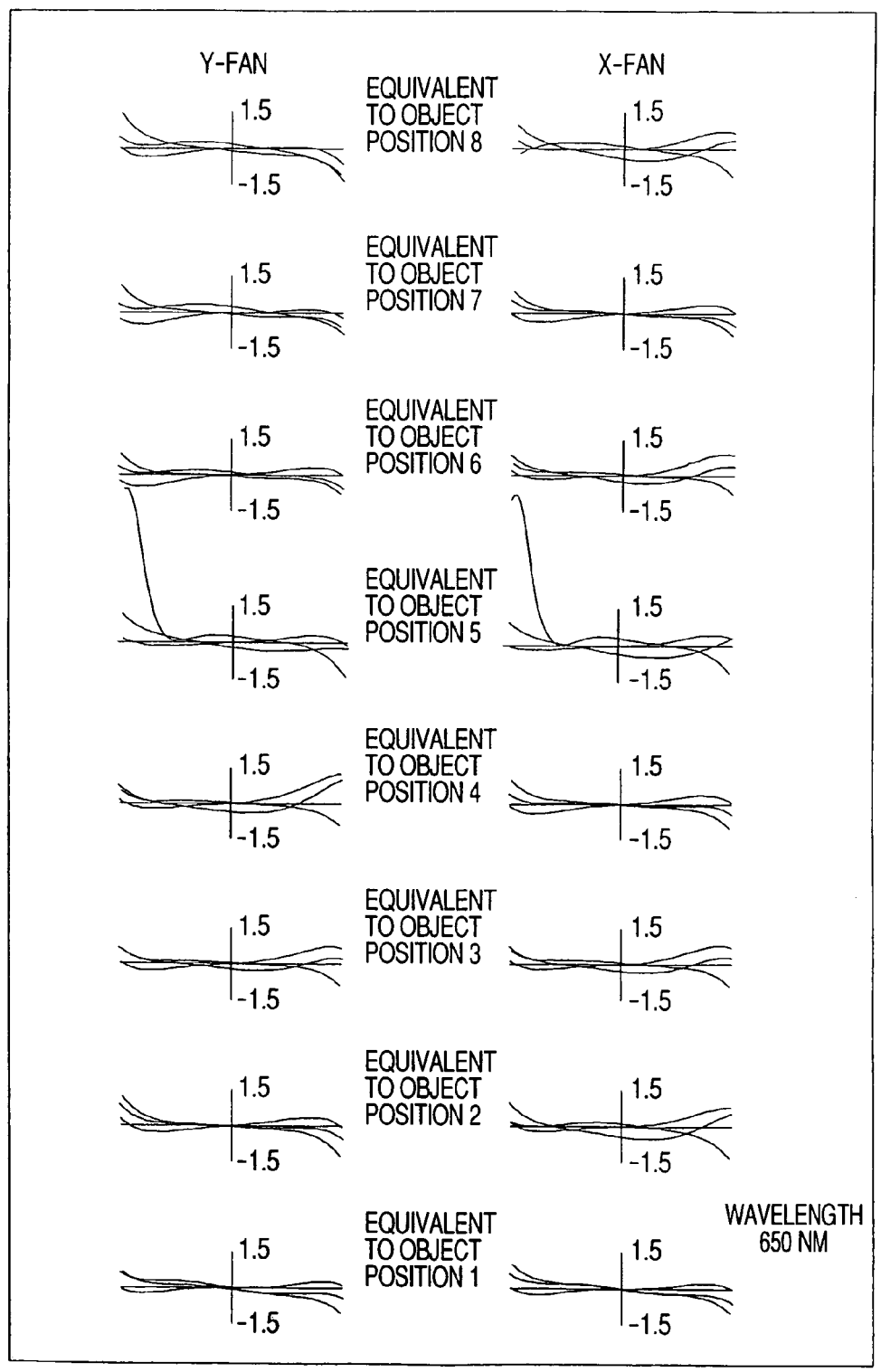
FIG. 46 is a diagram showing the aberration of red light rays in the optical system having a first projection optical unit and a second projection optical unit combined according to the present invention.
Figure 47:
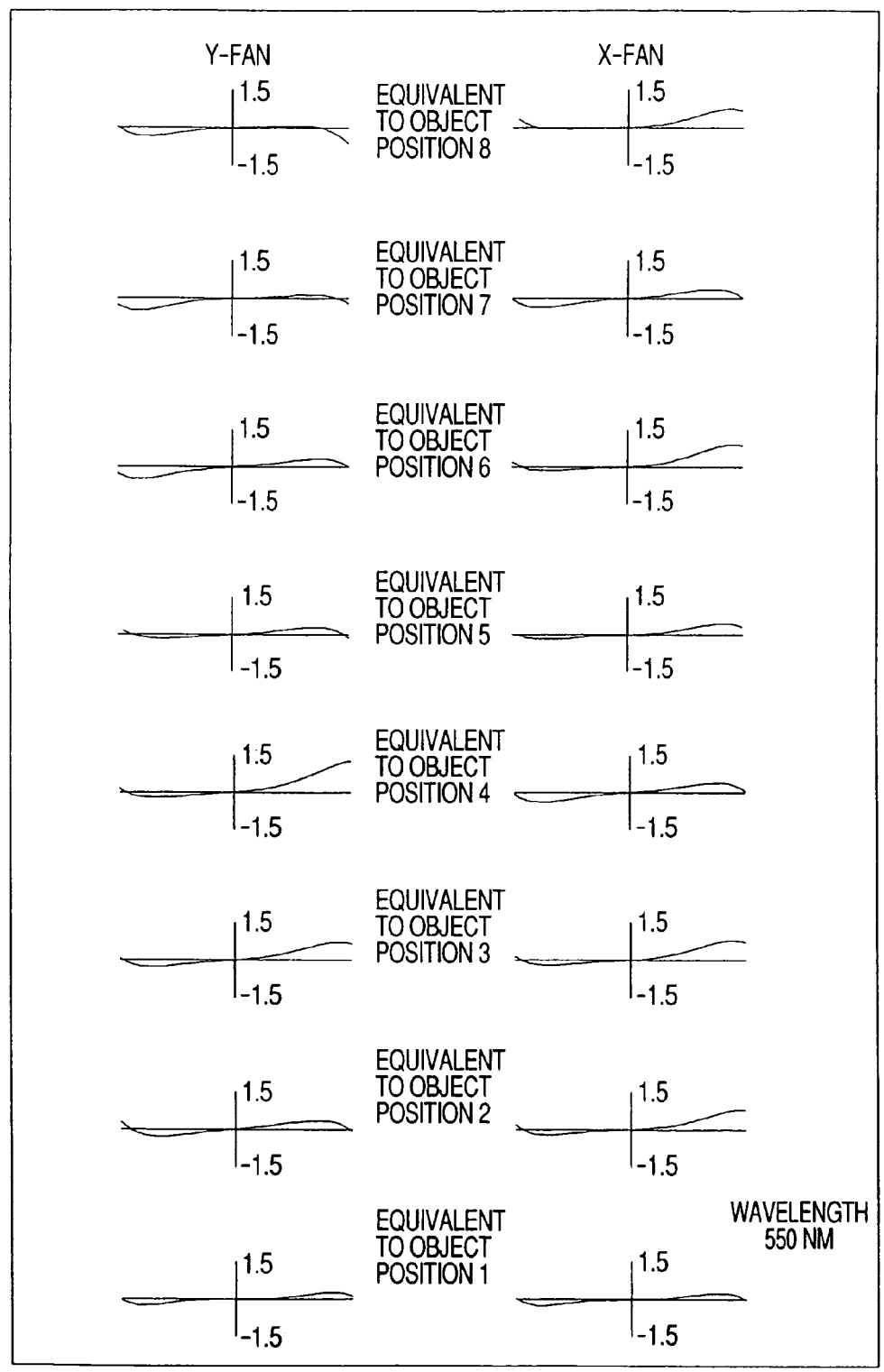
FIG. 47 is a diagram showing the aberration of green light rays in the optical system having a first projection optical unit and a second projection optical unit combined according to the present invention.
Figure 48:
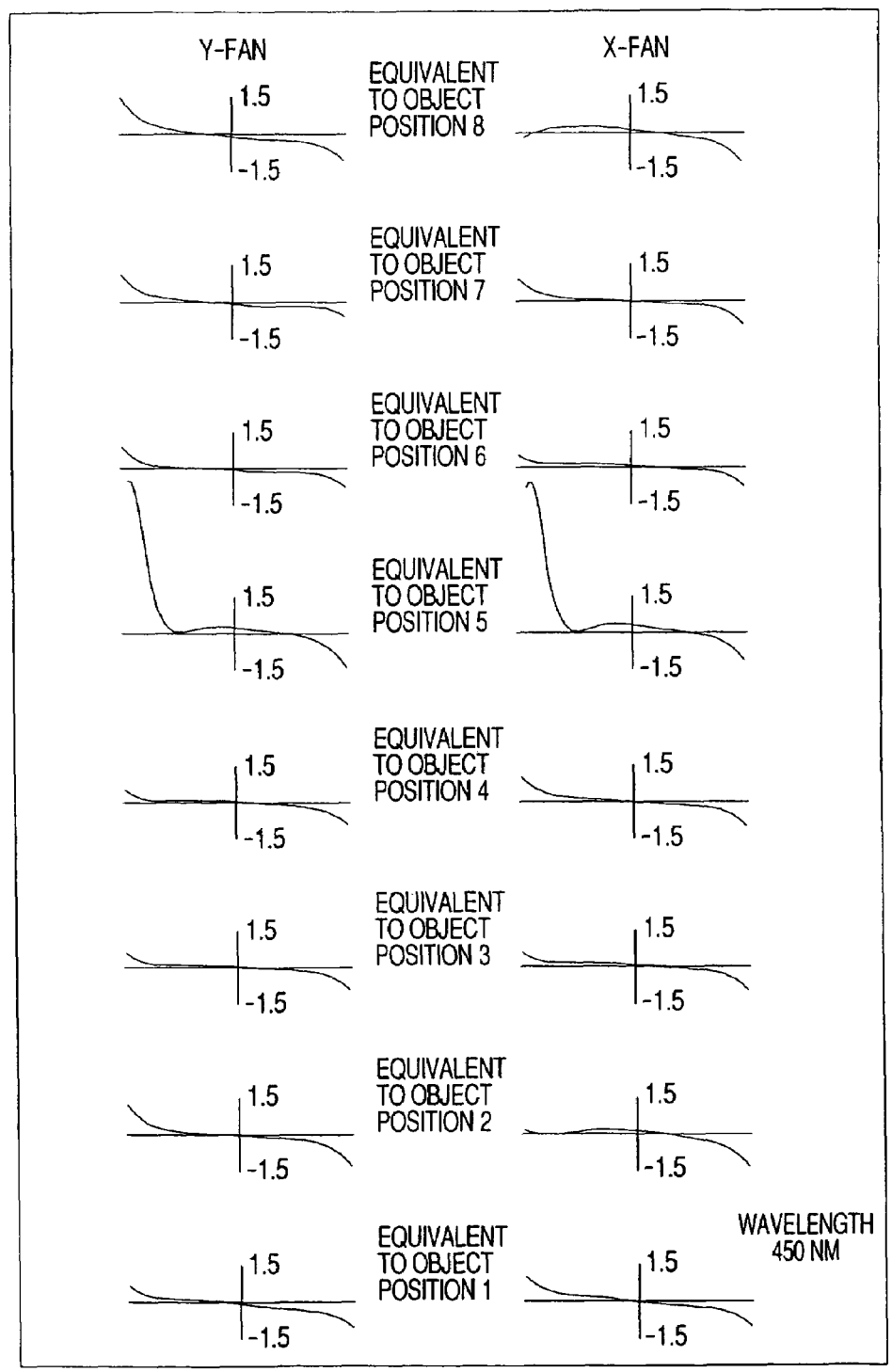
FIG. 48 is a diagram showing the aberration of blue light rays in the optical system having a first projection optical unit and a second projection optical unit combined according to the present invention.

FIGS. 45 to 48 are aberration diagrams of the projection optical system according to the present invention. FIG. 45 is an aberration diagram of the white light rays formed by synthesizing the rays having wavelengths of 650 nm, 550 nm, and 450 nm, wherein chromatic aberration is also shown so as to be understandable at the same time. FIG. 46 is an aberration diagram of red light rays at the wavelength of 650 nm, FIG. 47 an aberration diagram of green light rays at the wavelength of 550 nm, and FIG. 48 an aberration diagram of blue light rays at the wavelength of 450 nm. These diagrams are shown in units of 0.05 mm, and each of the diagrams indicates the way the rays are well aberration-corrected.

Figure 49:
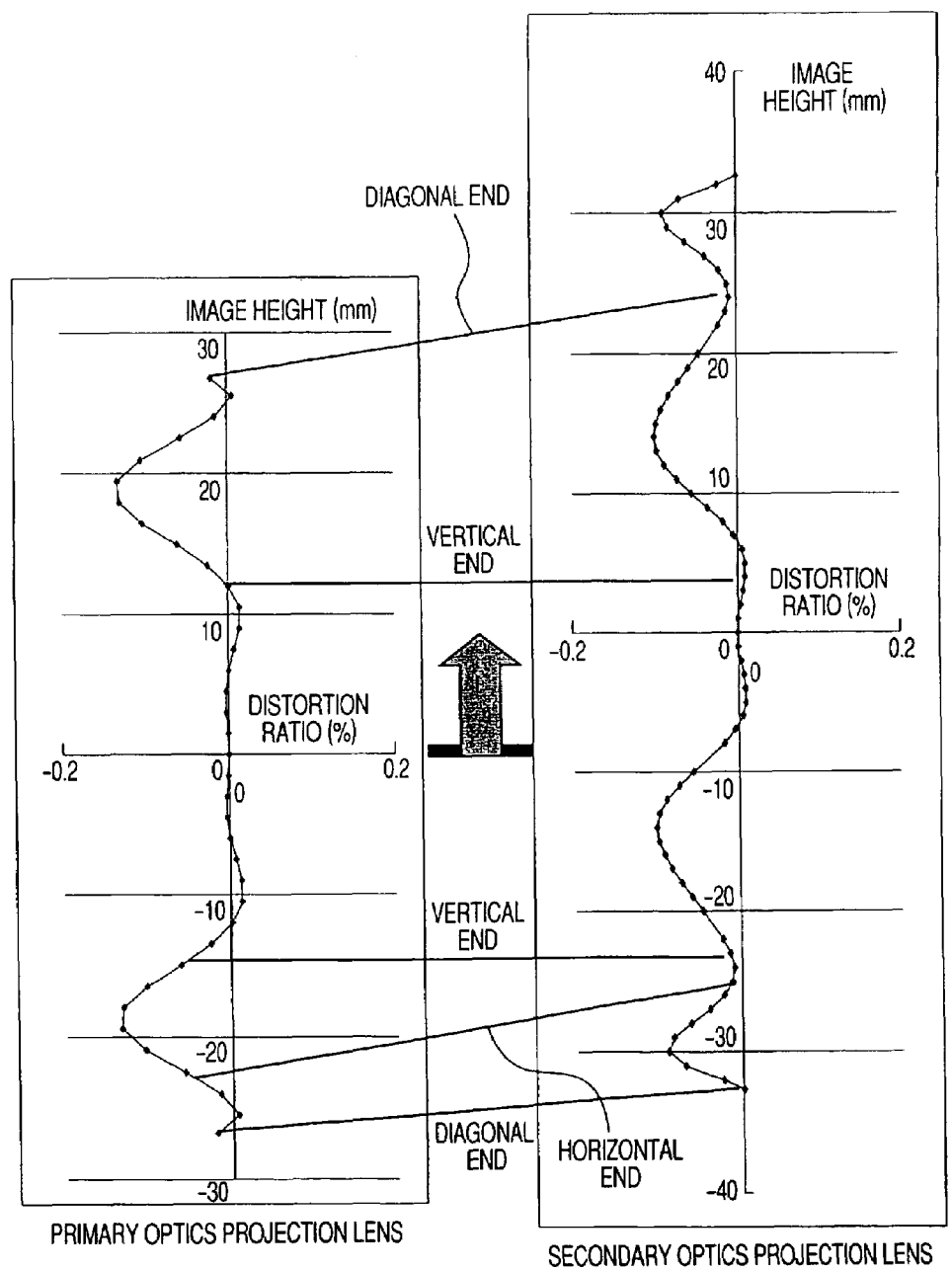
FIG. 49 is an explanatory diagram of distortion in an optical system having a first projection optical unit and a second projection optical unit combined according to the present invention.
Figure 50:
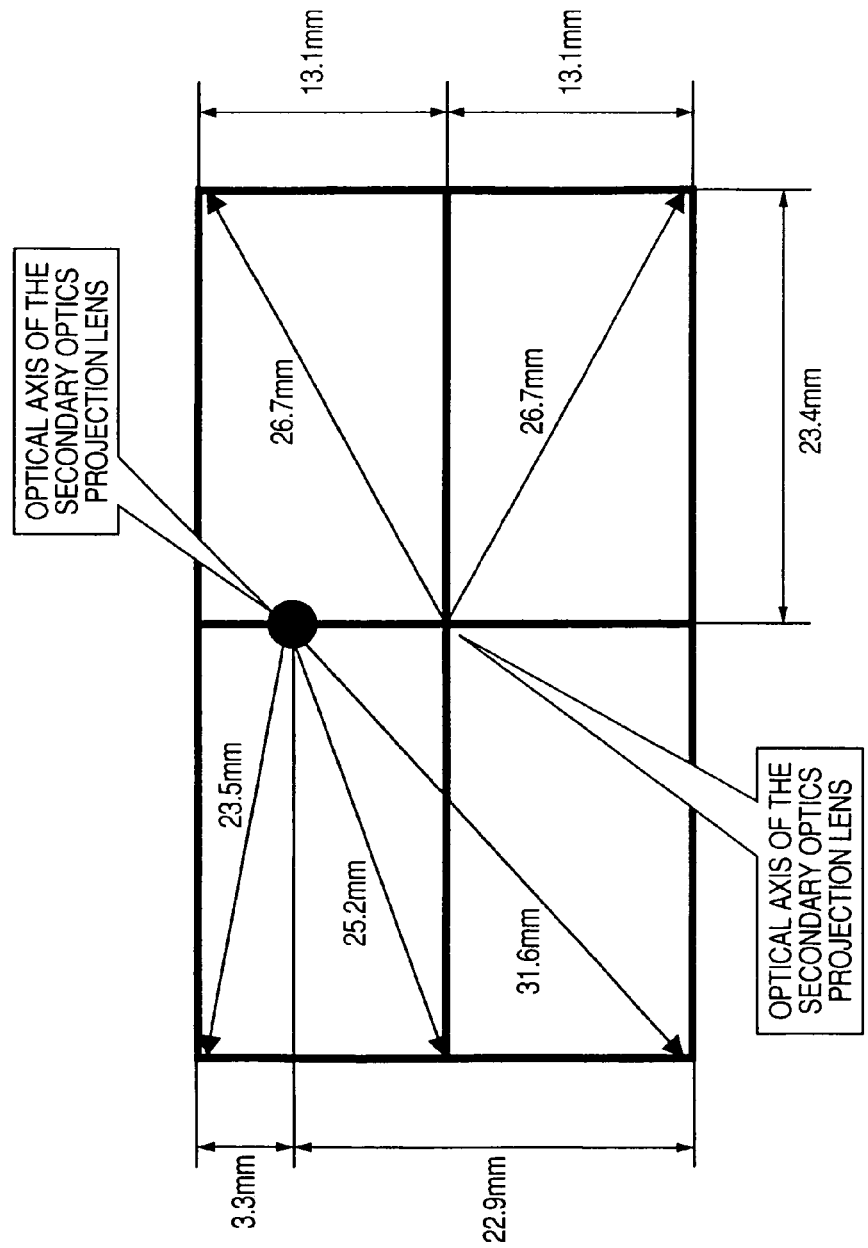
FIG. 50 is a diagram that gives a supplementary description of distortion in the optical system having a first projection optical unit and a second projection optical unit combined according to the present invention.
Figure 51:
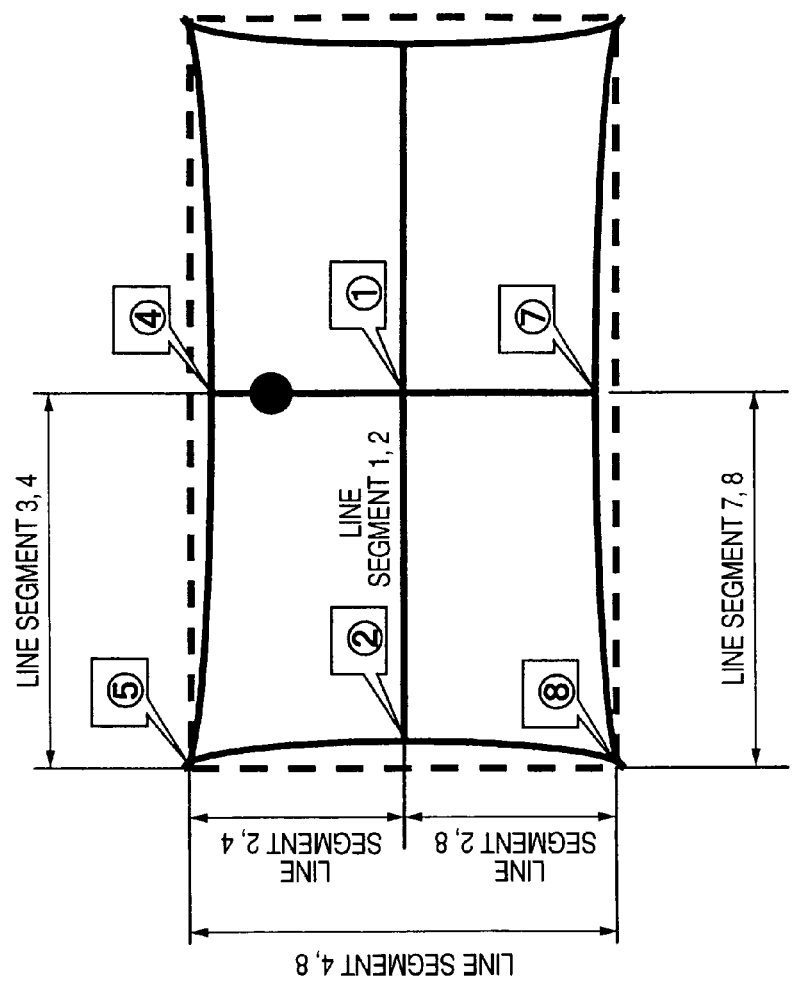
FIG. 51 is a diagram that explains the measurement of distortion in the optical system having a first projection optical unit and a second projection optical unit combined according to the present invention.

FIGS. 49 to 51 are explanatory diagrams relating to the distortional aberration generated by the projection optical system according to the present invention.

FIG. 49 is a diagram representing normal distortion vertically in a Y-axis direction. In order to compare the first projection optical unit and the decentered second projection optical unit in terms of distortional aberration, the first projection optical unit undertakes display with respect to image height, and the second projection optical unit undertakes display with respect to object height. Y-Z sectionally, comparison can be made in a 9.8 mm shifted condition as in FIG. 49. Except for the Y-Z section, calculation results need to be converted into distances from an optical axis of the first projection optical unit and from an optical axis of the second projection optical unit. FIG. 50 is a diagram showing an example of such conversions. FIG. 51 is an explanatory diagram of TV display distortional aberration. Very small values, i.e., 0.02% for line segment ④ ⑤ with line segment ① ② as its reference, 0.01% for line segment ⑦ ⑧ with line segment ① ② as its reference, −0.02% for line segment ② ⑤ with line segment ① ③ as its reference, and 0.02% for line segment ② ⑧ with line segment ① ⑦ as its reference, are realized as calculation results.

Actual measurement of distortion is accomplished by deforming a rectangular frame associated with a TV frame. More specifically, a Y-direction is defined by a middle vertical line with respect to an average value of left and right vertical lines. Accordingly, a segment associated with line segment ④ ⑦ is line segment ⑤ ⑧, which corresponds to an average value of the −0.02% and 0.02% mentioned above and thus takes an even smaller value. Since an X-direction is defined by a middle horizontal line with respect to an average value of upper and lower horizontal lines, a related segment takes a value almost equal to the calculation data described above.

Figure 52:
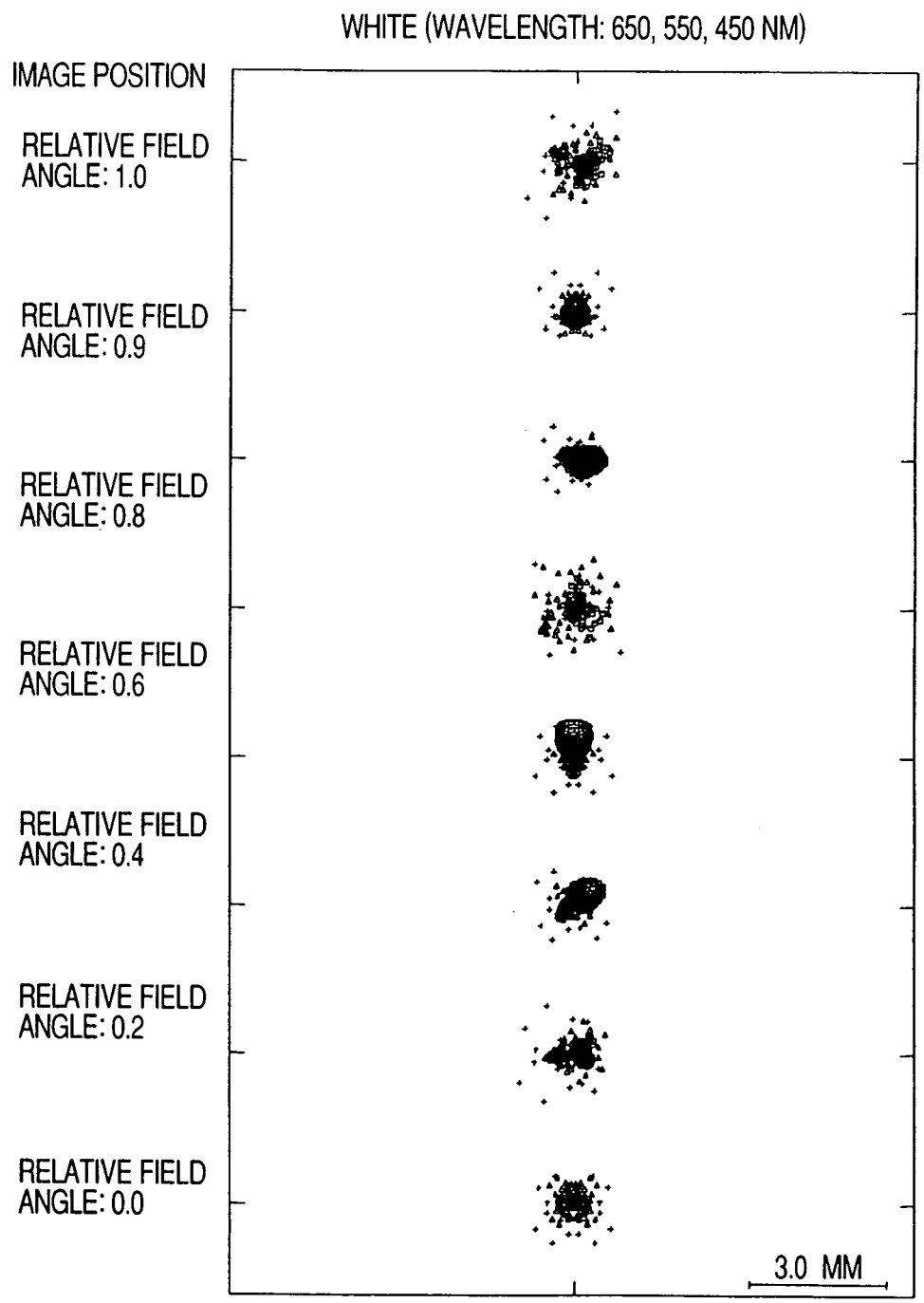
FIG. 52 is a spot diagram of white light rays in the optical system having a first projection optical unit and a second projection optical unit combined according to the present invention.
Figure 53:
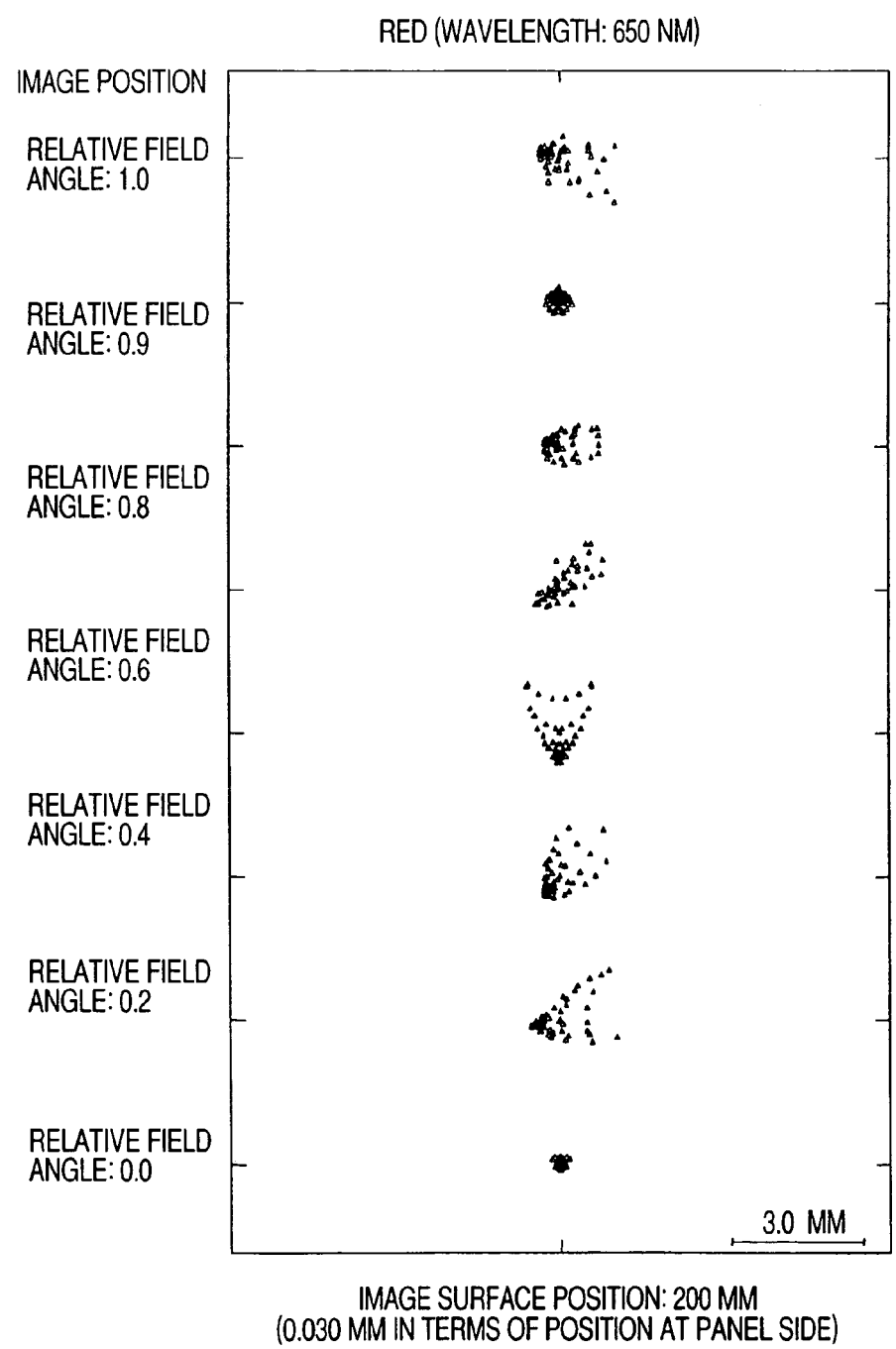
FIG. 53 is a spot diagram of red light rays in the optical system having a first projection optical unit and a second projection optical unit combined according to the present invention.
Figure 54:
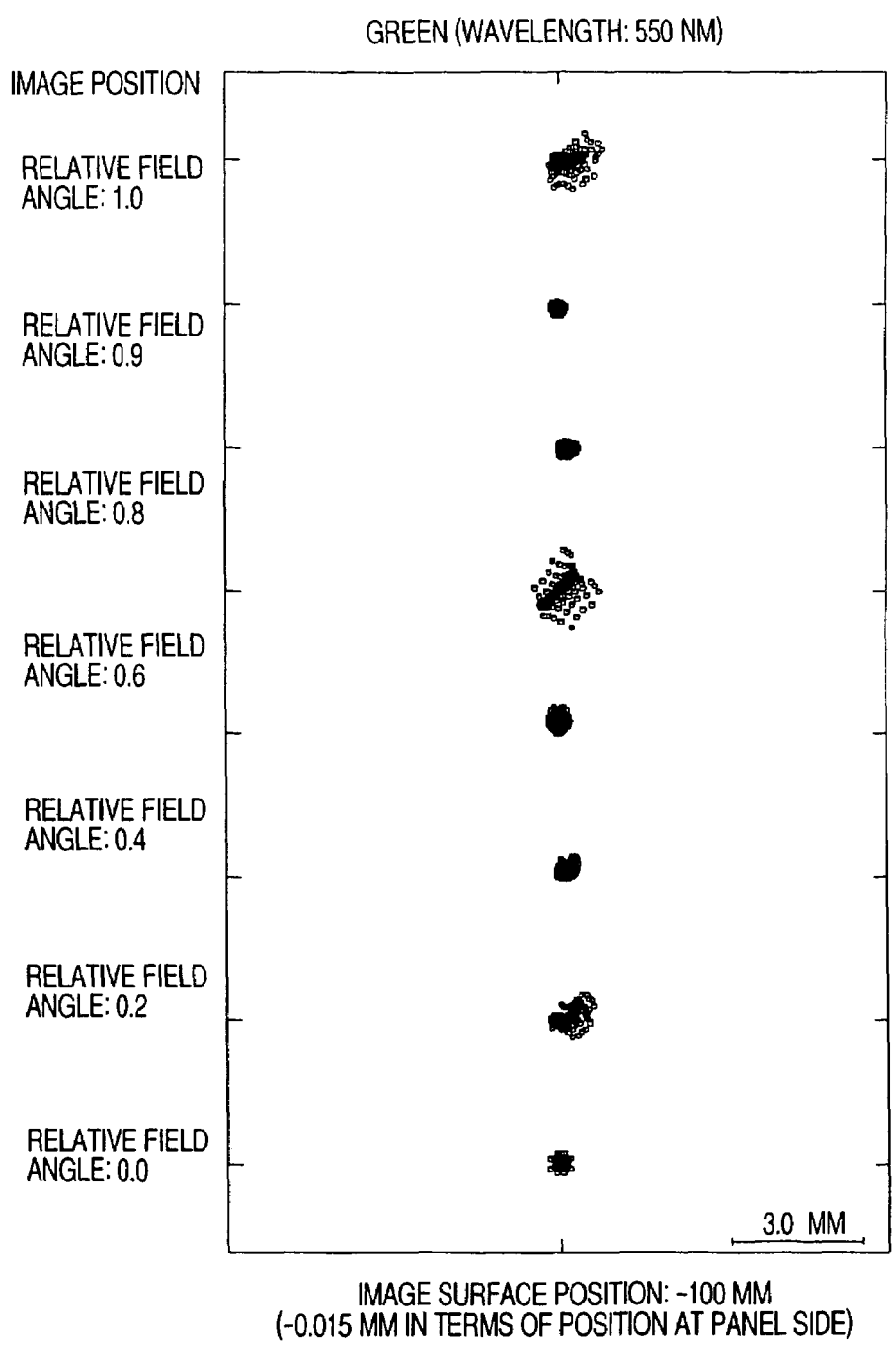
FIG. 54 is a spot diagram of green light rays in the optical system having a first projection optical unit and a second projection optical unit combined according to the present invention.
Figure 55:
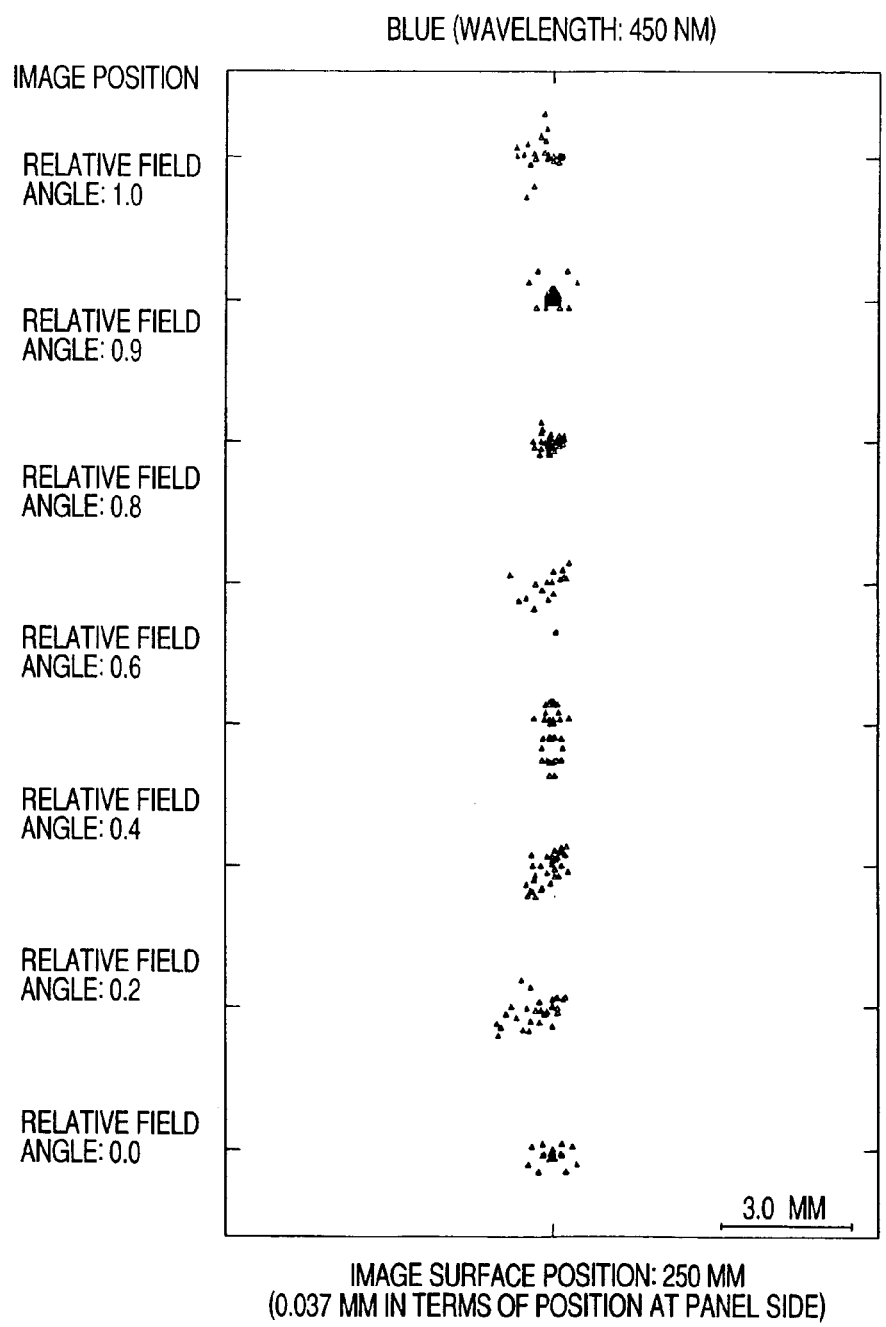
FIG. 55 is a spot diagram of blue light rays in the optical system having a first projection optical unit and a second projection optical unit combined according to the present invention.

FIGS. 52 to 55 are spot diagrams of the projection optical system according to the present invention. FIG. 52 is a spot diagram of the white light rays formed by synthesizing the rays having wavelengths of 650 nm, 550 nm, and 450 nm, wherein chromatic aberration is also shown so as to be understandable at the same time. FIG. 53 is a spot diagram of red light rays at the wavelength of 650 nm, FIG. 54 a spot diagram of green light rays at the wavelength of 550 nm, and FIG. 55 a spot diagram of blue light rays at the wavelength of 450 nm. These diagrams are shown in units of 0.1 mm, and each of the diagrams indicates the way the rays are well aberration-corrected.

A projection image display apparatus according to the present invention is adapted so that an image display element for red, an image display element for green, and an image display element for blue can each be adjusted to the optimum position independently. The above spot diagrams represent the spots at the particular optimum position.

As set forth above, it can be seen that high optical performance is also achieved in combination of the first projection optical unit and the second projection optical unit.

In the first projection optical unit of the present invention, an aperture stop for defining an F-value is disposed similarly to a normal lens. For the second projection optical unit, a peripheral flux equivalent to a central flux needs to be ensured to obtain a required peripheral illuminance (aperture efficiency).

The aperture stop for defining an F-value, however, cannot be disposed in the second projection optical unit. For example, if the aperture stop is disposed to match the rays in the middle of the screen, the rays on a periphery thereof will be intercepted, or conversely if the aperture stop is disposed to match the rays on the periphery of the screen, the rays in the middle thereof will be intercepted.

The second projection optical unit has therefore been optically designed by setting a virtual aperture stop at a pupil position of the second projection optical unit. Light ray diagrams of the system actually formed by combining the first projection optical unit and the second projection optical unit indicate the way an F-value of the entire lens section can be defined by the aperture stop disposed in the first projection optical unit. The present embodiment is characterized in that when a projection optical system is constructed by combining a first projection optical unit and a second projection optical unit in this way, an aperture stop is disposed in the first projection optical unit.

In the light ray diagram of a primary projection lens, rays of the object height for a diagonal dimension of 0.7 inches are represented, and in the light ray diagram of a secondary projection lens, rays of the object height for the 2.6-inch diagonal dimension obtained by adding an optical axis shifting ratio of 7:1 to a diagonal dimension of 2.1 inches, are represented. For the projection optical system having the primary lens and the secondary lens in combination, rays of the object points within the Y-Z section are represented since the system takes a rotationally asymmetrical configuration in which optical axes are shifted for reduced thickness of the display apparatus.

A projection optical unit 20 of the present invention includes a first lens group and a second lens group, both having positive refractive power. Accordingly, the image synthesized by a cross prism 19 is formed as an inverted image (first enlarged image) near a field lens by the first lens group, and this inverted image is projected on-screen as an erect image (second enlarged image) by the second lens group. In a general type of projection image display apparatus, the image projected in a screen-like format is inverted with respect to the image on an image display element. The present invention, however, is characterized by image erection.

In the projection color image display apparatus of the present invention, an optical axis of the second projection optical unit is decentered in substantially an X-axial positive direction on, for example, an X-Z plane, with respect to an optical axis of the first projection optical unit. A compact set having a short distance from a lower end of the screen to bottom can thus be realized. A more compact set can be realized by reducing a projection distance of the second projection optical unit and decentering the second projection optical unit in an opposite direction to the above.

This means that a set having different optical performance can be achieved by sharing illumination optics and the first projection optical unit and varying only the projection distance of the second projection optical unit and the amount of eccentricity with respect to the first projection optical unit. Accordingly, model expansion of the set can be implemented with a minimum amount of investment, and in this context, the present invention is excellent in development efficiency.

Furthermore, decentering the optical axis of the second projection optical unit in a Z-axial direction on, for example, the X-Z plane, with respect to the optical axis of the first projection optical unit makes it unnecessary to dispose the second projection optical unit in the middle of the screen. This increases flexibility of internal layout of the set, allowing a more compact set to be realized.

Meanwhile, even if an effective screen size of a transmission-type liquid-crystal panel is changed, direct application to a set of the same form is possible just by changing part of illumination optics and changing only the first projection optical unit. A projection optical unit excellent in development efficiency of a set can therefore be realized.

A magnification of the enlarged image obtained by the first projection optical unit differs according to an effective screen size of the image display element used. Preferably, however, the magnification ranges from about 2× to 7×. To ensure that a distance from the first projection optical unit to an image-forming position stays within the optimum range, and to limit external dimensions of the lenses of the first and second projection optical units to a range in which the lenses can be manufactured, it is further preferable that the magnification should range from 2× to 5×.

In addition, on the X-Z plane, the optical axis of the second projection optical unit is made eccentric with respect to the optical axis of the first projection optical unit, and this amount of eccentricity is selected as appropriate. By doing these, the amount of eccentricity with respect to, for instance, a transmission-type screen, can be arbitrarily changed. Even for the same screen size, therefore, the form of the set can be freely changed and hence the flexibility of design improves significantly.

While the use of a transmission-type liquid-crystal panel for the illumination optics of the present invention has been described above, it goes without saying that after images have been synthesized, the projection optical unit of the present invention can be applied even when a reflection-type liquid-crystal panel is used as an image display element.

The projection optical unit of the present invention is not to be considered applicable only to a rear-projection image display apparatus, and is naturally also applicable to a front-projection image display apparatus for projecting an image from the front of a screen.

As described above, according to the projection optical unit of the present invention, very-wide-angle imaging required for a more compact design of the set, and high focusing performance can be simultaneously achieved, even at enhanced magnifications. In addition, even when the effective screen size of the image display element used is changed, this change can be accommodated by changing part of the projection optical unit. Therefore, the great advantage that the development costs required for size expansion of a set or for model expansion coupled with the modification of an image display element can be reduced is obtainable for a projection color image display apparatus that employs the projection optical unit described above. No conventional technologies have allowed the above cost reduction. For these reasons, according to the present invention, a compact design for a set can be realized.

What is claimed is:

1. A projection optical unit for enlarged projection of an image displayed by an image display element, comprising:
   a first projection optical unit having positive refractive power; and
   a second projection optical unit having positive refractive power for further enlarging the first enlarged image obtained by the first projection optical unit;
   wherein the first projection optical unit is in an almost telecentric relationship with respect to the image display element side and the first enlarged image side, and the first enlarged image is formed at the image display element side, rather than at the second projection optical unit.

2. A projection optical unit for enlarged projection of an image displayed by an image display element, comprising:
   a first projection optical unit having positive refractive power; and
   a second projection optical unit having positive refractive power for further enlarging the first enlarged image obtained by the first projection optical unit;
   wherein said second projection optical unit is in an almost telecentric relationship with respect to the first enlarged image side, and the first enlarged image is formed at the image display element side, rather than at the second projection optical unit.

3. A projection image display apparatus, comprising:
   an image display element; and
   a projection optical unit for projecting, in an enlarged form and onto a screen, an image displayed by the image display element;
   wherein the projection optical unit includes a first projection optical unit and a second projection optical unit, both arranged on an optical path ranging from the image display element to the screen,
   the first projection optical unit having positive refractive power, and the second projection optical unit having positive refractive power for forming a second enlarged image by further enlarging the first enlarged image obtained by the first projection optical unit; and
   wherein the first projection optical unit is in an almost telecentric relationship with respect to the image display element side and the first enlarged image side, and the first enlarged image is formed at the image display element side, rather than at the second projection optical unit.

4. A projection image display apparatus, comprising:
   an image display element; and
   a projection optical unit for projecting, in an enlarged form and onto a screen, an image displayed by the image display element;
   wherein the projection optical unit includes a first projection optical unit and a second projection optical unit, both arranged on an optical path ranging from the image display element to the screen,
   the first projection optical unit having positive refractive power, and the second projection optical unit having positive refractive power for forming a second enlarged image by further enlarging the first enlarged image obtained by the first projection optical unit; and
   wherein the second projection optical unit is in an almost telecentric relationship with respect to the first enlarged image side, and the first enlarged image is formed at the image display element side, rather than at the second projection optical unit.

* * * * *